(12) United States Patent
Wheeler

(10) Patent No.: US 11,347,752 B2
(45) Date of Patent: May 31, 2022

(54) PERSONALIZED USER FEED BASED ON MONITORED ACTIVITIES

(71) Applicant: Laserlike, Inc., Mountain View, CA (US)

(72) Inventor: Matthew Wheeler, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 781 days.

(21) Appl. No.: 16/042,446

(22) Filed: Jul. 23, 2018

(65) Prior Publication Data
US 2020/0026772 A1    Jan. 23, 2020

(51) Int. Cl.
*G06F 16/00*    (2019.01)
*G06F 16/2457*    (2019.01)
*G06F 16/248*    (2019.01)
*G06F 16/23*    (2019.01)

(52) U.S. Cl.
CPC .... *G06F 16/24578* (2019.01); *G06F 16/2379* (2019.01); *G06F 16/248* (2019.01)

(58) Field of Classification Search
None
See application file for complete search history.

(56) References Cited

U.S. PATENT DOCUMENTS

2013/0290110 A1\* 10/2013 LuVogt ............... G06F 16/9535
705/14.66

\* cited by examiner

*Primary Examiner* — Thu Nguyet T Le
(74) *Attorney, Agent, or Firm* — BakerHostetler

(57) ABSTRACT

A feature vector associated with a candidate web document is determined. A feature space associated with the feature vector is filtered. A density value associated with the candidate web document is determined using the filtered feature space. The candidate web document is ranked with respect to a plurality of other candidate web documents based on the determined density value. The candidate web document is provided in a content feed based on the ranking.

20 Claims, 36 Drawing Sheets

| X | $E_0$ | $E_1$ | $E_2$ | ... | ... | ... | $E_n$ |
|---|---|---|---|---|---|---|---|
| $D_0$ | $A_{00}$ | $A_{01}$ | $A_{02}$ | ... | ... | ... | $A_{0n}$ |
| $D_1$ | $A_{10}$ | $A_{11}$ | $A_{12}$ | ... | ... | ... | $A_{1n}$ |
| $D_2$ | $A_{20}$ | $A_{21}$ | $A_{22}$ | ... | ... | ... | $A_{2n}$ |
| ... | ... | ... | ... | ... | ... | ... | ... |
| ... | ... | ... | ... | ... | ... | ... | ... |
| ... | ... | ... | ... | ... | ... | ... | ... |
| $D_m$ | $A_{m0}$ | $A_{m1}$ | $A_{m2}$ | ... | ... | ... | $A_{mn}$ |

FIG. 18

PERSONALIZED USER FEED BASED ON MONITORED ACTIVITIES

BACKGROUND OF THE INVENTION

Web services can be used to provide communications between electronic/computing devices over a network, such as the Internet. A website is an example of a type of web service. A website is typically a set of related web pages that can be served from a web domain. A website can be hosted on a web server or appliance. A publicly accessible website can generally be accessed via the Internet. The publicly accessible collection of websites is generally referred to as the World Wide Web (WWW).

Internet-based web services can be delivered through websites on the World Wide Web. Web pages are often formatted using HyperText Markup Language (HTML), eXtensible HTML (XHTML), or using another language that can be processed by client software, such as a web browser that is typically executed on a user's client device, such as a computer, tablet, phablet, smart phone, smart watch, smart television, or other (client) device. A website can be hosted on a web server (e.g., a web server or appliance) that is typically accessible via a network, such as the Internet, through a web address, which is generally known as a Uniform Resource Indicator (URI) or a Uniform Resource Locator (URL).

Search engines can be used for searching for content on the World Wide Web, such as to identify relevant websites for particular online content and/or services on the World Wide Web. Search engines (e.g., web-based search engines provided by various vendors, including, for example, Google®, Microsoft Bing®, and Yahoo®) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). Search engines generally index website content, such as web pages of crawled websites, and then identify relevant content (e.g., URLs for matching web pages) based on matches to keywords received in a user query that includes one or more terms or keywords. For example, a search engine can perform a search based on the user query and output results that are typically presented in a ranked list, often referred to as search results or hits (e.g., links or URIs/URLs for one or more web pages and/or websites). The search results can include web pages, images, audio, video, database results, directory results, information, and other types of data.

Search engines typically provide paid search results (e.g., the first set of results in the main listing and/or results often presented in a separate listing on, for example, the right side of the output screen). For example, advertisers may pay for placement in such paid search results based on keywords (e.g., keywords in search queries). Search engines also typically provide organic search results, also referred to as natural search results. Organic search results are generally based on various search algorithms employed by different search engines that attempt to provide relevant search results based on a received user query that includes one or more terms or keywords.

BRIEF DESCRIPTION OF THE DRAWINGS

Various embodiments of the invention are disclosed in the following detailed description and the accompanying drawings.

FIG. 18 is a functional view of the graph data store of a search and feed system in accordance with some embodiments.

DETAILED DESCRIPTION

Figure 1:
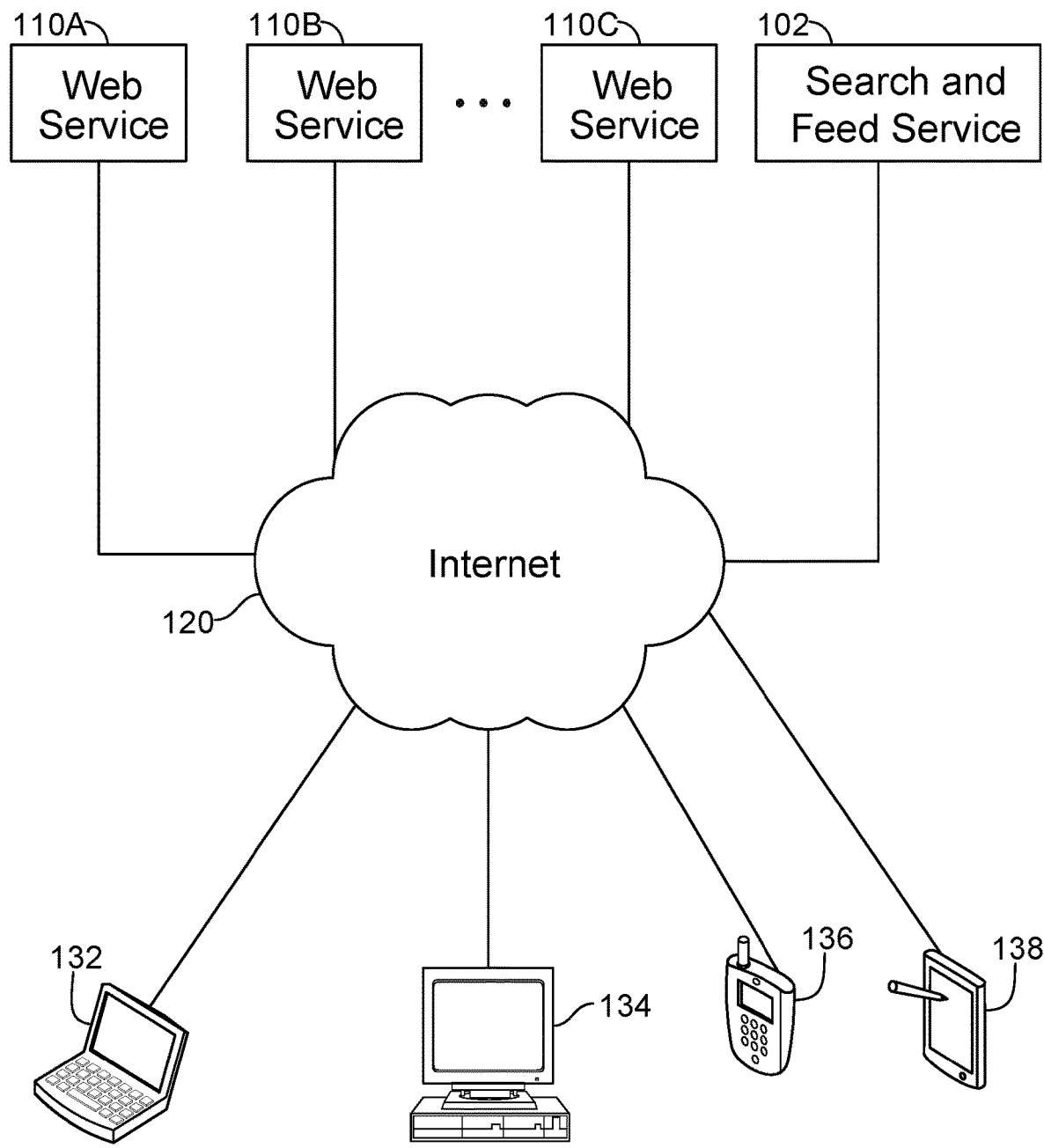
FIG. 1 is a block diagram illustrating an overview of an architecture of a system for providing a search and feed service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A search and feed service may provide in a content feed of a user device a plurality of cards associated with a plurality of corresponding web documents based on a user's interest in one or more topics. The purpose of the search and feed service is to keep the user engaged with the content feed for as long as possible by providing a plurality of content cards that may be of interest to the user. The duration that a user is engaged with the content feed depends on the type of and quality of the web documents provided by the search and feed service.

The corpus of web documents available to the search and feed service continues to expand every second, minute, and hour of each day. Crawling through all of the available web documents and determining whether a particular web document is of interest to a particular user is a time consuming and resource intensive process. For example, the corpus of web documents is comprised of approximately a billion web documents. Thousands of web documents are added to the corpus each day. Finding web documents that match a user's interests requires a processor to use a significant amount of computing resources to perform the computations that determine whether a web document will be of interest to a user and to provide the web document to the user. It is a waste of computing resources for the search and feed service to spend resources determining that a candidate web document is of interest to a particular user, to provide in a content feed a card associated with a candidate web document, and to receive user feedback explicitly indicating that the web document is not interesting. Such computing resources could have been used for other tasks (e.g., maintenance tasks, resource optimization, etc.) or to provide a different candidate web document. Providing uninteresting content to a user may also make the user less likely to remain engaged with the search and feed service.

A technique to find a particular web document that may be of interest to a particular user is disclosed. The technique reduces the amount of computing resources needed to determine web documents that may be of interest to a user and encourages the user to remain engaged with the search and feed service by providing one or more web documents that are of interest to the user. The technique determines whether a particular web document is of interest to a particular user based on a user's previous interactions with cards associated with a plurality of web documents previously included in a content feed. The previous interactions may include a set of positive interactions and a set of negative interactions. The previous interactions are received by the search and feed service via a user interface (e.g., a graphical user interface) of the user's device. The manner in which a user interacts with a card associated with a web document provides an indication of the degree to which the user is interested in a particular topic. Each positive and negative interaction has an associated weight indicating the degree of positivity or negativity.

The set of positive interactions may include a user clicking on the card associated with a web document to read the web document, a user interacting with the card and providing a comment about the web document, a user sharing with one or more contacts (e.g., email contacts, phone contacts, social media contacts, etc.) the card or the web document associated with the card, and/or a user providing a user input to the graphical user interface and associating an emoji (e.g., "thumbs up/down," "heart," "smiley face", etc.) with the card associated with the web document. The set of positive interactions may also include a user providing the search and feed service with a search query. In response, the search and feed service may provide one or more web documents associated with the search query. This indicates a positive interaction because the user is explicitly providing to the search and feed service a topic with which the user is interested.

The set of negative interactions is the set of user actions that may be considered negative to a topic. The set of negative interactions may include a user providing via a graphical user interface of the user's device to the search and feed service feedback indicating the web document associated with the card is not of interest to the user. The set of negative interactions may include a user providing via a graphical user interface of the user's device to the search and feed service feedback indicating the web document associated with the card is off topic. For example, a user may be interested in the topic "hiking," i.e., walking outside on a trail, and the search and feed service provides a card associated a web document about the Federal Reserve hiking interest rates.

A candidate web document, for example, an article from a web service, is received. The candidate web document may be analyzed to determine the importance of an entity with respect to the candidate web document. A search and feed service may maintain a matrix X for the corpus of web documents that represents an entity as plurality of web documents and a web document as a plurality of entities. The matrix X can be used to determine a list of entities associated with a particular web document. For example, a candidate web document may be represented as $D_n = \{A_n, A_{1n}, A_{2n}, \ldots, A_{nn}\}$ where $A_{xy}$ represents the importance of a corresponding entity for a particular document.

A feature space associated with a user is pre-processed. Each web document included in the corpus of web documents has an associated feature vector. The feature vector represents a location of a web document in the feature space associated with the corpus of web documents. A feature vector associated with the candidate document is determined. The candidate web document $D_n$ may be represented as a plurality of entities. The search and feed service may maintain matrix X for a large number of entities, for example, two million entities. Thus, $D_n$ may be a vector with two million entries. Determining the similarity between $D_n$ and any other web document using matrix X can be computationally intensive and time consuming. To reduce the amount of resources and time needed to determine the similarity between $D_n$ and one or more other web documents, a collaborative filtering technique may be implemented. Given X is a m×n matrix, X can be approximated as a matrix $U_{m \times k}$ multiplied by a matrix $W_{k \times n}$, such that X=UW. When X' is approximately equal to X and k is a relatively small integer (e.g., 100), the matrices U and W provide k-dimensional vectors for the rows and columns of X that can be used to calculate the similar between two web documents. A matrix $U_{m \times k}$ is determined. U is a matrix of m entities by k documents. A matrix $W_{k \times n}$ is determined. W is a matrix of k entities by n documents. The matrix X'=UW is computed. An entry of the matrix X' may correspond to a feature vector of a web document. The web document may be represented as a feature vector comprising k elements. The entries of matrix X' correspond to a feature space of available web documents. Other web documents included in the corpus have corresponding feature vectors.

The feature space around the feature vector associated with the candidate web document is pre-processed to remove one or more web documents that may bias a candidate web document interaction density value. The feature space may be filtered based on a cosine similarity between the feature vector associated with the candidate document and a feature vector associated with any of the other entries (e.g., other web documents included in the corpus) included in matrix X'. The cosine similarity may be computed as $$\cos\theta = \frac{\vec{d_i} \cdot \vec{q}}{|\vec{d_i}||\vec{q}|}$$

where $\vec{d_i}$ is the feature vector associated with the candidate web document and $\vec{q}$ is the feature vector associated with a web document. The value of the cosine similarity is a value between −1 and 1. In the event the cosine similarity is greater than 0.75, the feature vector associated with the web document $\vec{q}$ may be removed from a feature space that is used to calculate a candidate web document interaction density, that is, the entry corresponding to $\vec{q}$ may be removed from the matrix X'. This helps to provide web documents that may be of interest to the user because it removes from a candidate web document interaction density calculation entries of matrix X' that could bias the result of the calculation. For example, a search and feed service may provide a plurality of web documents (e.g., 10) associated with a first topic. The user may have nine positive interactions with the first topic and one negative interaction with the first topic. The nine positive interactions may over influence the candidate web document interaction density determination such that the influence of one negative interaction associated with the first topic is negligible. This is undesirable because in the event a user explicitly indicates that the user is not interested in a topic, continuing to provide the user with one or more web documents associated with the topic will make the user less likely to remain engaged with the search and feed service.

In some embodiments, a sim hash is used to reduce the number of entries for the cosine similarity determination. For example, a sim hash may be determined for the candidate web document. One or more feature vectors having the same sim hash as the candidate web document are determined. A data structure may store the corpus of web documents and their corresponding sim hashes. The data structure may be inspected to identify the one or more web documents that have the same sim hash as the candidate web document. A corresponding similarity score may be computed between the feature vector associated with the candidate web document and each feature vector having the same sim hash as the candidate web document. This reduces the number of computations performed by a processor because instead of computing a cosine similarity between each entry of matrix X' and the candidate web document, the cosine similarity computation may be targeted to web documents with the same sim hash as the candidate web document. For example, there may be 2 million entries in matrix X', but only 3000 entries with the same sim hash as the candidate web document. Using a sim hash may reduce the number of cosine similarity computations from 2 million to 3000. This is a tremendous amount of computational savings when pre-processing a feature space to remove one or more web documents that may bias a candidate web document interaction density value of a candidate web document. The amount of computational savings is compounded when a plurality of candidate web documents may be provided to a user. For example, suppose 10 candidate web documents may be provided to a user. Instead of doing 20 million cosine similarity computations (2 million computations per candidate web document), the processor may perform 30000 cosine similarity computations (3000 computations per candidate web document).

A candidate web document interaction density is computed for the candidate web document using the filtered feature space. The candidate web document interaction density may be computed using a set of web documents associated with the candidate web document. The set of web documents associated with the candidate web document may include the n nearest neighbors (e.g., 10) to the candidate web document in the filtered feature space. The filtered feature space does not include the feature vectors that were removed in the feature space pre-processing. In some embodiments, the n nearest neighbors are determined based on a cosine similarity. In some embodiments, the cosine similarity calculation used in the pre-processing step is used to determine the n nearest neighbors. In other embodiments, the n nearest neighbors are determined based on a Euclidean distance. In some embodiments, the n nearest neighbor determination is limited to the plurality of web documents having the same sim hash as a candidate web document. In some embodiments, the n nearest neighbor determination is limited to the plurality of web documents having the same sim hash as a candidate web document and the plurality of web documents having a sim hash that differs from the sim hash of the candidate web document by one digit.

The candidate web document interaction density value provides an indication of whether a user is interested in a candidate web document. The candidate web document has an associated entity/topic. A search and feed content service may provide to a user in a content feed ten cards associated with a first entity/topic and five cards associated with a second entity/topic. The user may have had positive interactions with three of the cards associated with the first entity/topic and positive interactions with three cards associated with the second entity/topic. Although the user has interacted with the same number of cards for the two entities/topics, the density of those interactions is different (e.g., 3/10 for the first entity/topic and 3/5 for the second entity/topic). Based on this simple example, the user may be determined to be more interested in a card associated with the second entity/topic.

A candidate web document interaction density value may be based on a positive interaction density value and a negative interaction density value. The positive interaction density value may be based on a ratio of the total number of cards included in the set of web documents with a positive interaction (e.g., reads, likes, shares, queries, comments) from the user to the total number of cards included in the set of web documents that were seen by the user. Each positive interaction may have an associated weight indicating the degree of positivity. For example, a "read" interaction may be weighed more than a "share" interaction. The negative interaction density value may be based on a ratio of the total number of cards included in the set of web documents with a negative interaction (e.g., "Not Interested" or "Off Topic") from the user to the total number of cards included in the set of web documents that were seen by the user. Each negative interaction may have an associated weight indicating the degree of negativity. In the event the negative interaction density value is greater than a threshold value (e.g., 0), the negative interaction density value may be set to a value (e.g., −5) that gives the negative interaction more weight than the set of positive interactions.

The candidate web document interaction density value represents the observed affinity to topics in the feature vector space for a given user. The candidate web document interaction density value may be pre-calculated on system startup and updated whenever there is a primary interaction (e.g., read, like, share, negative feedback, etc.). The candidate web document interaction density value may also be updated on a loop while the user is using the app.

A probability that a user will click on a card associated with the candidate web document if the card associated with the candidate web document is provided in the content feed may be determined based on the density value. For example, a linear regression model based on historical clicks of other users may be used to determine the probability that the user will be interested in the candidate document.

The candidate web document interaction density value is one signal that may be used to rank the candidate web document with respect to other candidate web documents. Other signals may include a freshness signal, a topicality signal, a trending signal, etc. The candidate web document may be ranked with respect to other candidate web documents based on a combination of the signal values. A card associated with the candidate web document may be provided to the user in the content feed in the event a value associated with a candidate web document that is based on the combination of signals is greater than a threshold value.

In some embodiments, the rank of a candidate web document is boosted based on a set of available candidate web documents. The set of available candidate web documents includes web documents that may be of interest to a particular user, but have not been provided to the user in the content feed. Each available candidate web document has a corresponding candidate web document interaction density value. A mean density value may be determined for the set of available candidate web documents. A standard deviation may be computed for the set of available candidate web documents based on the mean density value. Each candidate of the set of available candidate web documents has an associated probability value that indicates whether the user is likely to interact with the card associated with the candidate web document. The relationship between a candidate web document interaction density value and its associated probability may be a monotonic increasing relationship. The set of candidate web documents are sorted based on their corresponding candidate web document interaction density values. In some embodiments, candidate web documents with higher corresponding candidate web document interaction density value are given a higher boost (weight) than other candidate web documents with lower corresponding candidate web document interaction density values. For example, candidate web documents in the top 10% of the set of sorted web documents may be given a higher boost than candidate web documents in the lower 10% of the set of sorted web documents.

The candidate web documents may be ranked with respect to each other based on a combination of the ranking signals (e.g., freshness, popularity, site quality, candidate web document interaction density values). In some embodiments, a candidate web document is ranked lower than other candidate web documents, but has a higher probability value and/or candidate web document interaction density value than the other candidate web documents. For example, a candidate web document may have a very low ranking due to its freshness score (e.g., three months old), but the candidate web document may have a higher probability value and/or candidate web document interaction density value than other "fresher" candidate web documents (e.g., web documents published in the last day). In some embodiments, a candidate web document is boosted in the event the candidate web document has a higher probability value than other candidate web documents, but the candidate web document interaction density value associated with the candidate web document is lower than the other candidate web documents. The candidate web document score may boosted (e.g., 1-22.5) such that its ranking is higher than the other candidate web documents, even though the candidate web document is older than the other candidate web documents, because a user is more likely to interact with the candidate web document than the other candidate web documents. A web document included in a first set of candidate web documents may have a higher candidate web document density value but a lower probability value than a web document in a second set of candidate web documents if it happens that the other web documents in the first set of candidate web documents have relatively higher candidate web document density values than those in the second set of candidate web documents. The purpose of converting the candidate web document density values to probability values is to maintain uniform boosting between users who can have very different interaction patterns. For example, some users of the search and feed service may be inclined to interact with a lot of cards associated with web document, while others interact with very few. Using probability values ensures that a boost assigned to a candidate web document is properly scaled to the user's proclivity to interact. This ensures that the other signals used to rank a candidate web document are not over or under weighted just because a user interacts a lot of a little with presented cards associated with candidate web documents.

System Embodiments for Implementing a Search and Feed Service

FIG. 1 is a block diagram illustrating an overview of an architecture of a system for providing a search and feed service in accordance with some embodiments. In one embodiment, a search and feed service 102 is delivered via the Internet 120 and communicates with an application executed on a client device as further described below with respect to FIG. 1.

As shown, various user devices, such as a laptop computer 132, a desktop computer 134, a smart phone 136, and a tablet 138 (e.g., and/or various other types of client/end user computing devices) that can execute an application, which can interact with one or more cloud-based services, are in communication with Internet 120 to access various web services provided by different servers or appliances 110A, 110B, . . . , 110C (e.g., which can each serve one or more web services or other cloud-based services).

For example, web service providers or other cloud service providers (e.g., provided using web servers, application (app) servers, or other servers or appliances) can provide various online content, delivered via websites or other web services that can similarly be delivered via applications executed on client devices (e.g., web browsers or other applications (apps)). Examples of such web services include websites that provide online content, such as news websites (e.g., websites for the NY Times®, Wall Street Journal®, Washington Post®, and/or other news websites), social networking websites (e.g., Facebook®, Google®, LinkedIn®, Twitter®, or other social network websites), merchant websites (e.g., Amazon®, Walmart®, or other merchant websites), or any other websites provided via websites/web services (e.g., that provide access to online content or other web services).

In some cases, these web services are also accessible to other web services or apps via APIs, such as representational state transfer (REST) APIs or other APIs. In one embodiment, public or commercially available APIs for one or more web services can be utilized to access information associated with a user for identifying potential interests to the user and/or to search for potential online content of interest to the user in accordance with various disclosed techniques as will be further described below.

In some implementations, the search and feed service can be implemented on a computer server or appliance (e.g., or using a set of computer servers and/or appliances) or as a cloud service, such as using Amazon Web Services (AWS), Google Cloud Services, IBM Cloud Services, or other cloud service providers. For example, search and feed service 102 can be implemented on one or more computer servers or appliance devices or can be implemented as a cloud service, such as using Google Cloud Services or another cloud service provider for cloud-based computing and storage services.

For example, the search and feed service can be implemented using various components that are stored in memory or other computer storage and executed on a processor(s) to perform the disclosed operations such as further described below with respect to FIG. 2.

Figure 2:
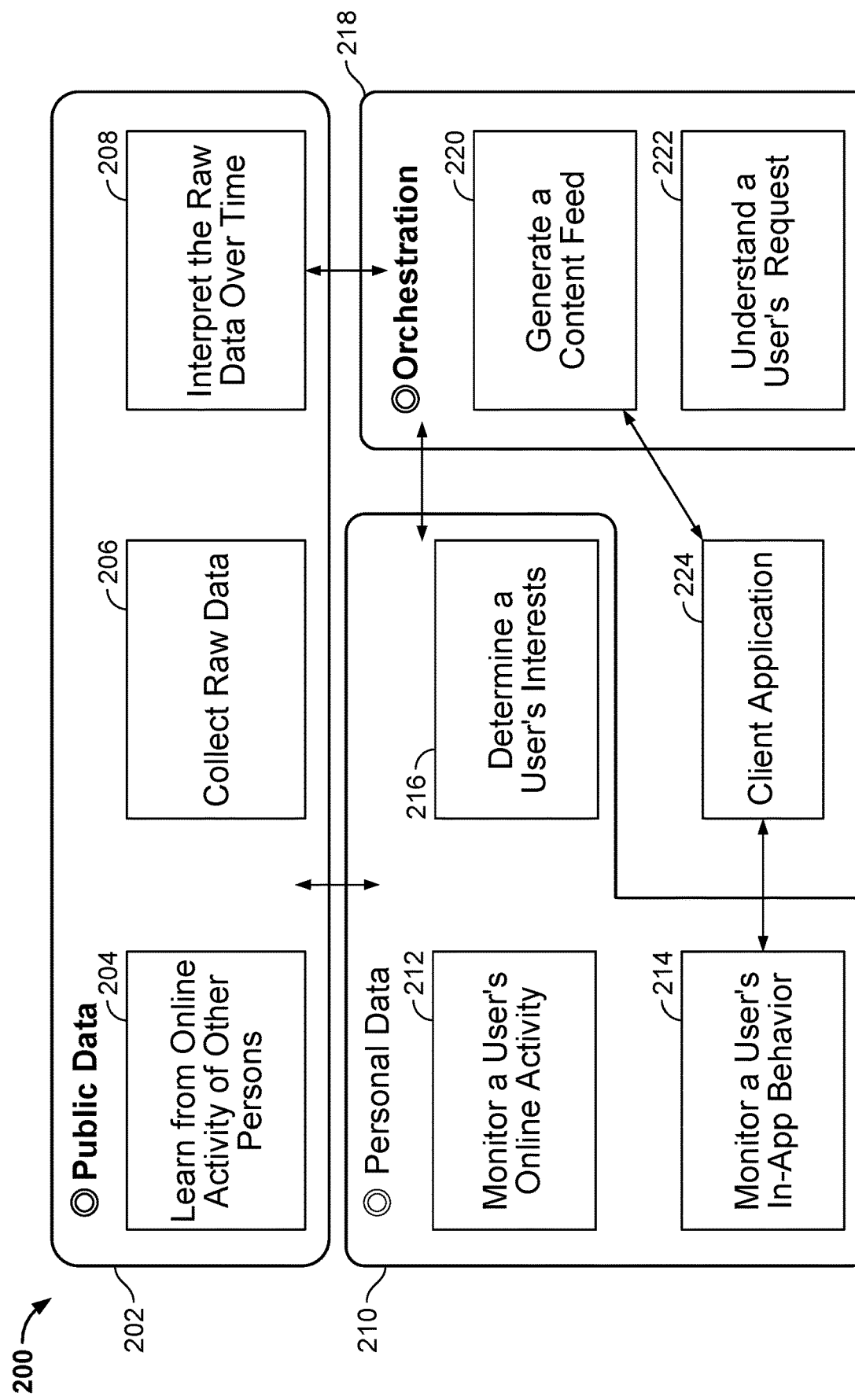
FIG. 2 is a block diagram illustrating a search and feed system in accordance with some embodiments.

FIG. 2 is a block diagram illustrating a search and feed system in accordance with some embodiments. In one embodiment, a search and feed system 200 includes components that are stored in memory or other computer storage and executed on a processor(s) for performing the disclosed techniques implementing the search and feed system as further described herein. For example, search and feed system 200 can provide an implementation of search and feed service 102 described above with respect to FIG. 1.

As shown in FIG. 2, search and feed system 200 includes a public data set of components 202 for collecting and processing public data, a personal data set of components 210 for collecting and processing personal data, and an orchestration set of components 218 for orchestrating searches and feed generation. Each of these components can interact with other components of the system to perform the disclosed techniques as shown and as further described below. As also shown in FIG. 2, a client application 224 is in communication with search and feed system 200 via orchestration component 218. For example, the client application can be implemented as an app for a smart phone or tablet (e.g., an Android®, iOS® app, or an app for another operating system (OS) platform) or an app for another computing device (e.g., a Windows® app or an app for another OS platform, such as a smart TV or other home/office computing device).

In one embodiment, public data set of components 202 for collecting and processing public data includes a component 204 that learns from online activity of other persons. As also shown in FIG. 2, public data set of components 202 includes a component 206 that collects raw data (e.g., online content from various web services) and a component 208 that interprets the raw data over time. Each of the public data set of components 202 will be further described below.

In one embodiment, personal data set of components 210 for processing personal data includes a component 212 that monitors a user's online activity and a component 214 that monitors a user's in-app behavior (e.g., monitors a user's activity within/while using the app, such as client application 224). As also shown in FIG. 2, personal data set of components 210 includes a component 216 that determines a user's interests (e.g., learns a user's interests). Each of the personal data set of components 210 will be further described below.

In one embodiment, orchestration set of components 218 for orchestrating searches and feed generation includes a component 220 that generates a content feed (e.g., based on a user's interests). As also shown in FIG. 2, orchestration set of components 218 includes a component 222 that processes and understands a user's request(s). Each of the orchestration set of components 218 will be further described below.

Another embodiment for implementing the components of the search and feed service to perform the disclosed operations is described below with respect to FIG. 3.

Figure 3:
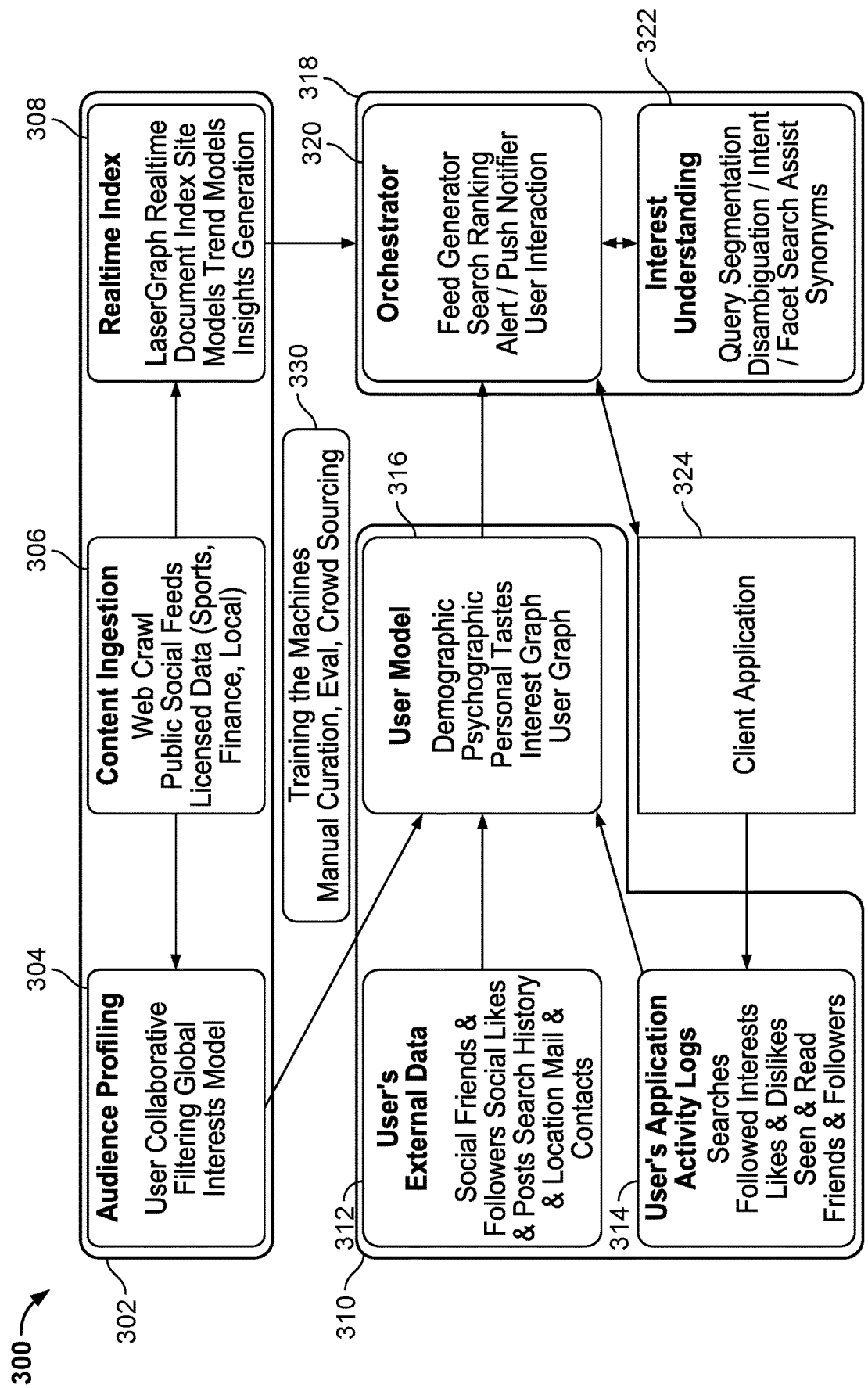
FIG. 3 is another block diagram illustrating a search and feed system in accordance with some embodiments.

FIG. 3 is another block diagram illustrating a search and feed system in accordance with some embodiments. In one embodiment, a search and feed system 300 includes components that are stored in memory or other computer storage and executed on a processor(s) for performing the disclosed techniques implementing the search and feed system as further described herein. For example, search and feed system 300 can provide an implementation of search and feed service 102 described above with respect to FIG. 1 and search and feed system 200 described above with respect to FIG. 2.

As shown in FIG. 3, search and feed system 300 includes a public data set of components 302 for collecting and processing public data, a personal data set of components 310 for collecting and processing personal data, an orchestration set of components 318 for orchestrating searches and feed generation, and a machine learning component 330 for training the machines. Each of these components can interact with one or more of the other components of the system to perform the disclosed techniques as shown and as further described below. As also shown in FIG. 3, a client application 324 is in communication with search and feed system 300 via orchestration component 318. For example, the client application can be implemented as an app for a smart phone or tablet (e.g., an Android®, iOS® app, or an app for another operating system (OS) platform) or an app for another computing device (e.g., a Windows® app or an app for another OS platform, such as a smart TV or other home/office computing device) as similarly described above.

In one embodiment, public data set of components 302 include an audience profiling component 304 that learns from online activity associated with other persons implemented using various subcomponents including user collaborative filtering and a global interests model as further described below. As also shown in FIG. 3, components 302 include a content ingestion component 306 that collects raw data (e.g., online content from various web services) using web crawlers to crawl websites and public social feeds (e.g., public social feeds of users from Facebook, LinkedIn, and/or Twitter), and licensed data (e.g., licensed data from sports, finance, local, and/or news feeds, and/or licensed data feeds from other sources including social networking sites such as LinkedIn and/or Twitter). As also shown, components 302 include a realtime index component 308 that interprets the raw data over time using and/or generating and updating various subcomponents including a LaserGraph, a Realtime Document Index (RDI), site models, trend models, and insights generation as further described below. Each of the components and respective subcomponents of public data set of components 302 will be further described below.

In one embodiment, personal data set of components 310 include a user's external data component 312 that monitors a user's online activity including, for example, social friends and followers, social likes and posts, search history and location, and/or mail and contacts (e.g., based on public access and/or user authorized access privileges granted to the app/service). As also shown in FIG. 3, components 310 include a user's application activity logs component 314 that logs their in-app behavior (e.g., logs a user's monitored activity within/while using the app, such as client application 324) including, for example, searches, followed interests, likes and dislikes, seen and read, and/or friends and followers. As also shown, components 310 include a user model component 316 that learns a user's interests based on, for example, demographic information, psychographic information, personal tastes (e.g., user preferences), an interest graph, and a user graph. Each of the components and respective subcomponents of personal data set of components 310 will be further described below.

In one embodiment, orchestration set of components 318 include an orchestrator component 320 that composes a feed (e.g., generates a content feed based on the user's interests and results of documents that match the user's interests) using a feed generator based on a search ranking that can be determined based on a document score and a user signal (e.g., based on monitored user activity and user feedback) and can also utilize an alert/push notifier (e.g., to push content/the content feed and alert the user of new content being available and/or pushed to the user's client app). As also shown in FIG. 3, components 318 include an interest understanding component 322 that processes and understands a user's request(s) based on, for example, query segmentation, disambiguation/intent/facet, search assist, and synonyms. Each of the components and respective subcomponents of orchestration set of components 318 will be further described below.

In an example implementation, various of the components of the search and feed system can be implemented using open source or commercially available solutions (e.g., the realtime index can be implemented with underlying storage as Cloud Bigtable using Google's NoSQL Big Data database service provided by the Google Cloud Platform) and various other components of the search and feed system (e.g., orchestrator component 320, interest understanding component 322, and/or other components) can be implemented using a high-level programming language, such as Go, C, Java, or another high-level programming language or scripting language, such as JavaScript or another scripting language. In some implementations, one or more of these components can be performed by another device or components such that the public data set of components 302, private data set of components 310, and the orchestration set of components 318 (e.g., and/or respective subcomponents) can be performed using another device or components, which can provide respective input to the search and feed system. As another example implementation, various components can be implemented as a common component, and/or various other components or other modular designs can be similarly implemented to provide the disclosed techniques for the search and feed system.

As further described below, various components can be implemented and various processes can be performed using the search and feed system/service to implement the various search and feed system techniques as further described below.

User Interest Modeling Embodiments

Figure 4A:
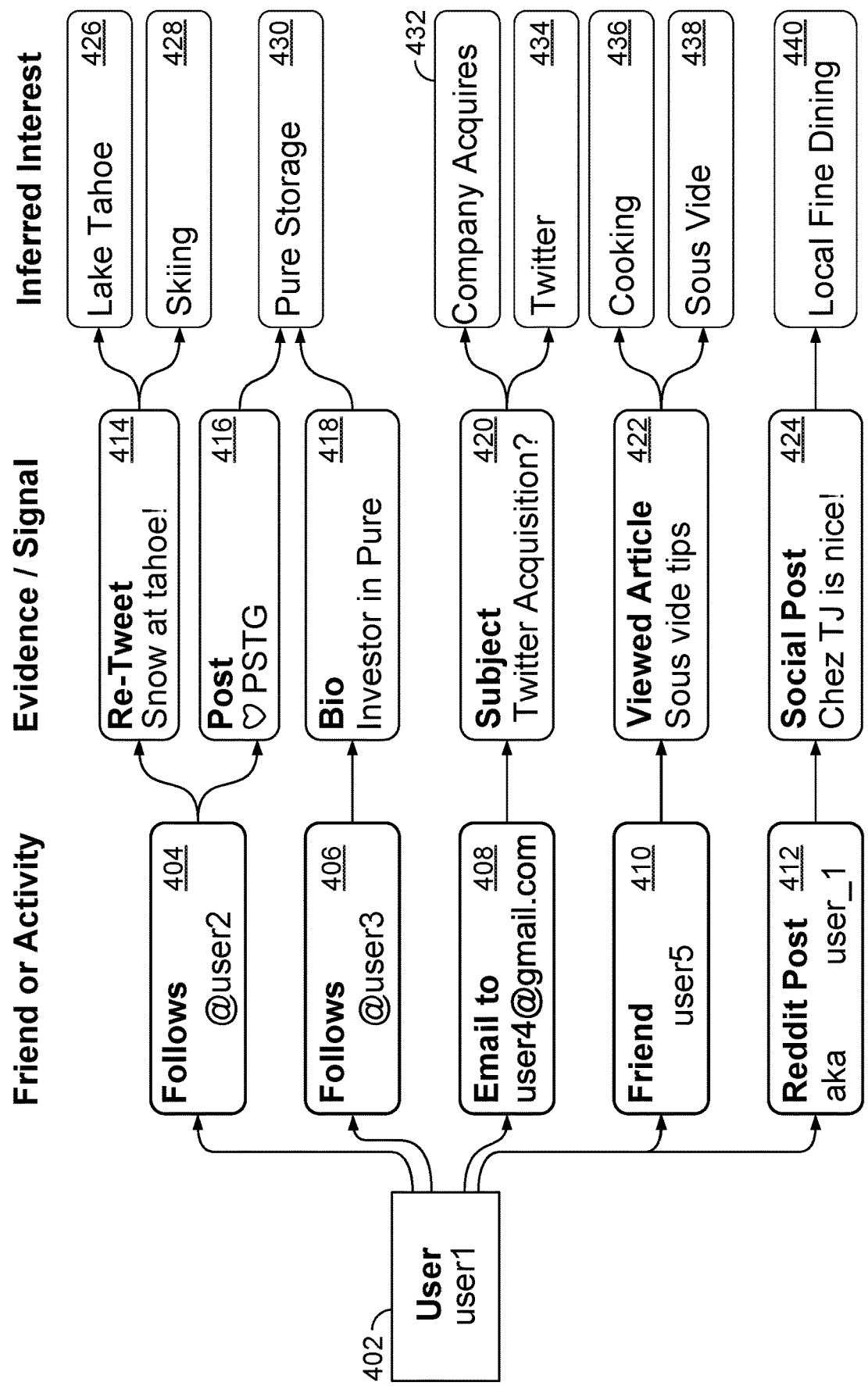
FIG. 4A is an example of online content associated with a user account associated with a user in accordance with some embodiments.

FIG. 4A is an example of online content associated with a user account associated with a user in accordance with some embodiments. Examples of online content (i.e., web documents associated with a user) include a social media account (e.g., a Twitter® account, a Facebook® account, a Google® account, a LinkedIn® account, etc.), a personal blog site (e.g., Tumbler®), search query history, Internet history, etc.

In the example shown, a user is associated with a user account 402 "user1." User account 402 is associated with Twitter® account 404 "@user2" and Twitter® account 406 because user account 402 has followed those Twitter® accounts. User account 402 is associated with email account 408 because user account 402 has sent an email to email account 408. User account 402 is associated with Facebook® account 410 because user account 402 is friends with Facebook® account 410 on Facebook®. User account 402 is associated with Reddit® account 412 because Reddit® account 412 is the user's Reddit® account. One or more online accounts associated with user account 402 can be determined after the application receives OAuth information or any other information associated with an authorization standard, from the user.

One or more interests associated with user account 402 can be determined from the online content associated with user account 402. The online content includes text-based information, such as text information associated with the user's one or more social media accounts, text information associated with one or more social media accounts of one or more other users associated with the user account, text information associated with one or more online activities associated with the user account, or text information associated with one or more online activities associated with the one or more other users associated with the user account.

In the example shown, Twitter® account 404 has re-tweeted a tweet 414 and posted a post 416. Based on the text information of tweet 414, it can be determined that Twitter® account 404 has an interest 426 in Lake Tahoe. Since user account 402 is associated with Twitter® account 404, it can be determined that user account 402 also has an interest 426 in Lake Tahoe. Based on the text information of post 416, it can be determined that Twitter® account 404 has an interest 428 in skiing. Since user account 402 is associated with Twitter® account 404, it can be determined that user account 402 also has an interest 428 in skiing.

In the example shown, Twitter® account 406 has bio information 418. Based on the text information of bio information 418, it can be determined that Twitter® account 406 has an interest 430 in Pure Storage®. Since user account 402 is associated with Twitter® account 406, it can be determined that user account 402 also has an interest 430 in Pure Storage®.

In the example shown, user account 402 has sent an email to email account 408. The email includes a subject header 420. Based on the text information of subject header 420, it can be determined that email account 408 has an interest 432 in company acquires and/or an interest 434 in Twitter®. Since user account 402 is associated with email account 408, it can be determined that user account 402 also has an interest 432 in company acquires and/or an interest 434 in Twitter®.

In the example shown, user account 402 is friends with Facebook® account 410 on Facebook®. A user associated with Facebook® account 410 has viewed an article 422. Based on the text information of article 422, it can be determined that Facebook® account 410 has an interest 436 in cooking and/or an interest 438 in sous vide. Since user account 402 is associated with Facebook® account 410, it can be determined that user account 402 also has an interest 436 in cooking and/or an interest 438 in sous vide.

In the example shown, user account 402 is associated with Reddit® account 412. The user of Reddit® account 412, i.e., the user of user account 402, has posted a post 424 on Reddit®. Based on the text information of post 424, it can be determined that Reddit® account 412 has an interest 440 in local fine dining. Since user account 402 is associated with Reddit® account 412, it can be determined that user account 402 also has an interest 440 in local fine dining.

Figure 4B:
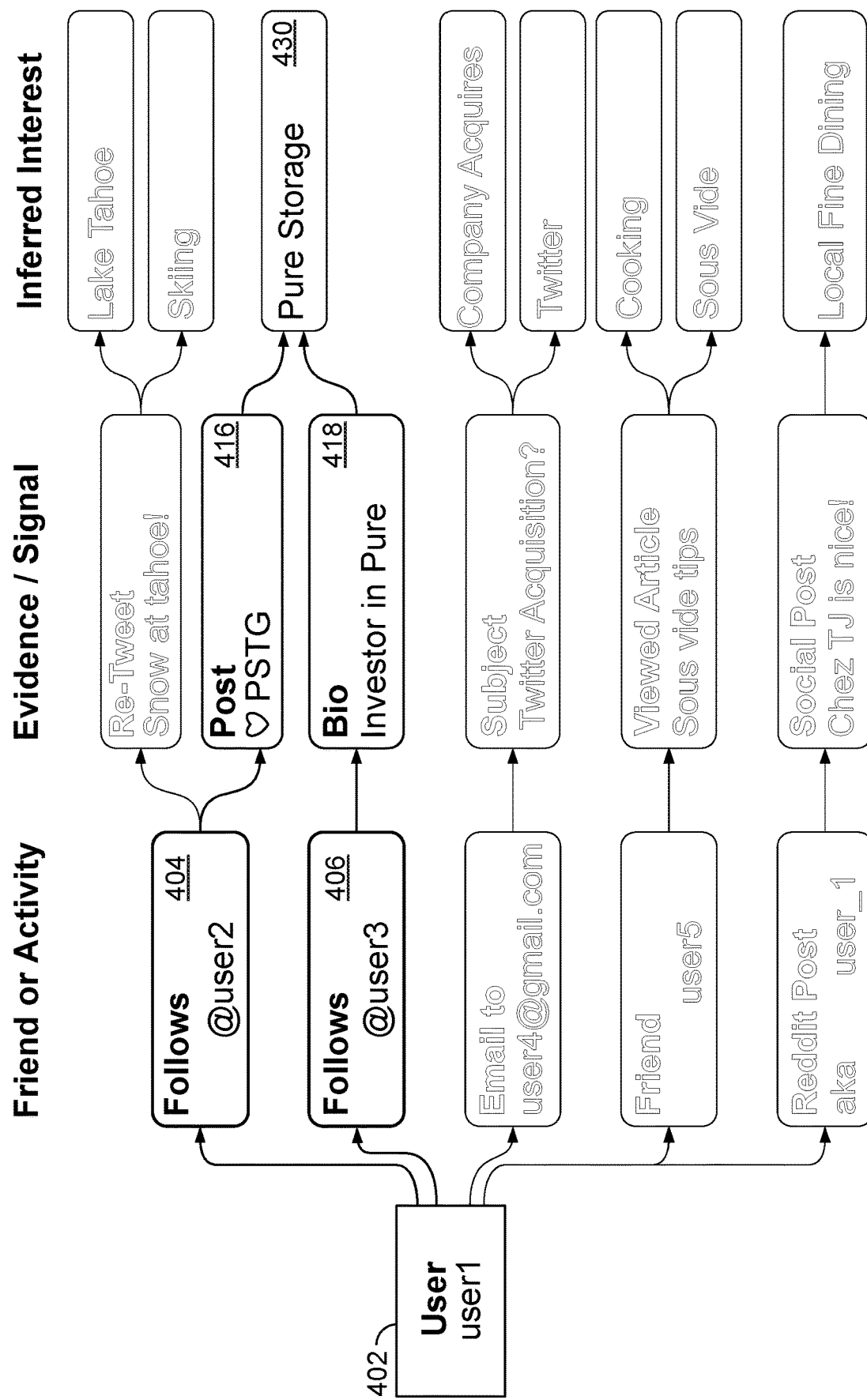
FIG. 4B is an example of a cross-referenced interest in accordance with some embodiments.

FIG. 4B is an example of a cross-referenced interest in accordance with some embodiments. A cross-referenced interest is an interest that is associated with a user account and one or more other user accounts or an interest that is associated with at least two of the one or more other user accounts. In the example shown, user account 402 is associated with Twitter® account 404 and Twitter® account 406. Both Twitter® accounts 404, 406 are associated with text-based information that indicates a common interest 430 in Pure Storage®. In some embodiments, an endorsement score associated with an interest is increased when an interest is cross-referenced.

Figure 5:
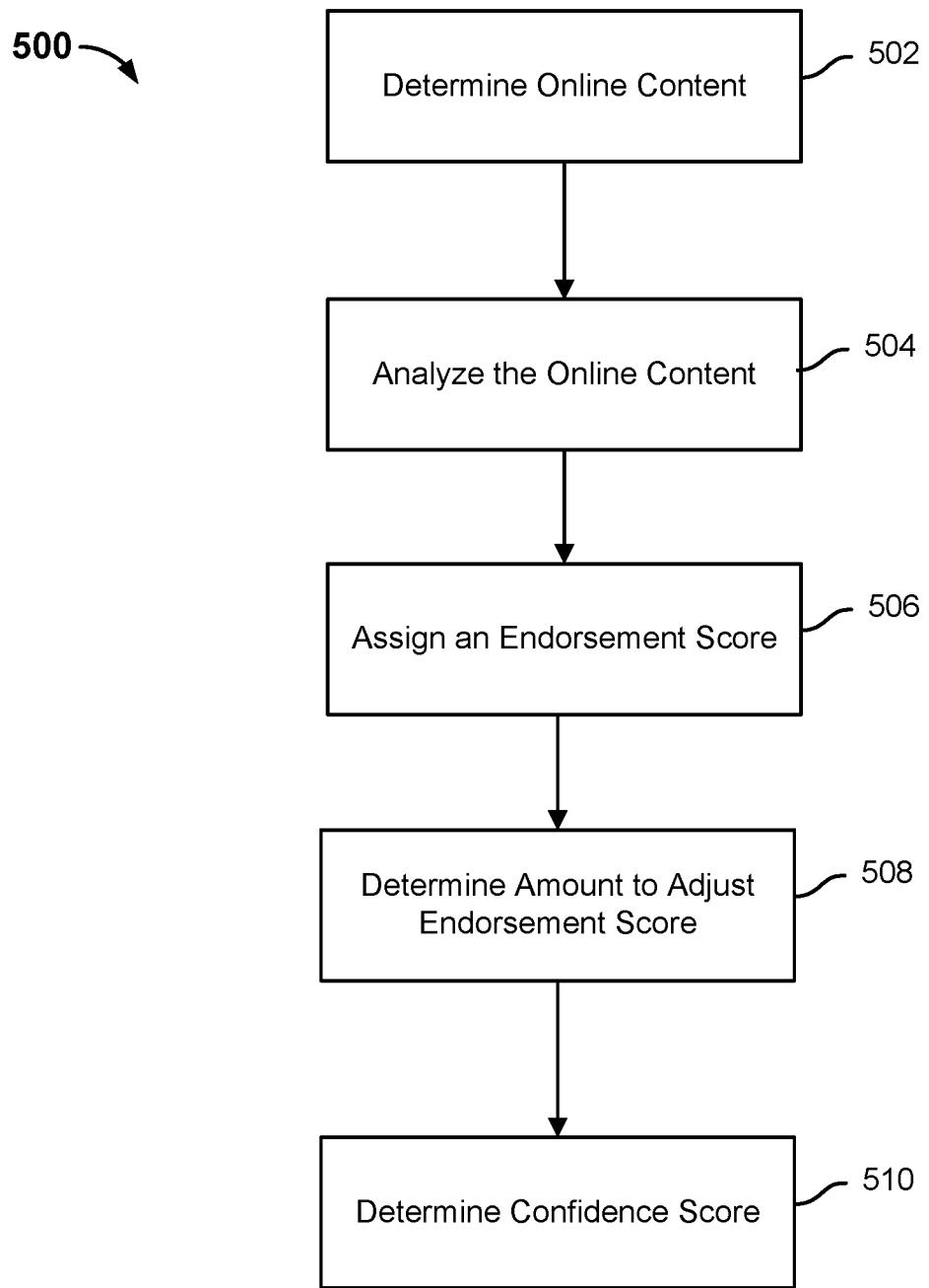
FIG. 5 is a flow diagram illustrating a process for modeling user interests in accordance with some embodiments.

FIG. 5 is a flow diagram illustrating a process for modeling user interests in accordance with some embodiments. Process 500 may be implemented on a search and feed service, such as search and feed service 102. At 502, online content associated with a user account associated with a user is determined (i.e., web documents associated with a user). In some embodiments, the online content includes text-based information that includes at least one of text information associated with the user's one or more online accounts, text information associated with one or more online accounts of one or more other users associated with the user account, text information associated with one or more online activities associated with the user account, or text information associated with one or more online activities associated with the one or more users associated with the user account.

At 504, the online content is analyzed to determine a plurality of interests associated with the user account. In some embodiments, text-based information associated with the online content is analyzed. An instance of text-based information is comprised of one or more words. Each word and/or combination of words of the instance is assigned a score that reflects the importance of the word/combination of words with respect to the instance of text-based information. For example, each word/combination of words can be assigned a term-frequency-inverse document frequency (TF-IDF) value. In some cases, the online content includes an embedded link. The text-based information associated with the embedded link is also analyzed. For example, online content may include an embedded link to a news article. Text-based information associated with the news article is analyzed. Each word/combination of words within the news article can be assigned a term-frequency-inverse document frequency (TF-IDF) value. In some embodiments, the score is normalized to a value between 0 and 1. A word/combination of words with a score above a threshold value is determined to be an interest associated with the user account.

In other embodiments, metadata or meta keywords associated with the online content is analyzed to determine a plurality of interests associated with the user account.

At 506, an endorsement score is assigned to each interest determined to be an interest associated with the user account. An interest associated with the user account can be determined to be an interest from a plurality of sources. For example, an online account associated with the user may share an article about a particular topic. An online account of one or more other users associated with the user account may post a comment on social media about the particular topic. An analysis of the text-based information associated with the article and the comment provide a score to each of the words/combination of words in the article and the comment. The words/combination of words with scores above a threshold value can be determined to be an interest associated with the user account.

In some embodiments, the scores for a particular word/combination of words from each source are aggregated to produce an endorsement score. For example, an endorsement score is assigned to interest 426 and interest 430. In the example shown, the endorsement score associated with interest 426 is produced from tweet 414. In contrast, the endorsement score associated with interest 430 is aggregated from a plurality of sources, i.e., post 416 and bio information 418.

In other embodiments, the word scores from each source are weighted based on the source of the word and aggregated to produce the endorsement score. For example, a word from the article shared by the user may be weighted with a higher value than the same word from the comment on social media posted by one or more other users associated with the user account. For example, the word from the article shared by the user may be given a weight of 1.0 and the same word from the comment on social media posted by one or more other users associated with the user account may be given a weight of 0.5. In some embodiments, an aggregated word score is capped, such that a word corresponding to an interest from multiple sources is capped at a maximum value.

At 508, an amount to adjust the endorsement score is determined. In some embodiments, an endorsement score of an interest can be adjusted by a particular amount based on user engagement with the content feed. In another embodiment, the endorsement score of an interest can be adjusted by a particular amount based on a similarity between a web document associated with the interest and a web document associated with a different interest. In another embodiment, the endorsement score of an interest can be adjusted by a particular amount based on a similarity between web documents associated with the interest and web documents associated with the different interest. In another embodiment, the endorsement score of an interest can also be adjusted by a particular amount based on user engagement with an interest on a website. For example, an interest may appear as a subreddit on the website Reddit® and have a particular number of subscribers to the subreddit. In another embodiment, the endorsement score of an interest can be also adjusted by a particular amount based on whether a topic associated with the interest is trending. In another embodiment, the endorsement score of an interest can also be adjusted by a particular amount based on meta keywords of a web document associated with the interest.

At 510, a confidence score is determined. The endorsement score and associated adjustment amounts (i.e., interest indicators) are provided to a machine learning model that is trained to output a confidence value that indicates whether an interest is relevant to the user. The machine learning model can be implemented using machine-learning based classifiers, such as neural networks, decision trees, support vector machines, etc. A training set of interests with corresponding endorsement scores and amounts to adjust the endorsement score are used as training data. The training data is sent to a machine learning model to adapt the classifier. For example, the weights of a neural network are adjusted to establish a model that receives an endorsement score and associated amounts to adjust the endorsement score and outputs a confidence value (e.g., a number between 0 and 1) that indicates whether an interest is relevant to the user.

Interests having a confidence value above a confidence threshold are determined to be interests that are relevant to a user. The plurality of interests are ranked based on the confidence score associated with each of the plurality of interests. An application is configured to generate a content feed for the user based on the confidence scores. For example, the content feed can include one or more web documents (e.g., articles, sponsored content, advertisements, social media posts, online video content, online audio content, etc.) that are associated with the plurality of ranked interests. In some embodiments, the content feed is comprised of one or more web documents that are associated with the plurality of interests with a confidence score above a certain threshold. In some embodiments, the certain threshold can be a threshold confidence score, a top percentage of interests (e.g., top 10%), a top tier of interests (e.g., top 20 interests), etc.

Figure 6:
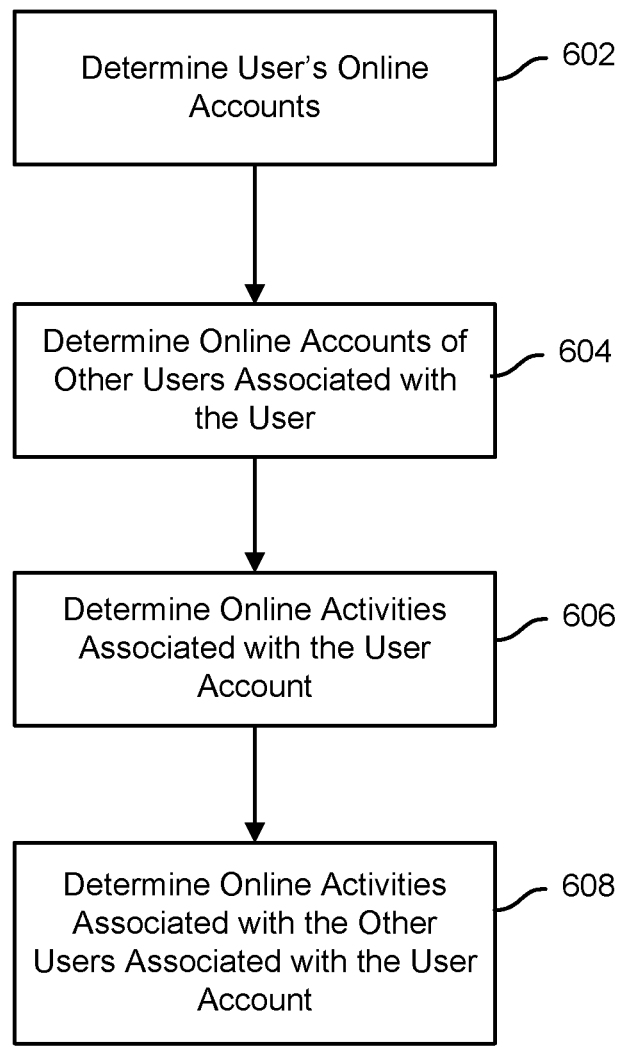
FIG. 6 is a flow diagram illustrating a process for determining online content associated with a user account associated with a user in accordance with some embodiments.

FIG. 6 is a flow diagram illustrating a process for determining online content associated with a user account associated with a user in accordance with some embodiments. In some embodiments, process 600 can be used to perform part or all of step 502.

At 602, one or more online user accounts of the user are determined. For example, a user can have one or more social media accounts, one or more email accounts, one or more blogging sites, etc. The one or more online user accounts associated with the user can be accessed using OAuth or another authorization standard to allow the system to determine the user's online activities associated with such online user accounts as further described below.

At 604, one or more online accounts of other users associated with the user account are determined. For example, a user may be "friends," "follow" other users, or be "followed" on a social media platform. A "friend" or a "follower/followee" on a social media platform can be determined to be an online account of another user that is associated with the user account. One or more online accounts of other users associated with the user account can be determined from an address or contact file. One or more online accounts of other users associated with the user account can be determined if the user interacts with their online accounts.

At 606, one or more online activities associated with the user account are determined. For example, a user can post a comment on a social media account, share an article via social media, email a contact, attach a file (e.g., image file, audio file, or video file) to an email, include a file (e.g., image file, audio file, or video file) in an online posting, perform a search query, visit a particular website, etc.

At 608, one or more online activities associated with the one or more online accounts of other users associated with the user account are determined. For example, the one or more other users can post a comment on a social media account, share an article via social media, email a contact, attach a file (e.g., image file, audio file, or video file) to an email, include a file (e.g., image file, audio file, or video file) in an online posting, perform a search query, visit a particular website, etc.

For example, the above-described process can be performed to allow the system to generate a user interest graph, such as the example of online content associated with a user account associated with a user as shown in FIG. 4A.

Figure 7:
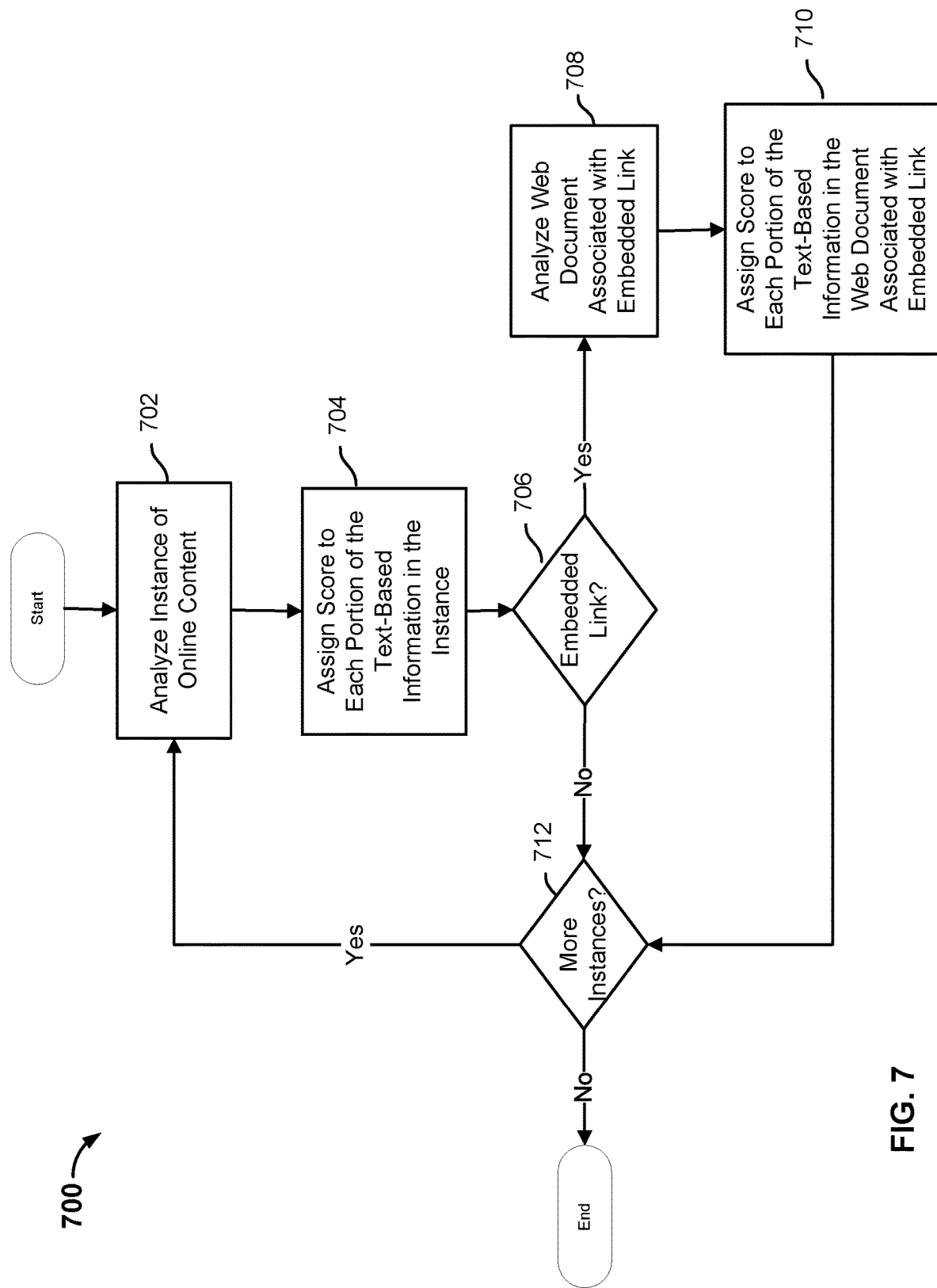
FIG. 7 is a flow diagram illustrating a process for analyzing online content in accordance with some embodiments.

FIG. 7 is a flow diagram illustrating an embodiment of a process for analyzing online content in accordance with some embodiments. In some embodiments, process 700 can be used to perform part or all of step 504.

At 702, an instance of online content is analyzed. In some embodiments, the online content includes text-based information. Text-based information can include one or more words, one or more hashtags, one or more emojis, one or more acronyms, one or more abbreviations, an embedded link, metadata, etc. The text-based information can be broken down into individual parts or phrases. For example, a comment on social media may be a long paragraph. Portions of the comment can be broken down into individual words while other portions of the comment can be grouped together, e.g., a phrase or slogan. In other embodiments, the online content includes non-text-based information, such as an image file, an audio file, or a video file.

At 704, a score is assigned to each portion of the text-based information in the instance. In some embodiments, the score is based on a location of a portion of the text-based information in the instance. For example, a portion of text-based information may be given a higher score or a higher weight if it appears at the top portion of an article than the same portion of text-based information would be given if it appeared at the bottom portion of the article. In other embodiments, the score is based on a term frequency-inverse document frequency value. In other embodiments, the score is based on a combination of a location of a portion of the text-based information in the instance and the term frequency-inverse document frequency value for that portion.

At 706, it is determined whether an embedded link is included in the text-based information. In the event an embedded link is included in the text-based information, the process proceeds to step 708. In the event an embedded link is not included in the text-based information, the process proceeds to step 712.

At 708, the web document associated with the embedded link is analyzed. In some embodiments, the web document associated with the embedded link includes text-based information. The text-based information can be broken down into individual parts or phrases. Portions of the comment can be broken down into individual words while other portions of the comment can be grouped together, e.g., a phrase or entity name. In other embodiments, the online content includes non-text-based information, such as an image file, an audio file, or a video file.

At 710, a score is assigned to each portion of the text-based information in the web document associated with the embedded link. In some embodiments, the score is based on a location of a portion of the text-based information in the instance. For example, a portion of text-based information may be given a higher score or a higher weight if it appears at the top portion of an article associated with the embedded link than the same portion of text-based information would be given if it appeared at the bottom portion of the article associated with the embedded link. In other embodiments, the score is based on a term frequency-inverse document frequency value. In other embodiments, the score is based on a combination of a location of a portion of the text-based information in the instance and the term frequency-inverse document frequency value for that portion.

At 712, it is determined whether there are more instances of online content. In the event there are more instances of online content, the process proceeds to step 702. In the event there are no more instances of online content, the process ends.

Figure 8B:
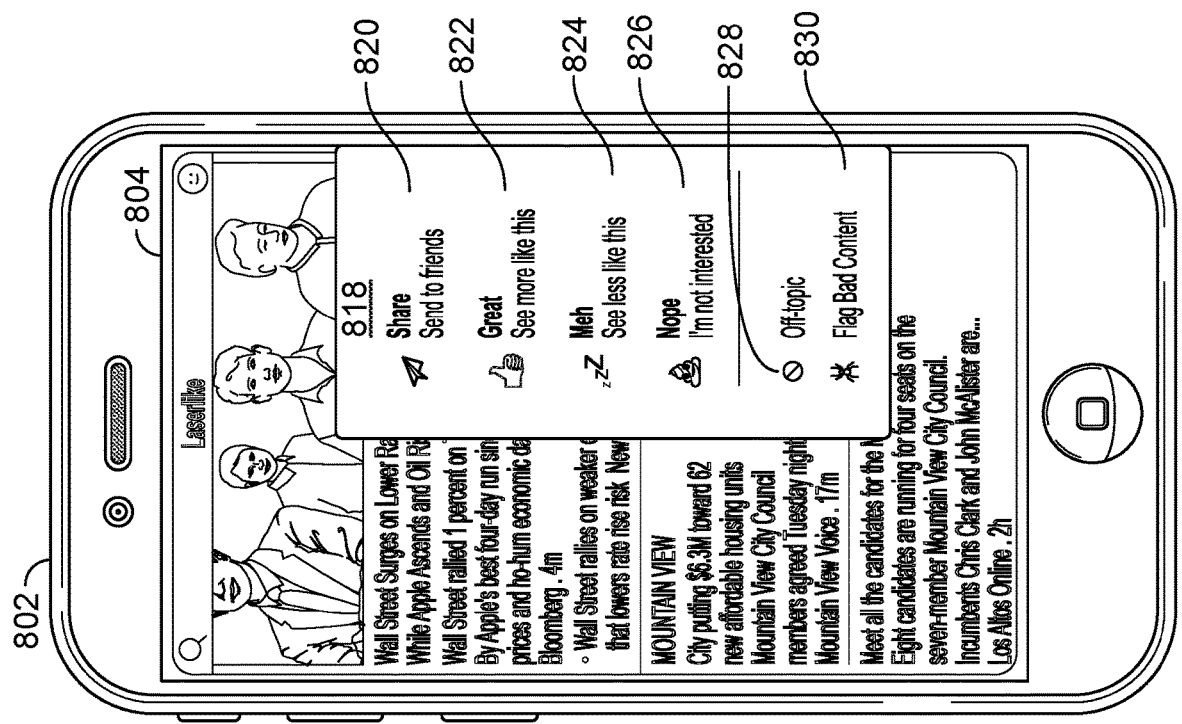
FIG. 8B is another diagram illustrating a user interface of a client application of a system for providing a content feed in accordance with some embodiments.
Figure 8A:
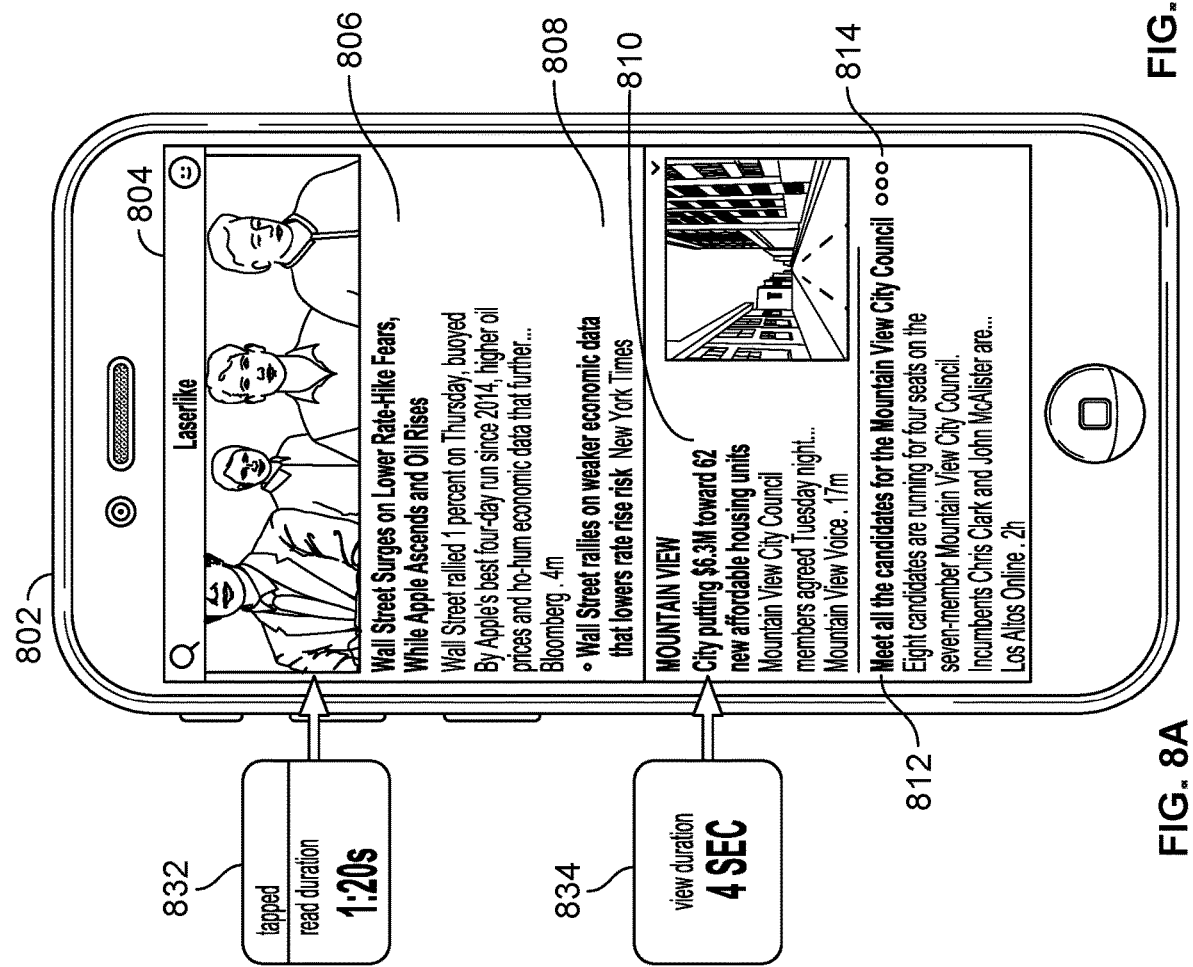
FIG. 8A is a diagram illustrating a user interface of a client application of a system for providing a content feed in accordance with some embodiments.

FIG. 8A is a diagram illustrating a user interface of a client application of a system for providing a content feed in accordance with some embodiments. In the example shown, the system can be implemented on device 802. In some embodiments, device 802 can be either device 132, device 134, device 136, or device 138. In the example shown, an application, such as application 224, is running on device 802, and configured to provide a content feed to a user. The content feed is comprised of one or more cards that include web documents (e.g., or excerpts of web documents that can be selected to view the entire web document) and/or synthesized content and is based on a user model, such as user model 316, which is tailored to a user account, such as user account 402. For example, a web document can be an article, sponsored content, an advertisement, a social media post, online video content (e.g., embedded video file), online audio content (e.g., embedded audio file), etc.

In the example shown, content feed 804 includes web documents 806, 808, 810, and 812. Each web document is associated with a determined interest associated with a user. Each determined interest has a corresponding endorsement score. In some embodiments, a web document is provided in content feed 804 in the event the corresponding endorsement score is above a certain threshold. In some embodiments, the certain threshold can be a threshold endorsement score, a top percentage of interests (e.g., top 10%), a top tier of interests (e.g., top 20 interests), etc.

In some embodiments, content feed 804 can include a plurality of documents for a particular interest. Content feed 804 can include multiple versions of a topic associated with an interest. For example, web document 806 is from a first source and web document 808 is from a second source, but both web documents are about the same topic.

Content feed 804 can also include multiple web documents that correspond to a particular interest. For example, web document 810 and web document 812 both correspond to an interest of "Mountain View," but are about different topics associated with the interest of "Mountain View."

The application is configured to provide user feedback to a user interest model based on user engagement with content feed 804. User engagement can be implicit, explicit, or a combination of implicit and explicit user engagement, such as further described below.

In some embodiments, implicit user engagement can be based on a duration that a web document appears in the content feed. In the example shown, web document 806 has an associated user engagement 832 that indicates after the user selected (e.g., clicked or "tapped") the article, the user read the web document for a duration of 1.2 seconds and web document 810 has an associated user engagement 834 that indicates the user viewed the web document in the content feed for a duration of four seconds.

A user's source preference can also be implicitly determined from the user engagement. In the example shown, web document 806 and web document 808 are different versions of a topic associated with an interest. Each web document has a corresponding source. Even though both web documents provide information about the same topic, based on whether a user selects web document 806 or web document 808, a user source preference can be determined. For example, web documents 806, 808 are about a topic in Wall Street. Web document 806 may be from Bloomberg® and web document 808 may be from the New York Times®. Depending upon which web document is selected by the user, a source preference can be determined. This user feedback can be provided to the user interest model.

A web document depicted content feed 804 includes an option menu link 814 that when selected, allows a user to provide explicit feedback about a web document.

In some embodiments, content feed 804 can include one or more web documents that are similar to an entity included in a query. A user may initiate a query by selecting a query icon 836 included in the application. The query may be comprised of one or more words, a phrase, a question, or a sentence. The query may correspond to an entity. A web document that is included in content feed 804 may be determined based on a sim hash associated with an entity corresponding to the web document and a cosine similarity between a feature vector associated with the entity included in the query and a feature vector associated with the entity corresponding to the web document.

In some embodiments, a web document may be returned for a query in the event the entity included in the query has the same sim hash as the entity corresponding to the web document. In some embodiments, a web document may be returned for a query in the event the entity included in the query has the same sim hash as the entity corresponding to the web document and has a cosine similarity score that is greater than or equal to a cosine similarity threshold. In some embodiments, a web document may be returned for a query in the event the entity included in the query has a sim hash that is one or more bits different (e.g., fewer than a threshold number of bits, such as two) than the sim hash of the entity corresponding to the web document. In some embodiments, a web document may be returned for a query in the event the entity included in the query has a sim hash that is one or more bits different (e.g., fewer than a threshold number of bits, such as two) than the sim hash of the entity corresponding to the web document and has a cosine similarity score that is greater than or equal to a cosine similarity threshold.

FIG. 8B is another diagram illustrating a user interface of a client application of a system for providing a content feed in accordance with some embodiments. In the example shown, the system can be implemented on device 802. In some embodiments, device 802 can be either device 132, device 134, device 136, or device 138. In the example shown, the application, such as application 224, is running on device 802, and configured to provide a content feed to a user.

In the example shown, a user has selected option menu link 814. In response to the selection, the application generating content feed 804 is configured to render option menu 818. Option menu 818 provides a user with one or more options to provide explicit feedback about a particular web document. In the example shown, a user can share 820 the web document to a social media account associated with the user, a social media account associated with another user, to an email account associated with the user, or an email account associated with another user. A user can also provide reaction feedback 822, 824, 826, such as "great" (e.g., "see more like this"), "meh" (e.g., "see less like this"), and "nope" (e.g., "I'm not interested") respectively, about the content of the web document. A user can also provide feedback 828, 830 about the web document in general, such as to provide user feedback to the app/system that the web document is off-topic from an interest or the web document includes bad content (e.g., a broken link or other bad content issues associated with the web document).

As will be further described below, the user feedback can be provided to a user interest model, which in response, can be used to adjust an endorsement score associated with a ranked interest.

Figure 9:
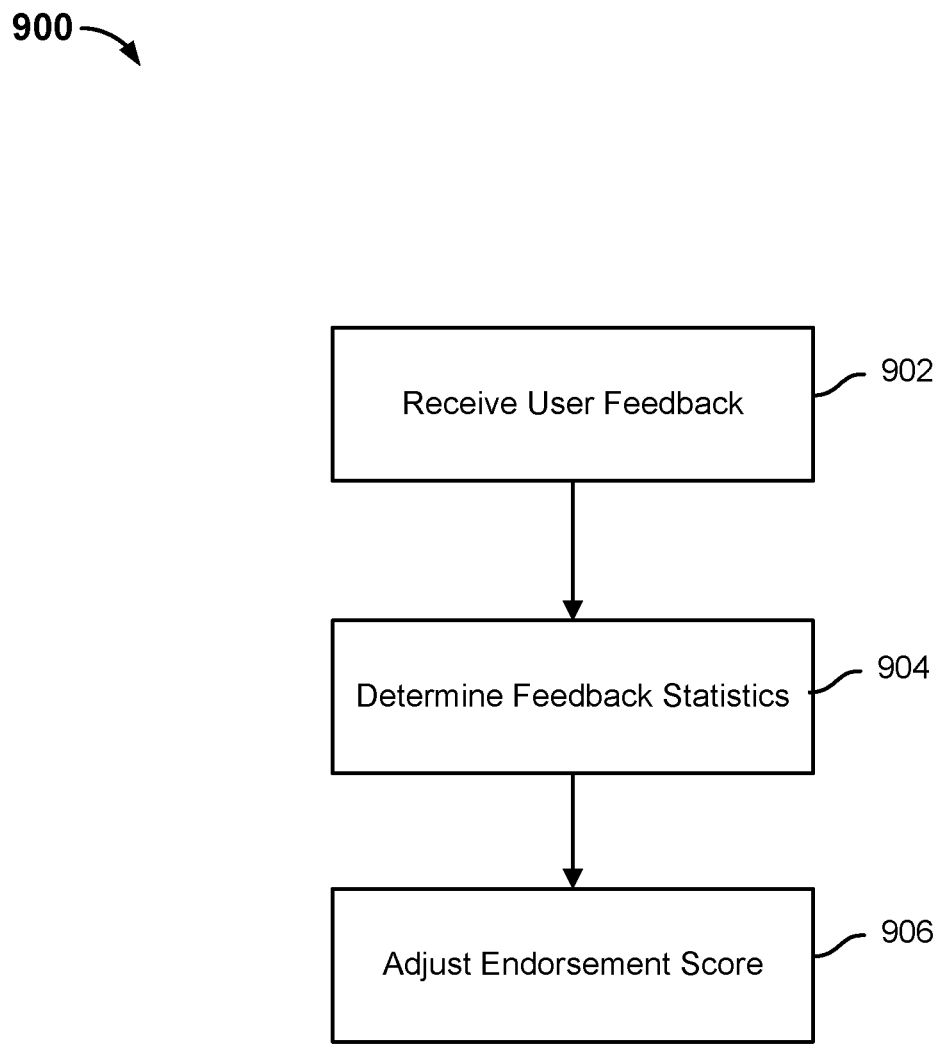
FIG. 9 is a flow diagram illustrating a process for adjusting a user model based on user feedback in accordance with some embodiments.

FIG. 9 is a flow diagram illustrating a process for adjusting a user model based on user feedback in accordance with some embodiments. Process 900 may be implemented in a user model, such as user model 316.

At 902, user feedback is received from an application providing a content feed. The user feedback can be implicit, explicit, or a combination of implicit and explicit feedback.

At 904, one or more feedback statistics are determined based on the user feedback. For a given interest, the user model can determine the number of web documents provided in the content feed for a particular interest, the number of times a user selected a web document provided in the content feed for a particular interest, a number of times a web document was uniquely provided in the content feed, and a number of times a user uniquely selected a web document. In an example implementation, a content feed includes a sequence of cards that include web documents (e.g., or excerpts of web documents that can be selected to view the entire web document) and/or synthesized content. A user can scroll through the sequence of cards from beginning to end. A user can scroll down through the sequence of cards or scroll up through the sequence of cards.

A web document is uniquely provided in the content feed in the event a web document is shown in the content feed only once. A web document is not uniquely provided in the content feed in the event a web document is shown in the content feed more than once. For example, a web document may be provided in the content feed and the user may scroll past the web document to view other web documents, thus causing the web document to no longer be visible in the content feed. The user may scroll back to the beginning of the content feed and see the web document a second time.

A user uniquely selects a web document in the event the user selects to view the web document provided in the content feed only once. A user does not uniquely select a web document in the event the user does not select to view the web document provided in the content feed or selects to view the web document provided in the content feed more than once.

In some embodiments, a tap rate associated with an interest can be determined. A tap rate is computed by the number of times a user selected a web document associated with the particular interest divided by the number of times a web document associated with the particular interest was provided in the content feed.

In other embodiments, a unique tap rate associated with an interest can be determined. A unique tap rate is computed by the number of times a web document was uniquely selected for a particular interest divided by the number of times a web document for the particular interest was uniquely provided in the content feed.

In other embodiments, a median viewing duration, a maximum viewing duration, a minimum viewing duration, and an average viewing duration can be determined for web documents appearing in the content feed for a particular interest. In other embodiments, a median reading duration, a maximum reading duration, a minimum reading duration, and an average reading duration can be determined for web documents associated with a web document that appeared in the content feed and was selected by the user.

At 906, an endorsement score associated with one or more interests is adjusted by a particular amount based on the one or more feedback statistics. The feedback statistics can be used to determine a probability that a user is interested in an interest. The probability that a user is interested in a particular interest can be used to increase or decrease an endorsement score associated with the particular interest by a particular amount.

Figure 10:
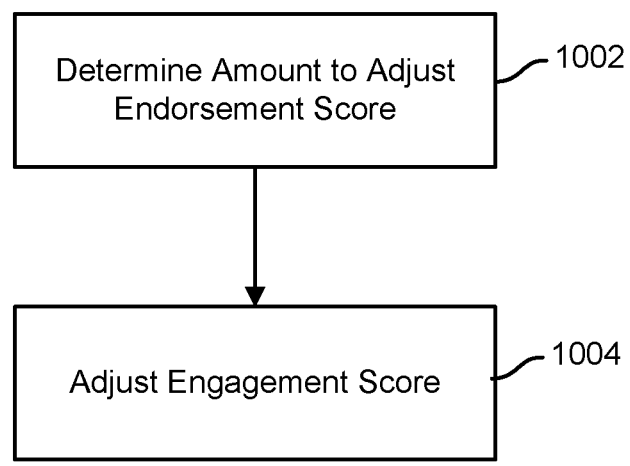
FIG. 10 is a flow diagram illustrating a process for adjusting the user model in accordance with some embodiments.

FIG. 10 is a flow diagram illustrating a process for adjusting the user model in accordance with some embodiments. Process 1000 may be implemented on a computing device, such as search and feed service 102.

At 1002, an amount to adjust an endorsement score is determined. In some embodiments, the endorsement score of an interest is adjusted to promote lower ranked interests that are similar to the top ranked interests. In some embodiments, the endorsement score of an interest is adjusted to promote lower ranked interests that are similar to the top tier of ranked interests.

In some embodiments, the endorsement scores of one or more interests can be adjusted by a particular amount based on by comparing a web document associated with a first interest with a web document associated with a second interest and determining the similarities between the web documents. In some embodiments, the endorsement scores of one or more interests can be adjusted by a particular amount based on comparing a set of web documents associated with a first interest and a set of web documents associated with a second interest and determining similarities between the sets of web documents. In some embodiments, an endorsement score of an interest can also be adjusted by a particular amount based on user engagement with an interest on a website. For example, an interest may appear as a subreddit on the website Reddit® and have a particular number of subscribers to the subreddit. In some embodiments, the endorsement scores of one or more interests can be adjusted by a particular amount based on whether a topic associated with an interest is trending or whether a topic associated with an interest related to an interest of the user is trending. In some embodiments, one or more interests can be re-ranked based on whether one or more meta keywords associated with a web document correspond to an interest.

At 1004, the engagement score of an interest is adjusted based on the determined amount. In some embodiments, the engagement score of an interest is adjusted based on whether a web document associated with the interest shares a threshold number of common links with a web document associated with a second interest. In other embodiments, the engagement score of an interest is adjusted based on whether the distance between a vector of the interest and a vector of another interest (e.g., in a 100 dimensional space) is less than or equal to the similarity threshold using the disclosed embedding related collaborative filtering techniques. In other embodiments, the engagement score of an interest is adjusted based on user engagement with an interest on a website. In other embodiments, the confidence score of an interest is adjusted based on whether a topic associated with the interest is trending. In other embodiments, the engagement score of an interest is adjusted based on whether meta keywords associated with a web document viewed by a user is similar to the interest.

Figure 11:
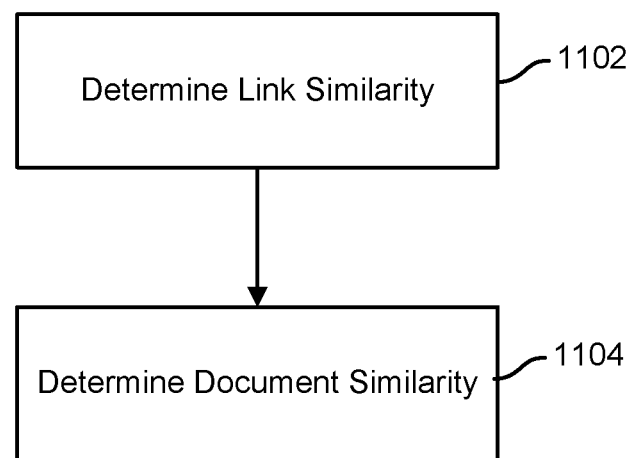
FIG. 11 is a flow diagram illustrating a process for determining a similarity between interests in accordance with some embodiments.

FIG. 11 is a flow diagram illustrating a process for determining a similarity between interests in accordance with some embodiments. Process 1100 may be implemented on a computing device, such as search and feed service 102. In some embodiments, process 1100 can be used to perform part or all of step 1002.

At 1102, a link similarity between two interests is determined. In some embodiments, a web document can include inlinks and outlinks. An inlink is an embedded link within a different web document that references the web document. An outlink is an embedded link within the web document that references a different web document. For example, a Wikipedia® page associated with an interest includes a number of inlinks and a number of outlinks. Within a particular Wikipedia® page, there may be one or more outlinks that reference another Wikipedia® page. There may also be one or more other Wikipedia® pages that reference the particular Wikipedia® page.

The one or more links of a web document associated with a first interest and the one or more links of a web document associated with a second interest are compared to determine link similarity between the interests. In the event a web document associated with a first interest shares a threshold number of common links with a web document associated with a second interest, the interests are determined to be similar. For example, a web document associated with a first interest can share a threshold number of common inlinks with a web document associated with a second interest. A web document associated with a first interest can share a threshold number of common outlinks with a web document associated with a second interest. A web document associated with a first interest can share a threshold number of common inlinks and a threshold number of common outlinks with a web document associated with a second interest.

In some embodiments, an endorsement score associated with a lower ranked interest can be increased by a particular amount in the event a web document associated with the lower ranked interest shares a threshold number of common links with a web document associated with a higher ranked interest. In some embodiments, an endorsement score associated with a lower ranked interest can be decreased by a particular amount in the event a web document associated with the lower ranked interest does not share a threshold number of common links with a web document associated with a higher ranked interest. In some embodiments, an endorsement score associated with a lower ranked interest is unchanged in the event a web document associated with the lower ranked interest does not share a threshold number of common links with a web document associated with a higher ranked interest.

At 1104, a document similarity between two interests is determined. The vast corpus of web documents on the World Wide Web is growing each day. Each of the web documents includes text-based information that describes the subject matter of a web document. A web document can reference one or more entities that correspond to one or more interests. If two interests are similar, then the number of web documents that refer to both interests is higher than if the two interests are dissimilar. For example, the number of web documents that refer to both "cat" and "dog" is higher than the number of web documents that refer to both "dog" and "surfing."

In some embodiments, to determine the common web documents between two interests, collaborative filtering techniques are applied. In some embodiments, an embedding related collaborative filtering technique is implemented as a matrix decomposition problem. In an example implementation, the collaborative filtering scheme represents all entities and all documents as a matrix. Given the vast number of web documents and the vast number of potential interests, an m×n matrix X (e.g., a co-occurrence matrix of dimensions m by n) can represent all the web documents and whether a particular web document is about a particular entity that corresponds to a particular interest. In some embodiments, each cell of the matrix includes a value that represents a ratio between the frequency of the entity in all web documents to the frequency of the entity in the particular web document. In other embodiments, each cell of the matrix includes a value that represents a confidence level for an entity in a particular web document. To reduce the amount of computation power needed to determine whether two interests share common web documents, the m×n matrix X can be represented as an m×k matrix U multiplied by a k×n matrix W, where k is a number. In some embodiments, k is a relatively small integer, such as 100. When k=100, each entity can be represented as a 100 dimensional space vector of web documents and each web document can be represented as a 100 dimensional space vector of entities (e.g., each entity can be embedded in the 100 dimensional space). The vector associated with each entity and the vector associated with each web document may be maintained in a database.

Depending upon the 100 dimensional space vectors selected, UW≠X, but instead UW=X'. In this example, U and W are computed such that the computed product of U multiplied by W equals X'. U and W are initially chosen at random (e.g., randomly selecting values from the original X matrix to populate the respective U and W matrices), and U and W are incrementally adjusted through several iterations (e.g., 1000, 5000, or some other number of iterations can be performed depending on, for example, the applied cost function and computing power applied to the operations) to minimize a differentiable cost function, such as the squared error of the values of X' compared to X. The solution of this operation can be described as a simultaneous calculation of a linear regression of the row matrix U given a known value of W and X and a linear regression of the column matrix W given a known value of U and X, which is often referred to as Alternate Least Squares (ALS). When the squared error between the X' and X are minimized, the entities represented in the co-occurrence matrix X are embedded in a 100 dimensional space and their location within that space is represented by a 100 dimensional space vector. As a result, a distance between two 100 dimensional space vectors can be determined to facilitate various embedded based comparison, similarity, and retrieval techniques described herein. In some embodiments, a Euclidean distance between the 100 dimensional space vectors is determined. For example, in the event the distance between two 100 dimensional space vectors is less than or equal to a document similarity threshold, the two interests are determined to be similar. In the event the distance between two 100 dimensional space vectors is greater than a document similarity threshold, the two interests are determined to be dissimilar. In some embodiments, an endorsement score associated with a lower ranked interest can be increased by a particular amount in the event the distance between the 100 dimensional space vector of the lower ranked interest and the 100 dimensional space vector of the higher ranked interest is less than or equal to the document similarity threshold. In some embodiments, an endorsement score associated with a lower ranked interest can be decreased by a particular amount in the event the distance between the 100 dimensional space vector of the lower ranked interest and the 100 dimensional space vector of the higher ranked interest is greater than the document similarity threshold. In some embodiments, an endorsement score associated with a lower ranked interest is unchanged in the event the distance between the 100 dimensional space vector of the lower ranked interest and the 100 dimensional space vector of the higher ranked interest is greater than the document similarity threshold. The particular amount can depend on the difference between the distance and the document similarly threshold.

In other embodiments, a dot product between the 100 dimensional space vectors can be used to determine if two interests are similar to each other. In the event the dot product between the two 100 dimensional space vectors is greater than or equal to a document similarity threshold, then the two interests are determined to be similar. In the event the dot product between two 100 dimensional space vectors is less than a document similarity threshold, then the two interests are determined to be dissimilar.

In some embodiments, an endorsement score associated with a lower ranked interest can be increased by a particular amount in the event the dot product between the 100 dimensional space vector of the lower ranked interest and the 100 dimensional space vector of the higher ranked interest is greater than or equal to the document similarity threshold. In some embodiments, an endorsement score associated with a lower ranked interest can be decreased by a particular amount in the event the dot product between the 100 dimensional space vector of the lower ranked interest and the 100 dimensional space vector of the higher ranked interest is less than the document similarity threshold. In some embodiments, an endorsement score associated with a lower ranked interest is unchanged in the event the dot product between the 100 dimensional space vector of the lower ranked interest and the 100 dimensional space vector of the higher ranked interest is less than the document similarity threshold. The particular amount can depend on the difference between the dot product and the document similarly threshold.

In some embodiments, a sim hash and a cosine similarity can be used to determine if two interests are similar to each other. Each vector in the m×n matrix X may be represented as a sim hash by applying a plurality of random hyperplanes to the vector. The random hyperplanes may be orthogonal hyperplanes. The elements of a vector correspond to a point in a vector space. A value (e.g., 0 or 1) may be assigned to a vector based on whether the point in vector space is above or below one of the random hyperplanes of the plurality of random hyperplanes. In some embodiments, vectors are determined to be similar in the event the vectors have the same corresponding sim hash. In other embodiments, vectors are determined to be similar in the event the vectors have the same corresponding sim hash and a cosine similarity score that is greater than or equal to a cosine similarity threshold. In some embodiments, vectors are determined to be similar in the event the sim hash associated with the vectors differ by one or more bits (e.g., fewer than a threshold number, such as two). In some embodiments, vectors are determined to be similar in the event the sim hash associated with the vectors differ by one or more bits (e.g., fewer than a threshold number, such as two) and a cosine similarity score between the vectors is greater than or equal to a cosine similarity threshold. Given the size of the m×n matrix X, merely computing the cosine similarity between a vector of the matrix X and each of the other vectors in matrix X may take a period of time that is inadequate for performing a query (e.g., minutes). The number of computations needed to determine similar entities may be reduced by determining a sim hash for each vector in the matrix X. Comparing sim hashes instead of computing a cosine similarity between vectors may reduce the number of computations needed to perform a query search.

For entities with the same sim hash, the similarity may be further increased by imposing a similarity threshold and determining entities to be similar to each other in the event the cosine similarity of the entities is greater than or equal to the cosine similarity threshold. This reduces the number of computations needed to determine whether two entities are similar because a cosine similarity is computed for a subset of the vectors included in the matrix X.

In some embodiments, a plurality of entities may have a corresponding sim hash that is one or more bits different (e.g., fewer than a threshold number, such as two) than the sim hash corresponding to the entity included in a query search. A multi probe search may be performed to find one or more entities that are similar to the entity included in the query search. The multi probe search may be performed by modifying one or more bits of the sim hash corresponding to the entity included in the query search and identifying one or more entities that have the modified sim hash. For the one or more entities with the modified sim hash, a cosine similarity score may be computed between the feature vectors associated with the one or more entities with the modified sim hash and the feature vector associated with the entity included in the query. The one or more entities with a cosine similarity score that is greater than or equal to a cosine similarity threshold may be returned and included in the content feed.

In some embodiments, an endorsement score associated with lower ranked interest can be increased by a particular amount in the event the cosine similarity between the 100 dimensional space vector of the lower ranked interest and 100 dimensional space vector of the higher ranked interest is greater than or equal to the cosine similarity threshold. In some embodiments, an endorsement score associated with lower ranked interest can be decreased by a particular amount in the event the cosine similarity between the 100 dimensional space vector of the lower ranked interest and 100 dimensional space vector of the higher ranked interest is less than the cosine similarity threshold. In some embodiments, an endorsement score associated with lower ranked interest is unchanged in the event the cosine similarity between the 100 dimensional space vector of the lower ranked interest and 100 dimensional space vector of the higher ranked interest is less than the cosine similarity threshold. The particular amount can depend on the difference between the cosine similarity and the cosine similarly threshold.

Figure 12:
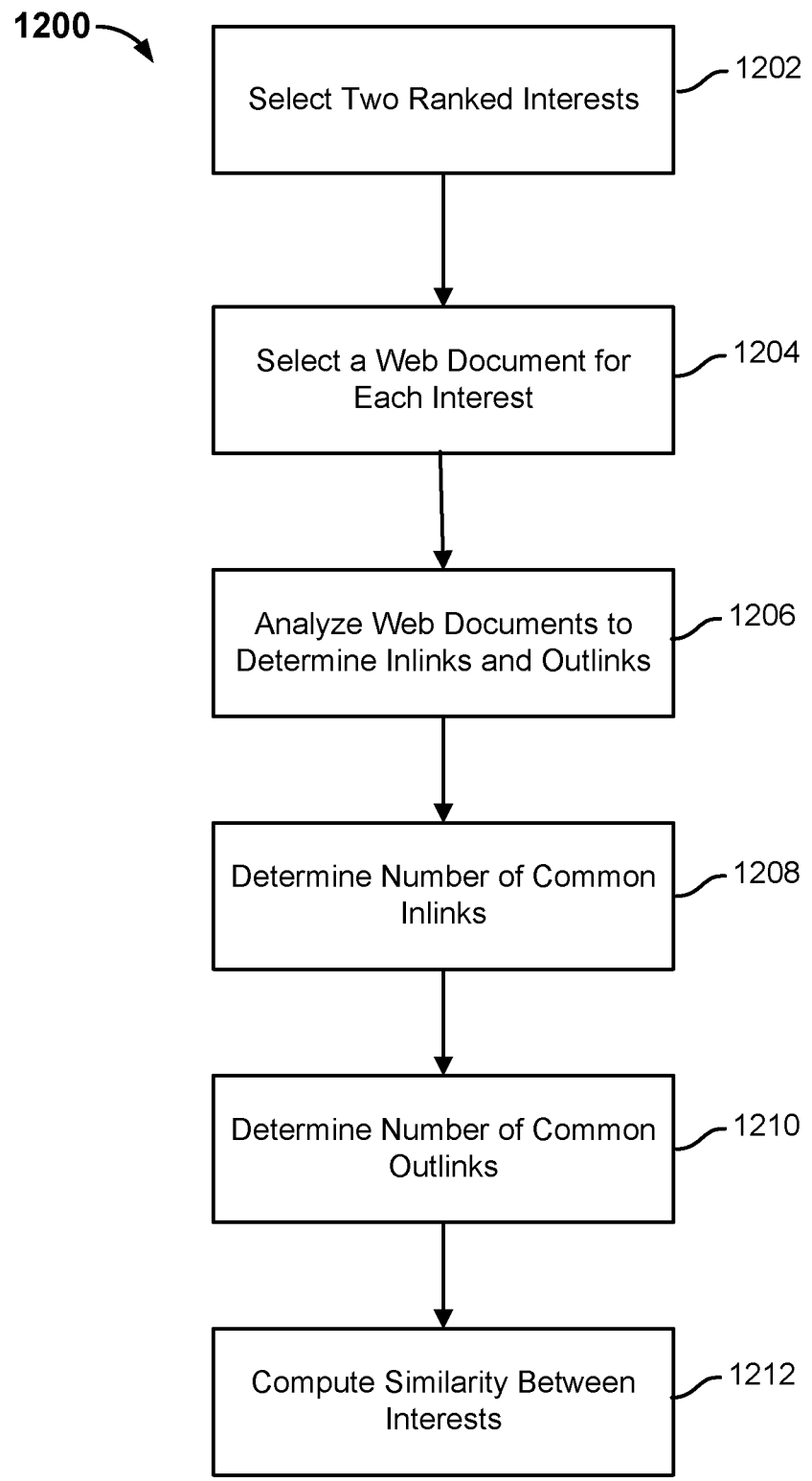
FIG. 12 is a flow diagram illustrating a process for determining a link similarity between interests in accordance with some embodiments.

FIG. 12 is a flow diagram illustrating a process for determining a link similarity between interests in accordance with some embodiments. The process 1200 may be implemented on a computing device, such as search and feed service 102. In some embodiments, the process 1200 can be used to perform part or all of step 1102.

At 1202, two ranked interests for a particular user account are selected. In some embodiments, a first interest is the top ranked interest. In other embodiments, a first interest is an interest from the top tier of ranked interests for the particular user account. In some embodiments, a second interest is any interest that is lower ranked than the top ranked interest. In other embodiments, the second interest is any interest that is outside the top tier of ranked interests. In other embodiments, the second interest is another interest from the top tier of ranked interests.

At 1204, a web document associated with the first interest and a web document associated with the second interest are selected.

At 1206, the web document associated with the first interest and the web document associated with the second interest are analyzed to determine inlinks and outlinks associated with each web document.

At 1208, the number of inlinks that is common to the web document associated with the first interest and the web document associated with the second interest is determined.

At 1210, the number of outlinks that is common to the web document associated with the first interest and the web document associated with the second interest is determined.

At 1212, a similarity value between the two interests is computed based on the number of common outlinks and the number of common inlinks. In some embodiments, in the event a web document associated with a first interest shares a threshold number of common links with a web document associated with a second interest, the interests are determined to be similar. In some embodiments, the number of common outlinks and the number of common inlinks are added together to determine the similarity value. In some embodiments, the number of common outlinks and the number of common inlinks are represented as a ratio. In some embodiments, the number of common outlinks and the number of common inlinks are multiplied together to determine the similarity value.

Figure 13:
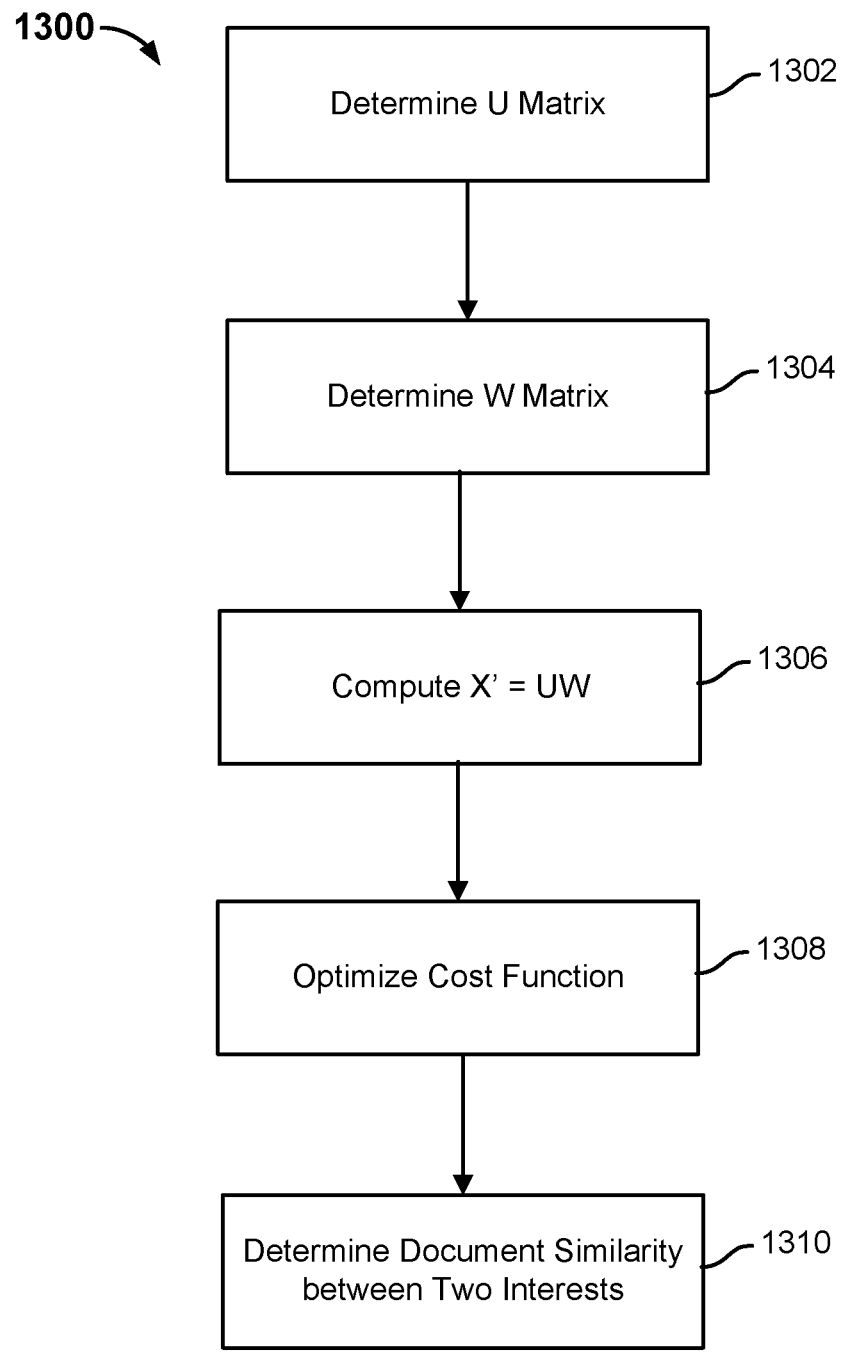
FIG. 13 is a flow diagram illustrating a process for determining a document similarity between two interests in accordance with some embodiments.

FIG. 13 is a flow diagram illustrating a process for determining a document similarity between two interests in accordance with some embodiments. The process 1300 may be implemented on a computing device, such as search and feed service 102. In some embodiments, the process 1300 can be used to perform part or all of step 1104.

The entire set of web documents and the interests associated with each individual document can be represented as a matrix X.

$$X = \begin{array}{|c|c|c|c|c|c|} \hline X & D_0 & D_1 & D_2 & \ldots & D_n \\ \hline E_0 & A_{00} & A_{01} & A_{02} & \ldots & A_{0n} \\ \hline E_1 & A_{10} & A_{11} & A_{12} & \ldots & A_{1n} \\ \hline E_2 & A_{20} & A_{21} & A_{22} & \ldots & A_{2n} \\ \hline \ldots & \ldots & \ldots & \ldots & \ldots & \ldots \\ \hline E_m & A_{m0} & A_{m1} & A_{m2} & \ldots & A_{mn} \\ \hline \end{array}$$

The value of each cell in the matrix X is a value $A_{xy}$ that indicates the importance of an entity with respect to a document. An entity can correspond to an interest. In some embodiments, the value $A_{xy}$ is a ratio between a measure of frequency of the entity in a particular document over the frequency of the entity in all documents. In other embodiments, the value $A_{xy}$ is a value that represents a confidence level for an entity in a particular web document. Some cells in the matrix X will have a value of 0 because the document is not about or does not reference the particular entity. Given the number of possible entities and possible web documents, the matrix X is a very large matrix.

The matrix X can be used to determine a list of documents associated with a particular entity. For example, an entity $E_2$ can be represented as $E_2 = \{A_{20}, A_{21}, A_{22}, \ldots, A_{2n}\}$, where $A_{xy}$ represents the importance of a corresponding document entity for a particular document. Similar documents will have similar scores for a particular entity.

The matrix X can also be used to determine a list of entities associated with a particular document. For example, a document $D_2$ can be represented as $D_2=\{A_{02}, A_{12}, A_{22}, A_{m2}\}$, where $A_{xy}$ represents the importance of a corresponding entity for a particular document. Similar entities will have similar scores in a particular document.

Determining the similarity between two entities using matrix X can be computationally intensive and time consuming. To reduce the amount of resources and time needed to determine the similarity between two entities in the matrix X, a collaborative filtering technique is implemented. Collaborative filtering can be implemented as a matrix decomposition problem. Given X is a m×n matrix, X can be approximated as a matrix $U_{m \times k}$ multiplied by a matrix $W_{k \times n}$, such that X=UW. When X' is approximately equal to X and k is a relatively small integer (e.g., 100), the matrices U and W provide k-dimensional vectors for the rows and columns of X that can be used to calculate the similarity between values.

At 1302, a matrix $U_{m \times k}$ is determined. U is a matrix of m entities by k documents.

At 1304, a matrix $W_{k \times n}$ is determined. W is a matrix of k entities by n documents. In an example implementation, U and W are initially chosen at random (e.g., randomly selecting values from the original X matrix to populate the respective U and W matrices).

At 1306, X'=UW is computed.

At 1308, a cost function between X and X' is computed. In some embodiments, a cost function of $\|X'-X\|^2$ is determined. In other embodiments, other cost functions (e.g., differentiable cost functions) can be utilized. U and W are incrementally adjusted and the cost function is determined again. In some embodiments, U and W can be computed using an Alternate Lease Squares technique. In some embodiments, a Gradient Descent technique can be employed to determine U and W where cost and gradients are computed simultaneously based on previous values of U and W. The matrices U and W are incrementally adjusted several times (e.g., 1000, 5000, 10000, or some other number of iterations can be performed depending on, for example, the applied cost function and computing power applied to the operations) in order to minimize the cost function. When the cost function is minimized, the process proceeds to step 1310.

In some embodiments, a negative sampling technique is implemented for calculating U and W. In other embodiments, a distributed algorithm is implemented for calculating U and W. For example, the matrix X is divided into windows on a grid R by C, where the grid divides the rows and columns of X into r and c segments. The window w=r*C+c (where 0≤r<R and 0≤c<C) contains all the values of X that have a row index between r*m/R and (r+1)*m/R and a column index of c*n/C and (c+1)*n/C. A plurality of distributed workers are implemented to compute the distributed algorithm. Each distributed worker loads a window of the matrix X into memory. A separate master process is responsible for the parameter updates of values of U and W for each iteration.

In order to compute the cost function and the gradients corresponding to a window, each worker requires the values of U and W corresponding to its row and column on the grid R, C.

In order to limit the network bandwidth required for communication in the master, an information distribution tree is created. For each slice of U by R and each slice of W by C, the master is responsible to send parameter updates to a single worker. This worker is then responsible to update N other workers (e.g., where N is typically 2 or 4) on the same grid row r or column c. This process is applied recursively until all workers have the parameters required for the cost and gradient computation. Gradient and cost updates to the master follow the inverse path on the tree. Gradients are summed as they propagate up the distribution tree since the gradient for a given parameter $U_i$ is the sum of all the gradients for all valid points of X(i,j). This process allows the distributed algorithm to consider all the data points of X for each iteration, even for large matrices given that the memory and computations of the values of X can be distributed over a large number of compute workers.

The above-described example distributed algorithm implementation maintains only one copy of X in memory thereby reducing memory requirements for performing these operations. Further, this example distributed algorithm implementation also uses an approach to distribute the network load across the workers in order to avoid having the master be the bottleneck in parameter and gradient updates.

At 1310, a document similarity between two entities is determined. Each row of the matrix $U_{m \times k}$ is a 100 dimensional space representation of an entity. For example, $E_0$ can be represented as a 100 element vector with each element value corresponding to the value representative of an entity in a particular document. In some embodiments, a document similarity between two entities can be determined by computing a difference between two vectors. In some embodiments, a document similarity between two entities can be determined by computing a dot product between two vectors. In some embodiments, a document similarity between two entities can be determined by comparing the sim hashes associated with each entity and in the event the sim hashes are the same, the documents can be determined to be similar. In some embodiments, a document similarity between two entities can be determined by comparing the sim hashes associated with each entity and in the event the sim hashes are the same, a cosine similarity between the vectors associated with the entities can be computed. In the event the cosine similarity is greater than or equal to a cosine similarity threshold, the documents can be determined to be similar. In some embodiments, a document similarity between two entities can be determined by comparing the sim hashes associated with each entity and in the event the sim hashes differ by one or more bits (e.g., fewer than a threshold number, such as two), the documents can be determined to be similar. In some embodiments, a document similarity between two entities can be determined by comparing the sim hashes associated with each entity and in the event the sim hashes differ by one or more bits (e.g., fewer than a threshold number, such as two), a cosine similarity between the vectors associated with the entities can be computed. In the event the cosine similarity is greater than or equal to a cosine similarity threshold, the documents can be determined to be similar.

Figure 14:
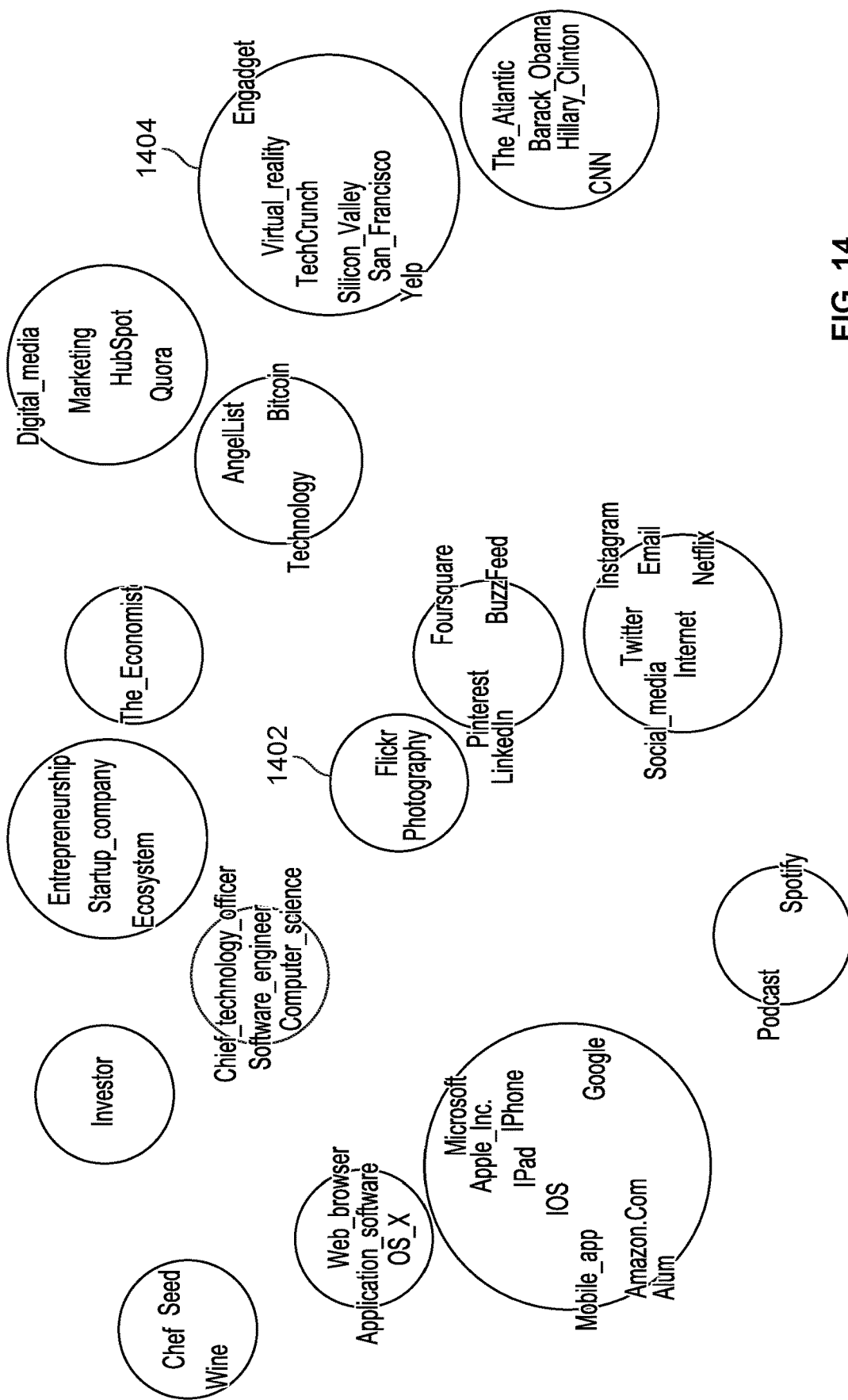
FIG. 14 is an example of a 2D projection of a 100 dimensional space vectors for a particular user account in accordance with some embodiments.

FIG. 14 is an example of a 2D projection of 100 dimensional space vectors for a particular user account in accordance with some embodiments. In the example shown, user account "user1" has a plurality of interests. As seen in FIG. 14, some of the interests in the 100 dimensional vector space are clustered together after performing the collaborative filtering technique described above with respect to step 1104 and FIG. 13. For example a cluster 1402 includes an interest in photography and an interest in Flickr®. Cluster 1404 includes an interest in Yelp®, San Francisco, Silicon Valley, TechCrunch®, virtual reality, and Engadget®. The interests comprise a cluster in the event the distance between each 100 dimensional space vector of a plurality of interests is less than or equal to a document similarity threshold. In the example shown, the distance between the 100 dimensional space vectors of Yelp®, San Francisco, Silicon Valley, TechCrunch®, virtual reality, and Engadget® are all less than or equal to a document similarity threshold. In contrast, the distance between the 100 dimensional space vector of Flickr® and San Francisco is greater than a document similarity threshold. Also, the cosine similarity between the 100 dimensional space vectors of Yelp®, San Francisco, Silicon Valley, TechCrunch®, virtual reality, and Engadget® are all less than or equal to a cosine similarity threshold. In contrast, the distance between the 100 dimensional space vector of Flickr® and San Francisco is greater than a cosine similarity threshold.

Figure 15:
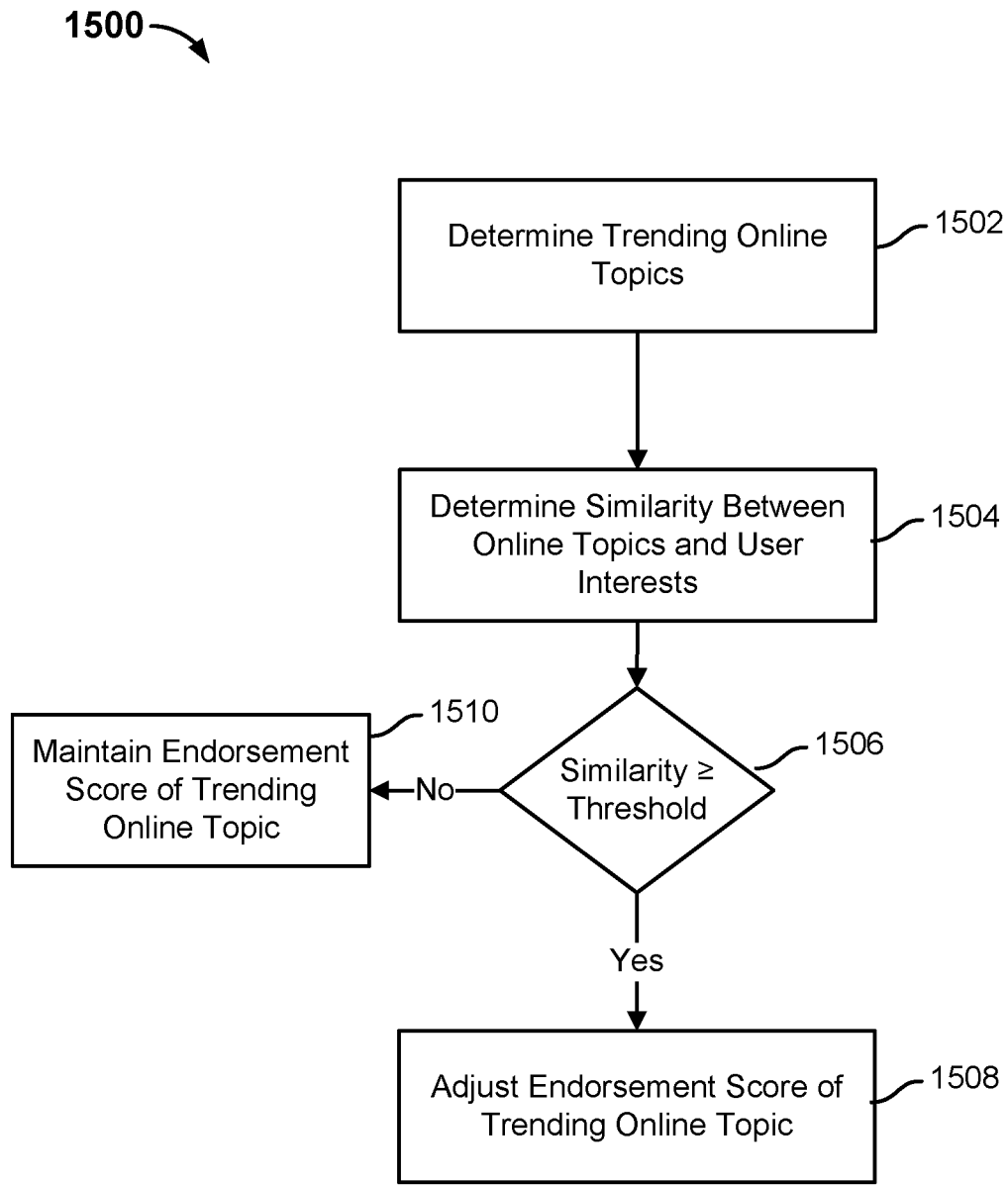
FIG. 15 is a flow diagram illustrating a process for determining a similarity between a trending topic and a user interest in accordance with some embodiments.

FIG. 15 is a flow diagram illustrating a process for determining a similarity between a trending topic and a user interest in accordance with some embodiments. The process 1500 may be implemented on a computing device, such as search and feed service 102. In some embodiments, the process 1500 can be used to perform part or all of process 1000.

At 1502, one or more trending topics are determined. A trending topic is a topic that is associated with more frequent online content in a recent duration. For example, there may be no instances of online content for a topic for a period of six months and then the topic receives an increased number (e.g., hundreds, thousands, millions, etc.) of instances of online content in a most recent duration (e.g., minutes, hours, days, weeks, etc.). A topic can become a trending topic in the event a threshold number of users on a social media platform perform a combination of actions (e.g., tweet, post, share, etc.) associated with the topic within a specified duration.

In some embodiments, a topic is determined to be trending based on a relative or proportional increase above a proportional trending threshold value in the number of online content associated with the topic. For example, a topic that receives consistent online content each day, but receives a slight increase in the number of online content associated with it on a particular day may not be considered to be trending. However, a topic that receives almost no online content each day, but receives a slight increase in the number of online content associated with it on a particular day may be considered to be trending because the proportional increase in the number of online content is higher for that particular topic. For example, a topic that receives 100 mentions in online content each day and then receives 105 mentions on a particular day would not be considered to be trending, even though the topic received 5 more mentions on that particular day. In contrast, a topic that receives 1 mention in online content each day and then receives 6 mentions on a particular day would be considered to be trending because the proportional increase in the number of online content is significant.

At 1504, a similarity between a trending topic and one or more of the user interests is determined. In some embodiments, the similarity between a trending topic and one or more of the user interests is determined based on a link similarity between a web document associated with the trending topic and a web document associated with a corresponding user interest. In other embodiments, the similarity between the trending topic and one or more of the user interests is determined based on a document similarity between the web documents associated with the trending topic and the web documents associated with a user interest.

At 1506, it is determined whether the similarity between the trending topic and a user interest is greater than or equal to a trending topic threshold. In the event the similarity is greater than or equal to the trending topic threshold, then the process proceeds to 1508 and the endorsement score of one or more interests that correspond to the trending topic can be adjusted. In response, one or more web documents associated with the one or more interests that correspond to the trending topic can be provided to a user in a content feed via an application. In the event the similarity is less than the trending topic threshold, the process proceeds to 1510 and the endorsement score of one or more interests that correspond to the trending topic is maintained.

Figure 16:
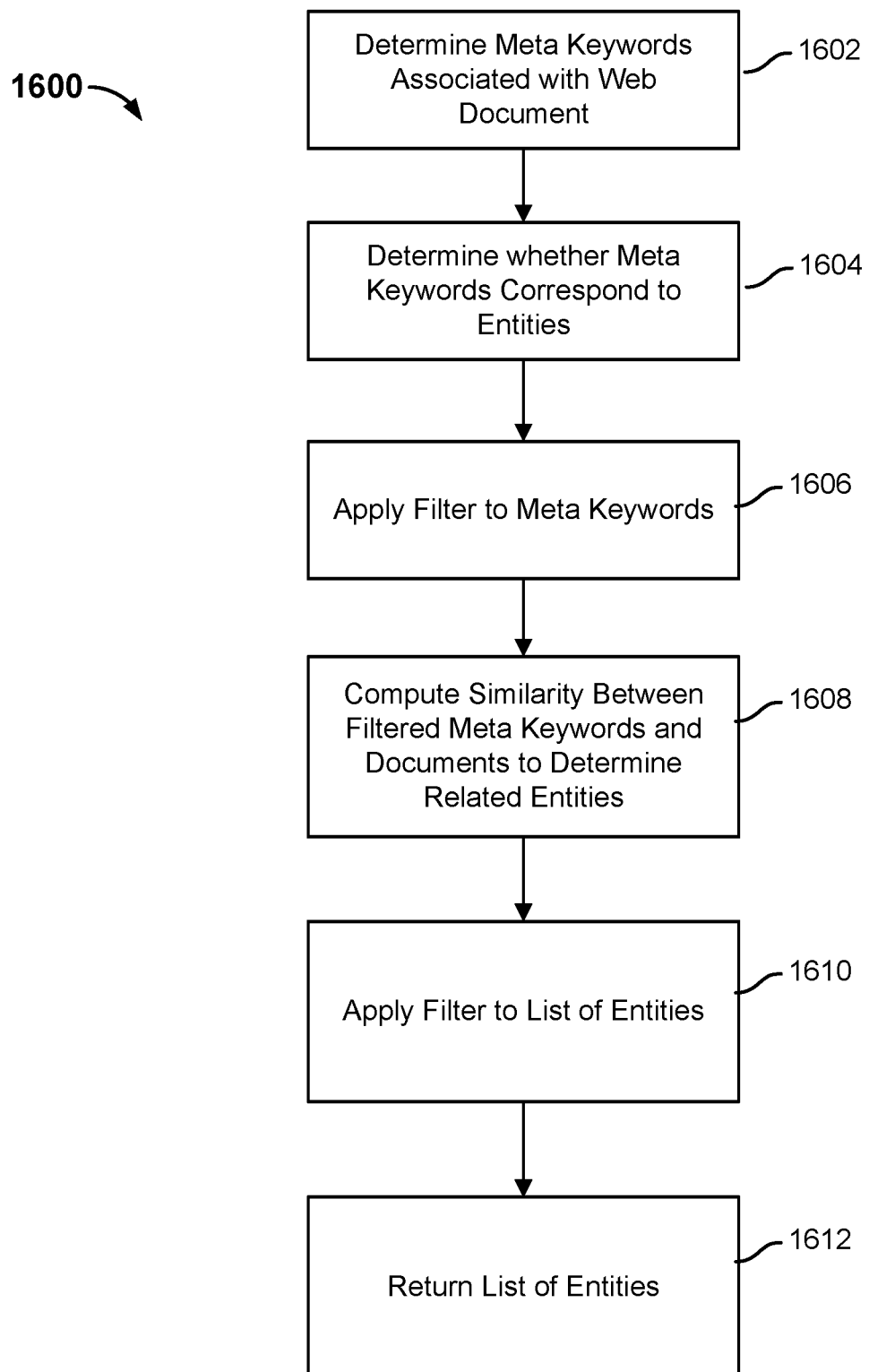
FIG. 16 is a flow diagram illustrating a process for suggesting web documents for a user account in accordance with some embodiments.

FIG. 16 is a flow diagram illustrating a process for suggesting web documents for a user account in accordance with some embodiments. The process 1600 may be implemented on a computing device, such as search and feed service 102. In some embodiments, the process 1600 can be used to perform part or all of step 1104.

At 1602, one or more meta keywords associated with a web document are determined. In some embodiments the web document is a web document viewed or read by a user in a content feed.

At 1604, it is determined whether the one or more meta keywords associated with a document correspond to an interest.

At 1606, a first filter is applied to the one or more meta keywords associated with a document that correspond to an interest. In some embodiments, the filter removes meta keywords that do not correspond to a top tier of ranked interests (e.g., interests with a particular confidence score) for the user account.

At 1608, a similarity between the filtered meta keywords that correspond to a top tier of ranked interests and other interests is determined. In some embodiments, a collaborative filtering technique is applied to determine the similarity between the filtered meta keywords that correspond to a top tier of ranked interests and other interests. In the event the 100 dimensional space vector of a filtered meta keyword that corresponds to a top tier ranked interest and a second interest is less than or equal to a threshold distance, then the second interest is added to a list of recommended interests.

At 1610, a second filter is applied to the list of recommended interests. In some embodiments, the second filter removes interests with inappropriate content or that are too general.

At 1612, a list of recommended interests is returned and used to provide web documents to a user in a content feed via an application. In some embodiments, web documents associated with the recommended interests are provided in the content feed. In other embodiments, confidence scores associated with the recommended interests are adjusted such that associated web documents are provided in the content feed.

Figure 17:
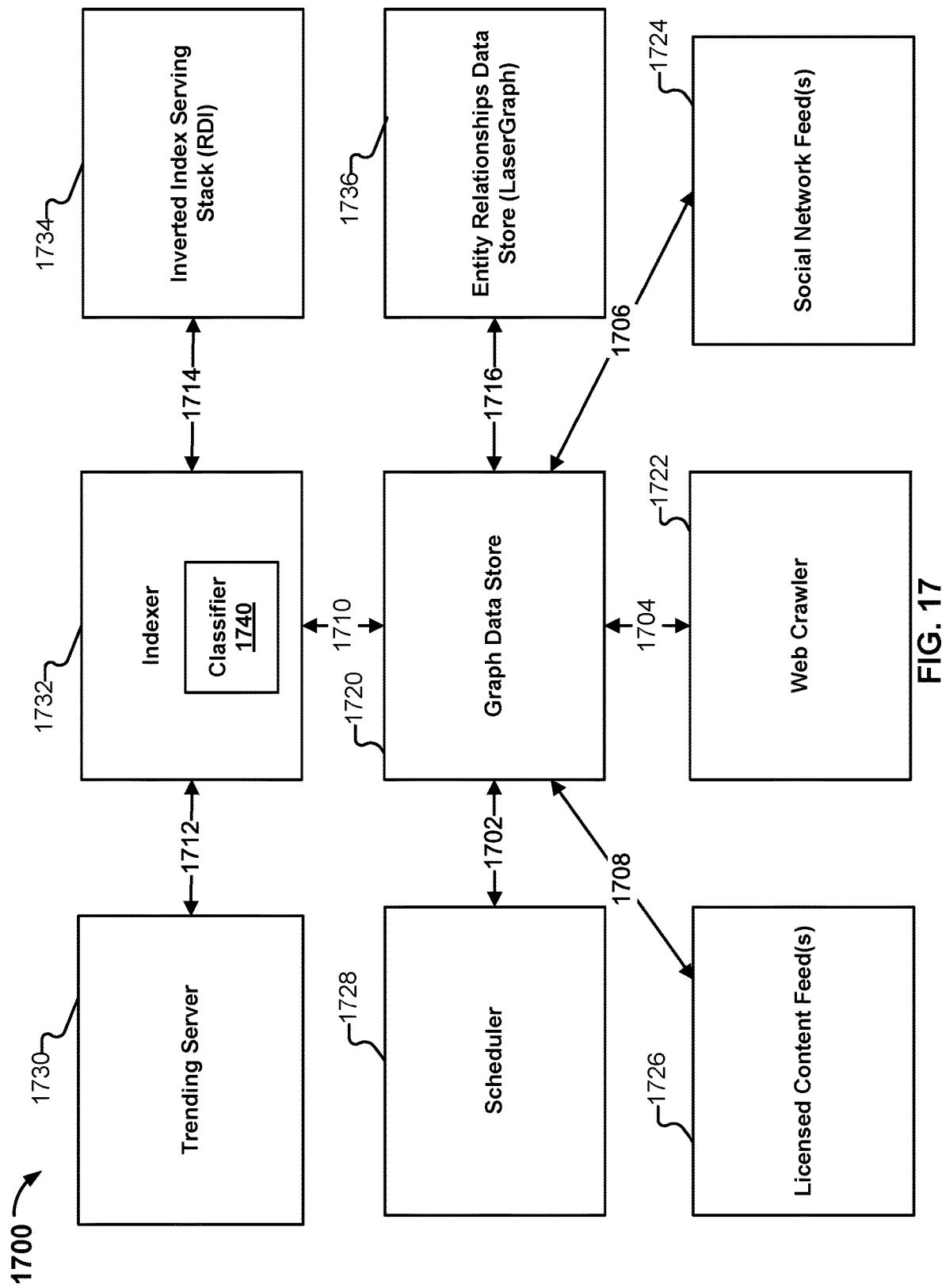
FIG. 17 is another view of a block diagram of a search and feed system illustrating indexing components and interactions with other components of the search and feed system in accordance with some embodiments.

Embodiments of the Indexing Components and Interactions with Other Components of the Search and Feed System FIG. 17 is another view of a block diagram of a search and feed system illustrating indexing components and interactions with other components of the search and feed system in accordance with some embodiments. In one embodiment, FIG. 17 illustrates embodiments of the indexing components and interactions with other components of a search and feed system 1700 for performing the disclosed techniques implementing the search and feed system as further described herein. For example, the indexing components and interactions as shown in system 1700 can be implemented using search and feed service 102 described above with respect to FIG. 1, search and feed system 200 described above with respect to FIG. 2, and/or search and feed system 300 described above with respect to FIG. 3.

In one embodiment, the indexing components and interactions with other components of search and feed system 1700 include a web crawler 1722, a graph data store 1720, a scheduler 1728, a trending server 1730, an indexer 1732, and a serving stack for the inverted index 1734 (e.g., the disclosed index is also referred to herein as a real-time document index (RDI) as further described below). The interactions between each of these and other components of search and feed system 1700 will be further described below. In one embodiment, an entity relationships data store 1736 (e.g., the entity relationships data store is also referred to herein as the LaserGraph as further described below) is generated and utilized by search and feed system 1700 as will also be further described below.

Aggregating Documents from Online Content Sources for the Graph Data Store

Referring to FIG. 17, as 1702, scheduler 1728 determines when to collect online content (e.g., also referred to as documents, which generally includes any type of data/content including images, text, audio, video, and/or other data/content that is available online from online content sources, such as websites/pages, social networks/social media posts, licensed content sources including news feeds, advertising networks, or other data sources, and/or other data/content as similarly described herein). For example, the scheduler can determine whether and/or when to revisit a website/web service for crawling one or more pages of the website/web service or whether and/or when to collect from a social network feed(s) or a licensed content feed(s) as shown at 1724 and 1726, respectively. In an example implementation, the scheduler can be configured to execute a work queue (e.g., which can be implemented as a time series/sequence of scheduling as further described below) for the web crawler to crawl websites/web services (e.g., to crawl URLs of the websites/web services to extract documents/new content posted/published as web pages or posts on the websites/URLs) and for new content feed data to be requested from social network feeds or licensed content feeds, as further described below.

At 1704, web crawler 1722 performs crawling of selected websites/pages on the World Wide Web (e.g., based on a list of URLs from which the web crawler is to fetch the content for indexing by the search and feed system). In an example implementation, specific websites and/or web services can be crawled, including, for example, news, sports, financial, and/or other content sites and/or social networks or other web services. As further described below, the crawling can be configured to be performed periodically and/or on demand based on input from scheduler 1728.

At 1706, content is collected from social network feed(s) 1724. For example, social network content feeds can include tweets by users on Twitter, posts by users on Reddit, posts by users on Facebook, and/or other social network data/content.

At 1708, content is collected from licensed content feed(s) 1726. For example, licensed content feeds can include tweets by users on Twitter, posts by users on Reddit, content posted on a website, commercially available news/content feeds, and/or other data/content.

Example online content that can be crawled includes web pages of various publicly accessible websites (e.g., available via the Internet) using a web crawler, in which the differences since a last crawl of the website can be determined for processing and updating in graph data store 1720. Example social networks that can be utilized to provide social network feed(s) 1724 can include Twitter, Reddit, Facebook, YouTube, YouTube channels, and/or any other online/web services (e.g., via open Application Programming Interfaces (APIs)). Example licensed content feed(s) that can be utilized to provide licensed content feed(s) 1726 can include any of the social networks that offer licensed content feeds (e.g., Twitter, Reddit, Facebook, LinkedIn, etc.) or other content services (e.g., news feeds, weather feeds, financial data feeds, advertisement network feeds, and/or other content feeds). As will be apparent, various other sources of data/content can be collected through APIs, content feeds, web crawling, and/or various other mechanisms for aggregating documents from online content sources for the graph data store.

At 1716, entity relationships are determined using entity relationships data store 1736 (e.g., also referred to herein as the LaserGraph). In one embodiment, the entity relationships data store (e.g., LaserGraph 1736 of FIG. 17) includes entity relationships that are utilized for document processing (e.g., using synonyms for entity annotation and token generation) as further described below. In an example implementation, the entity relationships are determined based on processing of one or more encyclopedia sources or other entity information data sources (e.g., Wikipedia, IMDB, DBpedia, sec.gov data, finance and industry data feeds, and/or other entity information data sources) to extract a set of entities. In order to determine a relationship(s) between the entities, such as how an entity is being described within a web page and how other articles are describing the entity, unsupervised machine learning techniques are applied to calculate a likelihood of a string of text referring to an "entity" in LaserGraph 1736 (e.g., by seeing how the linkage of strings looked like in an encyclopedia source(s)). In this example implementation, LaserGraph 1736 is augmented by using a corpus of web documents collected from the web (e.g., to learn more about what those entities imply, in which such automated learning/augmentation is continuous as the search and feed system continues to ingest and process new web documents from the web as further described below).

In one embodiment, graph data store 1720 is implemented using Google's Bigtable data storage system. In an example implementation, graph data store 1720 can be implemented using a cloud service, such as using Google's commercially available Cloud Bigtable service, which is Google's NoSQL Big Data database service. As further described below, graph data store 1720 is configured to provide an efficient and scalable index that supports real-time updating for delivering timely results utilized by search and feed system 1700. In an example implementation, the components of search and feed service 1700 are implemented using a high-level programming language(s) (e.g., Go, Python, Java, C++, JavaScript, or other high-level programming languages) and compiled to execute on server class computer hardware such as provided by cloud computing services (e.g., such as cloud computing services that are commercially available from Google, Amazon Web Services (AWS), IBM, or other cloud computing services).

In one embodiment, graph data store 1720 is implemented using a table data store with a graph structure overlay that is indexed using indexer 1732 as further described below. In an example implementation, graph data store 1720 includes rows for documents and columns for entities. For example, each row of the table can be used for a document that was fetched by web crawler 1722 as shown at 1704 or received/retrieved via social network feed(s) 1724 as shown at 1706 and/or licensed content feed(s) 1726 as shown at 1708 (e.g., the document can be any online content, such as a tweet by a user on Twitter, a post by a user on Reddit, a posting of content on a website, an online advertisement, or other online data/content, such as similarly described herein). Each column can be used for each entity (e.g., website, person, company, government, or other entity) which may be determined to be associated online with one or more of the collected documents in the graph data store (e.g., the website posted or linked to the document, a person/company/government/other entity tweeted a link to the document or posted comments related to the document on Reddit, or any other online link/relationship between documents and entities). In addition, pointers in a directed graph overlay of the table can be used to represent an observed link/relationship between a first document with a second document (e.g., a website page that includes a link to another website page, a tweet that retweets another tweet or comments on another tweet or links to/comments on a web page, a Reddit post that comments on a web page, etc.). An example implementation of graph data store 1720 is further described below with respect to FIG. 18.

Indexing the Documents in the Graph Data Store

In one embodiment, the indexing components and interactions with other components of search and feed system 1700 collect and process the collected documents to understand the documents and their relationships with entities and other documents. The processing performed by indexer 1732 and other components of search and feed system 1700 will now be further described below.

At 1710, indexer 1732 processes documents that have been added to graph data store 1720 (e.g., newly added/updated documents since a last batch/time of indexing was performed). At 1712, indexer 1732 is in communication with a trending server 1730, and the trending server generates a trending signal as further described below. At 1714, indexer 1732 provides an updated index to an inverted index serving stack (RDI) 1734, which inverts the index for efficiently serving relevant documents to queries/interests of users of the search and feed system (e.g., the selection of relevant documents to serve to users in response to queries or in their content feeds can be implemented using the orchestration components described herein).

In one embodiment, indexer 1732 processes a work queue based on a time sequence of documents that have been added to graph data store 1720 (e.g., new rows added to the table). In an example implementation, the indexer processed the entire row in the table for the document to identify information (e.g., interesting or unique information) about or within the document. For example, the indexer can perform various machine implemented techniques as described herein to determine what each document is about and to process that information represented by the directed graph relationships and in the columns of the row for that document entry in the table stored in graph data store 1720. Processing the row for each document can include processing text or other content in a title field of a web page document, processing text or other content in a body of a web page document, processing text or other content in tweets, or other anchors (e.g., Reddit posts, etc.). Processing of text can include identifying terms of interest in the document (e.g., using term frequency-inverse document frequency (TF-IDF) and/or other techniques). In cases of (re)tweets, Reddit posts, or other user associations with the document, the indexer can also determine a credibility associated with the user (e.g., a user/entity can be given a credibility ranking/score based on a threshold value associated with the number of followers for the user's verified user account on a given social network or other objective metrics can be utilized).

As will be further described below, the processing and indexing of documents can also include generating various signals based on the documents that are collected by the search and feed system. Example signals and uses of these signals are further described below.

As discussed above, the indexed documents (e.g., updates to the index) are provided to inverted index serving stack (RDI) 1734 to facilitate serving the documents using the inverted index (RDI) (e.g., which can be performed using the orchestrator components described herein). The aggregating, processing, and indexing of the documents is performed using the disclosed techniques to minimize the time/delay between when content is available online on the Internet and when it is ready to serve to users (e.g., such as a new tweet by a user on Twitter, a new post by a user on Reddit, a new posting of an article on a website, and/or other online content changes, such as similarly described herein), such that the index is generated and maintained to provide in near real-time online content that is relevant to queries/interests of users of the search and feed system. In an example implementation, the disclosed techniques implemented by search and feed system 1700 can process 100,000 or greater number of changes per second to the index.

Functional View of the Graph Data Store

FIG. 18 is a functional view of the graph data store of a search and feed system in accordance with some embodiments. In one embodiment, graph data store 1800 is a functional view of the graph data store 1720 of FIG. 17 that includes diverse content including person, website, web pages, word information, social media posts, and/or other document and entity related information that are all captured in the graph data store including their links/relationships represented by a directed graph overlay structure (e.g., pointers between table entries) and meta data associated with such links such as tweet text, comments on a post/web page or other online comments linking to online content/documents, anchor/web links, and/or other links/relationships to represent in near real-time content and relationships observed in the online world (e.g., WWW, social networks, etc.). In an example implementation, graph data store 1800 is implemented using Google's Bigtable data storage system using Google's commercially available Cloud Bigtable, which is Google's NoSQL Big Data database service, as similarly described above with respect to graph data store 1720 of FIG. 17.

Referring to FIG. 18, graph data store 1800 is a table data store with a graph structure overlay as further described below. As shown, graph data store 1800 includes rows for documents (e.g., rows for documents $D_0$, $D_1$, $D_2$, ..., and $D_m$) and columns for entities (e.g., columns for entities $E_0$, $E_1$, $E_2$, ..., and $E_n$) as similarly described above with respect to graph data store 1720 of FIG. 17. For example, each row of the table can be for a document that was collected for processing by the search and feed system (e.g., a document that was fetched by web crawler 1722 and/or received/retrieved via social network feed(s) 1724 as shown at 1706 and/or licensed content feed(s) 1726 as shown at 1708 as similarly described above with respect to FIG. 17). Each column can be used for each entity (e.g., website, person, company, government, geographical location, or other entity as described herein) which may be determined to be associated online with one or more of the collected documents in graph data store 1800 (e.g., the website posted or linked to the document, person/company/government/ other entity tweeted a link to the document or posted on Reddit, etc.). A pointer in the directed graph overlay of the table can be used to represent an observed link/relationship between a first document with a second document, such as shown by pointer 1802 for a link/relationship between documents Do and Dm and entities $E_0$ and $E_2$ via table entries $A_{00}$ and $A_{m2}$ and pointer 1804 for a link/relationship between documents $D_2$ and $D_1$ and entities $E_2$ and $E_n$ via table entries $A_{22}$ and $A_{1n}$. Example relationships that are captured via the directed graph overlay can include a website page that includes a link to another website page, a tweet that retweets another tweet or comments on another tweet or links to/comments on a web page, a Reddit post that comments on a web page, and/or various other online links/relationships (e.g., any other links/relationships between entities and documents) can be identified by the search and feed document collection and processing and then represented using graph data store 1800.

In this example implementation, graph data store 1800 efficiently captures relationships/links between documents and entities (e.g., documents and entities that refer/link to and/or comment on any of the collected documents). Also, the graph data store captures content and activities associated with content in near real-time, entities to documents and vice versa using the disclosed techniques to perform updating of the graph data store so that changes in the online world can be reflected in near real-time updates in the disclosed graph data structure. As further described below, the indexer performs processing on the collected documents to update the graph data store and provide updates to the index to the serving structure, which can then invert the index to facilitate serving of document/content query and content feed results to users of the search and feed system.

An example Bigtable schema is provided below.

```
// bigtable schema
const (
    ClassifierColumnFamily          = "cl"     // kv, k = type, v = proto
    KeyColumnFamily                 = "k"
    URLColumn            = "k:u"              // k:u is the column for url
    URLSourceColumn                 = "k:s"    // k:s is the producer of the crawl request
    CanonicalURLColumn              = "k:c"    // k:c is the column for the canonical url
    ForwardURLColumn                = "k:f"    // k:f is the target of a redirect
    SoftForwardURLColumn            = "k:sf"   // k:f is the target of a `http-
equiv="Refresh"` tag
    TweetForwardURLColumn           = "k:tf"           // k:tf is a redirect that comes from
twitter data / GNIP
    AmpURLColumn            = "k:amp"         // k:amp is the AMP URL for this web
page
    TypeColumn       = "k:t"      // k:t is the column for type of data
    ReverseTimeColumn               = "k:rt"   // k:rt is a column that has a reversed time
(max int64 - bigtable.Now( )) in the time stamp and the value is earliest time a url was seen.
    OriginURLColumn                 = "k:orig_url"   // k:orig_url is manually added to the
fetched row when looking up for canonical URL row. This allows us to get the original look up
URL.
    ForwardedURLColumnFamily            = "fu"          // kv, column = url, empty value
    FetchColumnFamily           = "f"         // kv, fetch values
    ContentColumn        = "f:c"              // Content of the index data.
    ContentTypeColumn               = "f:t"    // Content type MIME of f:c.
    StatusCodeColumn                = "f:s"    // fetch status code.
    FetchDurationColumn             = "f:d"    // fetch duration, for GET, in microseconds
    TweetsCrawledColumn             = "f:tweets_fetched"          // For twitter profile pages, timestamp
is last twitter api crawl for tweets. Has empty value.
    FavoritesCrawledColumn          = "f:favorites_fetched"   // For twitter profile pages, timestamp
is last twitter api crawl for favorites. Has empty value.
    FollowingsCrawledColumn         = "f:followings_fetched" // For twitter profile pages,
timestamp is last twitter api crawl for followings. Has empty value.
    FollowersCrawledColumn          = "f:followers_fetched"   // For twitter profile pages,
timestamp is last twitter api crawl for followers. Has empty value.
    HeaderColumnFamily          = "h"         // kv, http headers
    PulledContentColumnFamily         = "p"          // kv, pulled from content
    DistillOutputColumn             = "p:distill"     // distilled output
    BPPulledContentColumn           = "p:bp"          // boiler plate pulled content
    BPPulledContentDetailsColumn = "p:bpd"            // boiler plate pulled content with
details
    InducedInterestsColumn          = "p:ii"          // Interest nodes induced by a person/url in
followers of this person/url.
    ScoreColumnFamily        = "s"            // kv, k = attachment, v = token scores proto
    QualityColumnFamily         = "q"         // kv, k = attachment, v = quality signals
    InLinkColumnFamily          = "il"        // kv, k = url, v = anchor or proto
    OutLinkColumnFamily             = "ol"             // kv, k = url, v = anchor or proto
    SymmetricLinkColumnFamily           = "sl"         // kv, k = url, v = meta info proto
    AnnotationColumnFamily          = "a"              // kv, k = annotation type, v = proto
    TrendsColumnFamily          = "t"         // trends column family
    RedditTrendsColumn          = "t:r"       // reddit trends data
    YoutubeTrendsColumn             = "t:y"            // youtube trends data
    TimeSeriesHookColumnFamily          = "z"          // Timeseries information where
prescored doc is stored
    TimeSeriesHookColumn            = "z:k"            // Timeseries key
    TimeSeriesCanonicalURLColumn = "z:c"                // Canonical URL
    UserPostColumnFamily            = "u"              // User post column family
)
```

In one embodiment, the RDI includes a vector-based model (e.g., a vector model) for each document in the index. In an example implementation, the vector model is built using unsupervised machine learning techniques. For example, the unsupervised machine learning can learn a representation of a word, a sequence of words, parts of a document such as title, and finally, a representation for the entire document itself. In this example implementation, the document is annotated with vectors that represent the whole document, vectors for some selected portions of the document such as the title, and vectors for each of the annotations. These vector representations are used in multiple ways. For example, these vectors can be used to understand what the document is really about. For instance, a query such as [skiing] is expected to not only have the match for word "skiing" in the document, but may also talk about "snow," "powder," and/or various skiing related activities and equipment. The disclosed document representations capture all of that in a vector. This allows the disclosed techniques to better match a document to queries (e.g., for skiing, documents that cover multiple aspects of skiing in the vector representation can be preferred). As another example, these vector models can be used to find outliers in documents. For instance, a document may be really about wine, and might in passing mention a beach. The disclosed techniques can determine that beach is an outlier and the document is really about wine.

Example Document Signals

In one embodiment, indexer 1732 generates one or more document signals associated with each document. Example document signals can include an entropy signal, a trending signal, a freshness signal, a popularity signal, a topicality/relevance signal, and/or additional document signals can be generated and used by the search and feed system.

Figure 19:
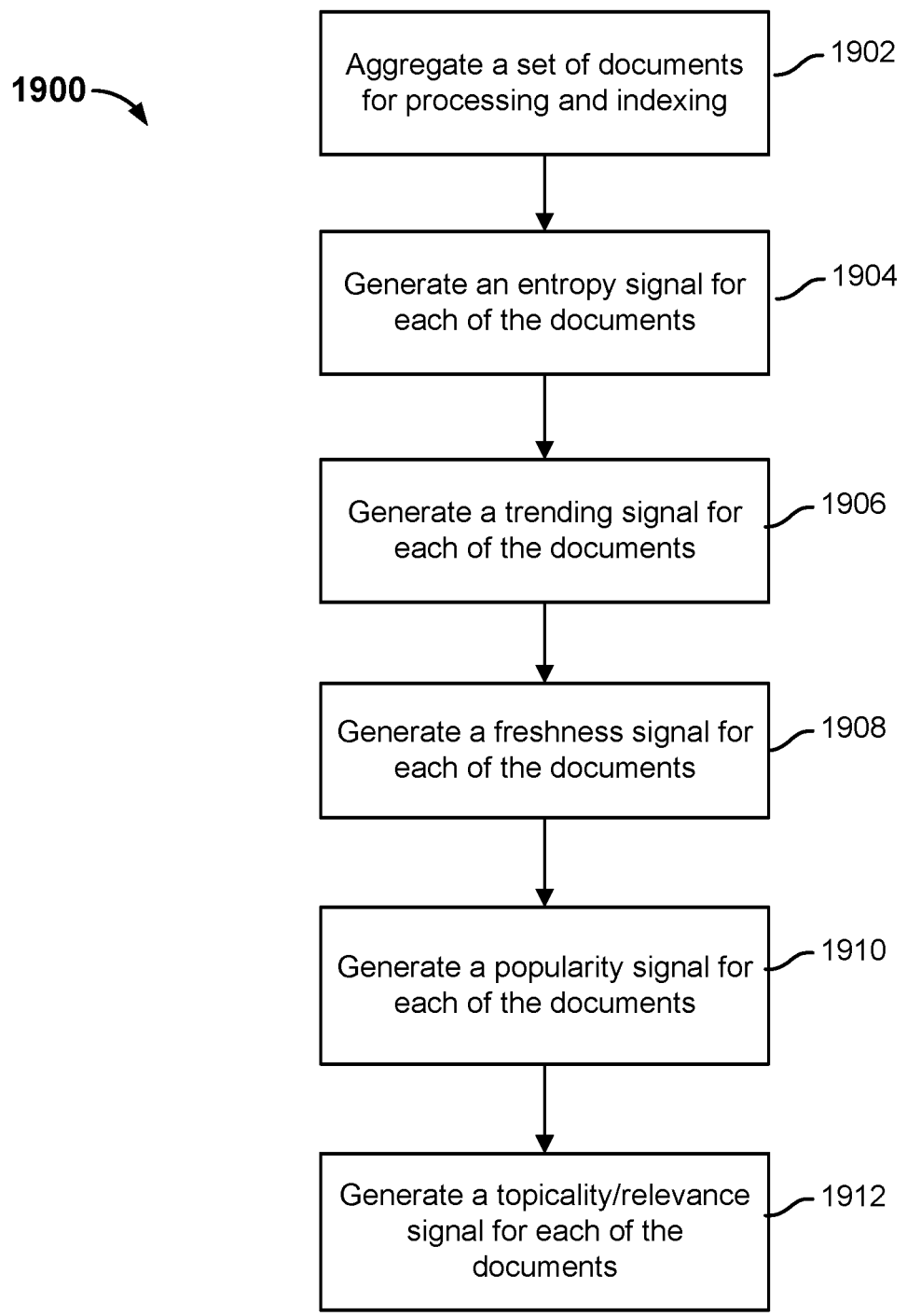
FIG. 19 is a flow diagram illustrating a process for generating document signals in accordance with some embodiments.

FIG. 19 is a flow diagram illustrating a process for generating document signals in accordance with some embodiments. In some embodiments, the process 1900 for generating document signals is performed using the disclosed system/service (e.g., search and feed system 1700 of FIG. 17), such as described above.

Referring to FIG. 19, at 1902, a set of documents for processing and indexing are aggregated. As similarly described above, the search and feed system periodically collects a set of new documents for processing and indexing.

At 1904, the indexer generates an entropy signal for each of the documents that provides a measure for indicating a diversity/entropy-based popularity for each of the documents. For example, a document that has 1,000 different tweets about the document can have a different/higher diversity/entropy signal than another document that has simply been retweeted 1,000 times without comment or other newly added content. In this example, measuring (re)tweets/posts that include changes/additions to the content (e.g., rephrasing a title of a document, rewording of a retweet or post on a social network/website of a document, and/or other changes or newly added content to the document) is determined by the indexer (e.g., indexer 1732 of FIG. 17) during processing of the document and associated data stored in the graph data store to generate a diversity/entropy-based popularity of the document. As such, the diversity/entropy-based popularity signal is distinct from a typical measure of popularity, which typically just counts a number of (re)tweets/posts regardless of whether such include any new/different content than the original document.

At 1906, the indexer generates a trending signal for each of the documents that provides a measure for indicating whether the document is trending online. For example, indexer 1732 can communicate with trending server 1730 as shown at 1712 of FIG. 17 to calculate a trending signal for each document (e.g., to generate the above-described trend models), as further described below.

At 1908, the indexer generates a freshness signal for each of the documents that provides a measure for indicating the freshness of each of the documents. For example, the freshness signal can measure how recently the document was first published/posted online (e.g., a measure in minutes/days/weeks/years old for the document).

At 1910, the indexer generates a popularity signal for each of the documents that provides a measure for indicating how popular the document is online. For example, the popularity signal can provide the above-discussed typical measure of popularity, which generally just counts a number of (re)tweets/posts regardless of whether such include any new/different content than the original document.

At 1912, the indexer generates a topicality signal for each of the documents that provides a measure for indicating how relevant each of the documents is to an entity/topic. For example, the topicality signal can be determined for one or more of the entities in the graph data store (e.g., based on TF-IDF, synonyms, entity relationships maintained in the LaserGraph, and/or other relevancy techniques) as similarly described herein. As another example, the topicality signal can be determined based on processing of a query (e.g., which can be in response to a user query of the user and feed system that is provided in real-time in response to the user query and/or in response to a query for a not now search that is in response to a user's interest(s) in a topic in which the interest corresponds to the query, in which the search and feed system can then provide content relevant to queries/interests to users via pull and push mechanisms using the disclosed techniques as similarly described herein) using the disclosed power-based or and power-based and query processing as further described below.

Power-Based or and Power-Based and Query Processing

In one embodiment, topicality is determined based on processing of a query using a query tree data structure and power-based or and power-based and for score propagation in the query tree as further described below.

In one embodiment, a query is organized as a tree (e.g., referred to herein as a query tree). A node in the query tree can be a parent, or a child. A parent node has at least one child node below it. Each parent node defines a set of mathematical operations that can be computed for its children node.

An example of a specific mathematical parameter that the node provides is referred to herein as a "power parameter." In an example implementation, example power parameter values (e.g., these values can change and are flexible/configurable) are provided below.

QueryNodeMin: Weight: 1.0, Power: −20.0, Bonus: 0.01, DiscardThreshold: 0.1
QueryNodeMax: Weight: 1.0, Power: 20.0, Bonus: 0.01, DiscardThreshold: 0.1
QueryNodeHarmonic: Weight: 1.0, Power: −1.0, Bonus: 0.01, DiscardThreshold: 0.1
QueryNodeGeometric: Weight: 1.0, Power: 0.0, Bonus: 0.01, DiscardThreshold: 0.1

```
QueryNodeArithmetic: Weight: 1.0, Power: 1.0, Bonus: 0.01, DiscardThreshold: 0.1
QueryNodeSoftAND: Weight: 1.0, Power: -2.0, Bonus: 0.1, DiscardThreshold: 0.1
QueryNodeSoftOR: Weight: 1.0, Power: 10.0, Bonus: 0.01, DiscardThreshold: 0.1
QueryNodeSquare: Weight: 1.0, Power: 2.0, Bonus: 0.01, DiscardThreshold: 0.1
QueryNodeCube: Weight: 1.0, Power: 3.0, Bonus: 0.01, DiscardThreshold: 0.1
```

Given a parent node and its children, the score for the parent, given the scores of all its children, can be computed as provided in the below pseudo code example.

```
ParentNode.Score = 0 // initial value
sumWeights = 0
For each child c of ParentNode {
    If c.Score > ParentNode.DiscardThreshold {
        ParentNode.Score = ParentNode.Score + c.Weight *
    Power(c.Score + ParentNode.Bonus, ParentNode.Power)
        sumWeights = sumWeights + c.Weight
    }
}
ParentNode.Score = PowerInverse(ParentNode.Score/sumWeights,
ParentNode.Power - ParentNode.Bonus)
```

Power(x, y) is defined as x^y (x raised to power y).
PowerInverse(x, y) is defined as: x^(1.0/y), with a special case for when y is 0.
When y is 0 we return e^x (e is base of natural logarithm).

As will now be apparent, the disclosed techniques for processing of a query using a query tree data structure and power-based or and power-based and for score propagation in the query tree are novel techniques as the variations of AND, OR, Min, Max, and various Means are typically computed for a parent node by explicitly writing separate code for those operations. In contrast, using the disclosed techniques, these operations are computed in the same uniform manner by setting parameters for the Power, Weight, bonus, and discard threshold parameters.

For example, assume that a user queries for "cycling in Bay Area" or has indicated an interest in "cycling in Bay Area." The entity relationships data store (e.g., LaserGraph 1736 of FIG. 17) can include entity relationships, such as further described below, that indicate synonyms of the "Bay Area" including the following: San Francisco, San Mateo, San Jose, south bay, peninsula, Silicon Valley, and/or other synonyms. Similarly, the synonyms for cycling can include the following: biking, road biking, trail biking, mountain biking, bike commuting, and/or other synonyms. Using the entity relationships and synonyms, the search and feed system can determine documents that are relevant to both "Bay Area" and "cycling." In this example, the search and feed system automatically translates the query for "cycling in Bay Area" into the following query that includes two sets of terms (e.g., original search term with alternatives/synonyms) that is provided into the query tree data structure: (cycling or biking or road biking or trail biking or mountain biking, or bike commuting) and (Bay Area or San Francisco or San Mateo or San Jose or south bay or peninsula or Silicon Valley). If a document includes one or more of the terms in both sets, then a boost can be applied to a topicality score for that document in which scores across different nodes of the query tree can be combined. As such, a score can be determined for the query using the disclosed query tree data structure.

In one embodiment, the disclosed techniques for synonyms are applied to facilitate an enhanced search/query for identifying relevant/topical content and, in some cases, also utilize context from the search/query (e.g., location of the mobile device to create a query tree based on the query and context of the query such as location of the user and/or other contextual information/data can be utilized to enhance the search/query). For example, as further described below, these techniques for synonyms can similarly be applied to facilitate entity annotation of documents, and if such documents are annotated using the synonyms, then search can be performed just using the selected token for the term (e.g., if a document mentions "south bay" and "biking," then tokens for "Bay Area" and "cycling" can be added to annotate the document, in columns for the row entry for that document in the table as described above and such can also be determined based on document context as further described below).

Indexer Processing of Documents, Tokens, and Entity Annotation

In one embodiment, the indexer (e.g., indexer 1732 of FIG. 17) performs processing for each document that includes performing entity annotation and generating tokens as further described below.

Figure 20:
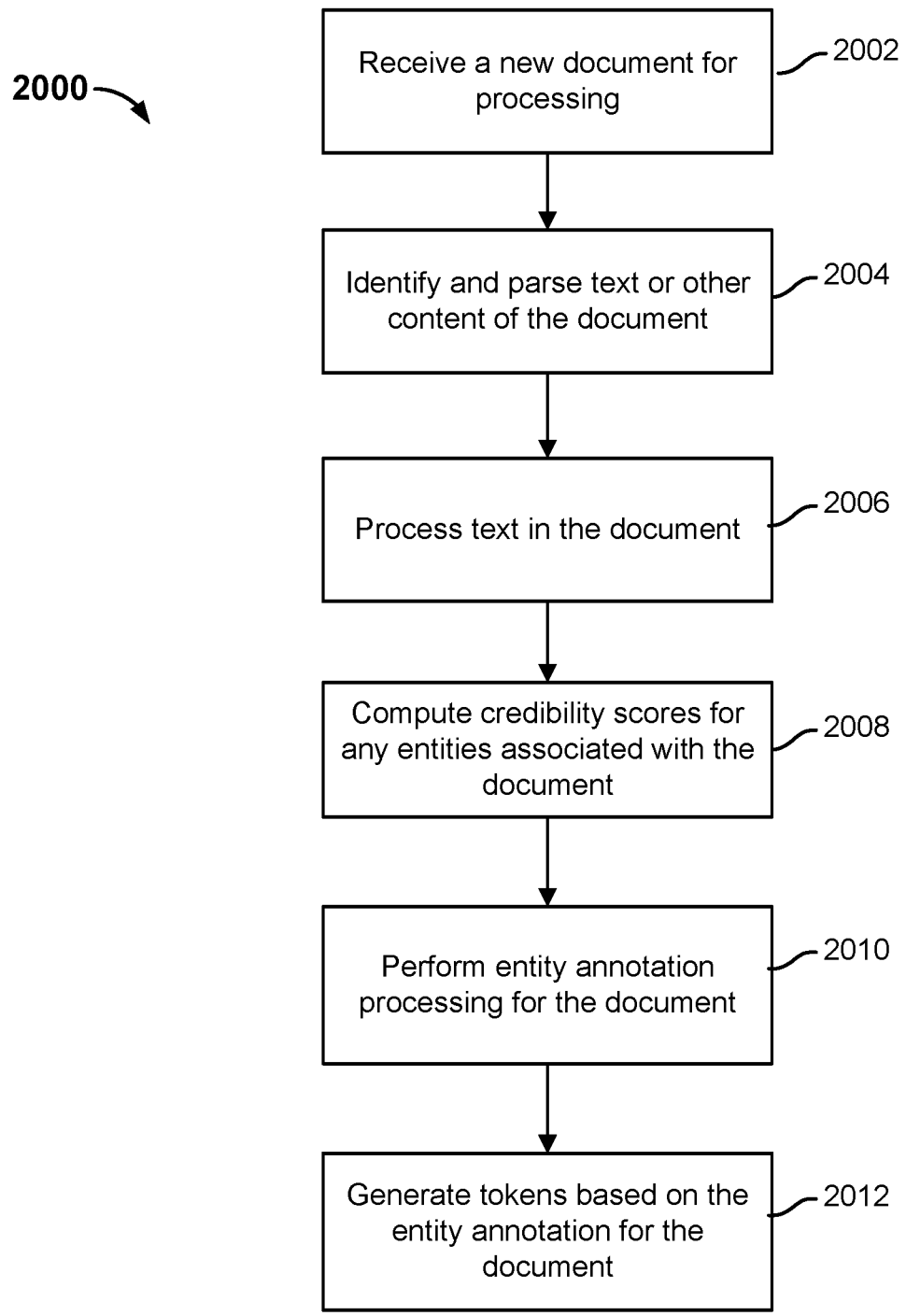
FIG. 20 is a flow diagram illustrating a process performed by an indexer for performing entity annotation and token generation in accordance with some embodiments.

FIG. 20 is a flow diagram illustrating a process performed by an indexer for performing entity annotation and token generation in accordance with some embodiments. In some embodiments, the process 2000 for performing entity annotation and token generation is performed using the disclosed system/service (e.g., including indexer 1732 of search and feed system 1700 of FIG. 17), such as described above.

Referring to FIG. 20 at 2002, a new document for processing and indexing is received. As similarly described above, the search and feed system periodically collects a set of new documents for processing and indexing. For example, the indexer (e.g., indexer 1732 of FIG. 17) can process newly added rows to the table stored in the graph data store (e.g., graph data store 1720 of FIG. 17), in which each new row corresponds to a newly added document as similarly described above.

At 2004, identifying and parsing text or other content is performed. For example, processing the new document can include processing text or other content in a title field of a web page document, processing text or other content in a body of a web page document, processing text or other content in tweets, or other anchors (e.g., Reddit posts, etc.).

At 2006, text in the document is processed. For example, processing of text can include identifying terms of interest in the document using term frequency-inverse document frequency (TF-IDF) and/or other techniques.

At 2008, computing credibility scores for any entities associated with the document is performed. As an example, in cases of social networking related associations/links such as (re)tweets, Reddit posts, or other user associations with the document, the indexer can determine a credibility score/metric associated with the user of that social networking account (e.g., a user/entity can be given a credibility ranking/score based on a threshold value associated with the number of followers for the user's verified user account on a given social network or other objective metrics can be utilized). As another example, in cases of website related associations/links such as a link from a website to the document or other website associations with the document, the indexer can determine a credibility score/metric associated with the website (e.g., a credibility ranking/score based on an Alexa website traffic ranking, which is a commercially available service from Alexa, an Amazon Company, or other objective metrics can be utilized).

At 2010, entity annotation processing is performed for the document. For example, the indexer (e.g., indexer 1732 of FIG. 17) can perform entity annotation processing for newly added documents to identify entities/terms to associate with the document to canonicalize documents processed by the indexer (e.g., using alternatives/synonyms and the entity relationships data store (LaserGraph) 1736 as similarly described above).

In one embodiment, performing entity annotation also includes performing disambiguation utilizing the context from the document. For example, other terms present in the document, such as the presence of other synonyms/alternatives in the document can be used to determine that "south bay" is referring to "Bay Area" of northern California as opposed to "Tampa Bay" or some other bay area to facilitate performing disambiguation on the document side as similarly described above. In this example, if other terms in the document include San Jose, Silicon Valley, and/or other synonyms for "Bay Area," then the indexer can determine that the document is related to the canonicalized "Bay Area" but if other terms are present, such as Tampa Bay or Miami, then the indexer can determine that the document is not referring to the canonicalized "Bay Area."

At 2012, generating tokens based on the entity annotation for the document is performed. In one embodiment, each processed document is tokenized into a set of terms (e.g., entities, terms, etc. based on the above-described parsing and entity relationship/synonym techniques, which can be stored in columns in the table of the graph data store as described above). For example, the above-described synonyms and entity relationships (e.g., entity relationships data store (LaserGraph) 1736) that are determined using the above-described synonyms/entity relationships and disambiguation techniques can be applied to facilitate entity annotation of documents using tokens, and if such documents are annotated using the synonyms, then the token for the term (e.g., the token can correspond to the selected canonicalized term for a set of synonyms/related entities) can be added in a token column entry for the document's row in the table stored in the graph data store (e.g., graph data store 1720 of FIG. 17) (e.g., if a document mentions "south bay" and "biking," then the tokens for "Bay Area" and "cycling" can be added as tokens to annotate the document, in columns for the row entry for that document in the table as described above). As described herein, the tokens can be utilized to facilitate enhanced search using the search and feed system, and the tokens can also be utilized by the trend server to monitor trends based on the tokens observed while processing newly added documents using the search and feed system.

Deep Learning Classification Techniques

In one embodiment, deep learning classification techniques are performed using a machine learning system to classify documents (e.g., web pages and/or other documents). As shown, indexer 1732 can include a classifier 1740 for performing the disclosed machine learning system to classify documents. In another embodiment, classifier 1740 is implemented as an independent system and indexer 1732 is in communication with the machine learning system to classify documents.

In an example implementation, the classifier is implemented using a TensorFlow machine learning library, which is an open source, neural network-based machine learning software library available from Google or other commercially available, proprietary, or open source machine learning solutions can be applied to perform the disclosed classification techniques. In the example of classifying documents, the disclosed techniques can be performed using the TensorFlow machine learning library with trained models (e.g., the classifier can be initially trained using a large number of training documents, such as to identify URLs relevant for a label such as for a politics label, and can through the search system determine that cnn.com/politics is relevant to politics and then all pages under that URL can be fed into the classifier system for deep learning models, which can be implemented using the Google Tensor Flow neural network open source component) to classify newly added documents (e.g., newly added documents to graph data store 1720 that are being processed by indexer 1732 and classifier 1740 as similarly described above). The documents (e.g., any set of data, such as any unstructured corpus of data) can then be classified into a particular category (e.g., a sports category such as baseball, football, or another sport, or a technology category such as computers, routers, medical devices, or another technology). In the example of a web page, the content of the web page can be provided to the classifier (e.g., a neural network machine learning system), which can classify the page into a particular category, which is assigned as a label for the page.

In one embodiment, the disclosed deep learning classification techniques provide a new and improved solution for efficiently and accurately categorizing documents, such as web pages or other documents. In an example implementation, the classifier automatically determines that a page or set of pages is uniquely about a particular topic (e.g., associated with a particular category) using the search system itself to identify the pages that are about a given topic, such as sports, technology, or another topic, as further described below.

Figure 21:
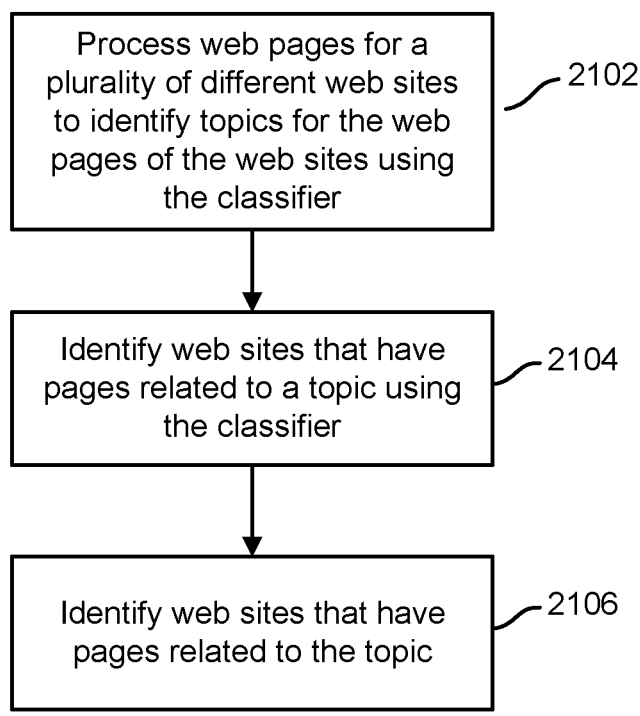
FIG. 21 is a flow diagram illustrating a process performed by the classifier for generating labels for websites to facilitate categorizing of documents in accordance with some embodiments.

FIG. 21 is a flow diagram illustrating a process performed by the classifier for generating labels for websites to facilitate categorizing of documents in accordance with some embodiments. In some embodiments, the process 2100 for generating labels for websites to facilitate categorizing of documents is performed using the disclosed system/service (e.g., including classifier 1740 of search and feed system 1700 of FIG. 17), such as described above.

Referring to FIG. 21 at 2102, processing web pages for a plurality of different websites is performed to identify topics for the web pages of each of the websites using the classifier (e.g., the classifier that was previously trained using training data sets as similarly described above). For example, the classifier can determine that all pages with a URL of "http://example-web-site-1.com/sports" are likely about sports and that all pages with a URL of "http://example-web-site-1.com/technology" are likely about technology and that all pages with a URL of "http://example-web-site-2.com" are likely about astronomy and that all pages with a URL of "http://example-web-site-32.com" are likely about chemistry.

At 2104, the classifier can identify websites that have pages related to a topic (e.g., mostly about a given topic based on a relative, threshold categorization determined using the classifier). At 2106, invert and identify the websites with labels for the topic. As a result, all pages with similar URLs can be labeled accordingly based on this inference (e.g., "http://example-web-site-1.com/sports/ . . . " can be labeled as being about sports, "http://example-web-site-1.com/technology/ . . . " can be labeled as being about technology, "http://example-web-site-2.com" can be labeled as being about astronomy, and "http://example-web-site-32.com" can be labeled as being about chemistry). For example, using the disclosed labeling techniques, a large number of websites (e.g., 100,000 or more websites) can be provided to the classifier for efficiently and accurately generating such labels.

Site Models

In one embodiment, unsupervised machine learning techniques are performed to generate a set of words/terms relevant to a given website. The generation of the set of words/terms relevant to the website is distinct from the classification of the site that is described above. In an example implementation, an initial set of training data is utilized that includes the site and words used to describe the site. For example, the system can determine what the site is about based on how other sites/users link to the sites (e.g., based on words associated with tweets, anchors, or other links/references to the site, which can be used to discriminate what others are saying about the site). The site models can then be generated based on a ranking of each site for every term. For example, the disclosed techniques can be applied to allow the site models to determine that TechCrunch (www.techcrunch.com) is better for technology related content than ESPN (www.espn.com), CNN (www.cnn.com), and/or other sites based on the ranking of the term "technology" for the sites.

In one embodiment, the disclosed collaborative filtering techniques are used to identify which sites are more relevant to which terms. For example, embedding-based techniques can be applied to determine a proximity in the disclosed n-dimensional space between a term/topic and a site, such that sites that are closer in the n-dimensional space to the location of the term/topic in the n-dimensional space can be deemed to be more relevant to that term/topic.

In an example implementation, the site models can be used to provide a site boost signal for documents from a site that is determined to be authoritative for a given term/topic based on the ranking of that site for that term/topic in the disclosed site models techniques.

Long Term Leaf Techniques to Identify New Content

In one embodiment, long term leaf techniques are utilized to facilitate identifying new content to provide to users using the search and feed system. For example, the disclosed long term leaf techniques can be performed to show unique documents to a user (e.g., documents relevant to the user's interest(s)) since their last use of the app (e.g., a mobile application or other application or site to access the search and feed service).

In one embodiment, the document dimensions include a dimension for documents that indicate how new the content is in the document relevant to the topic to help identify what document is (relatively) new for that given topic/interest. As further described below, the long term dimension can be used to identify new articles for last hour/day or for a longer period of time, like the last month or for a longer period of time for new interests for a user.

Figure 22:
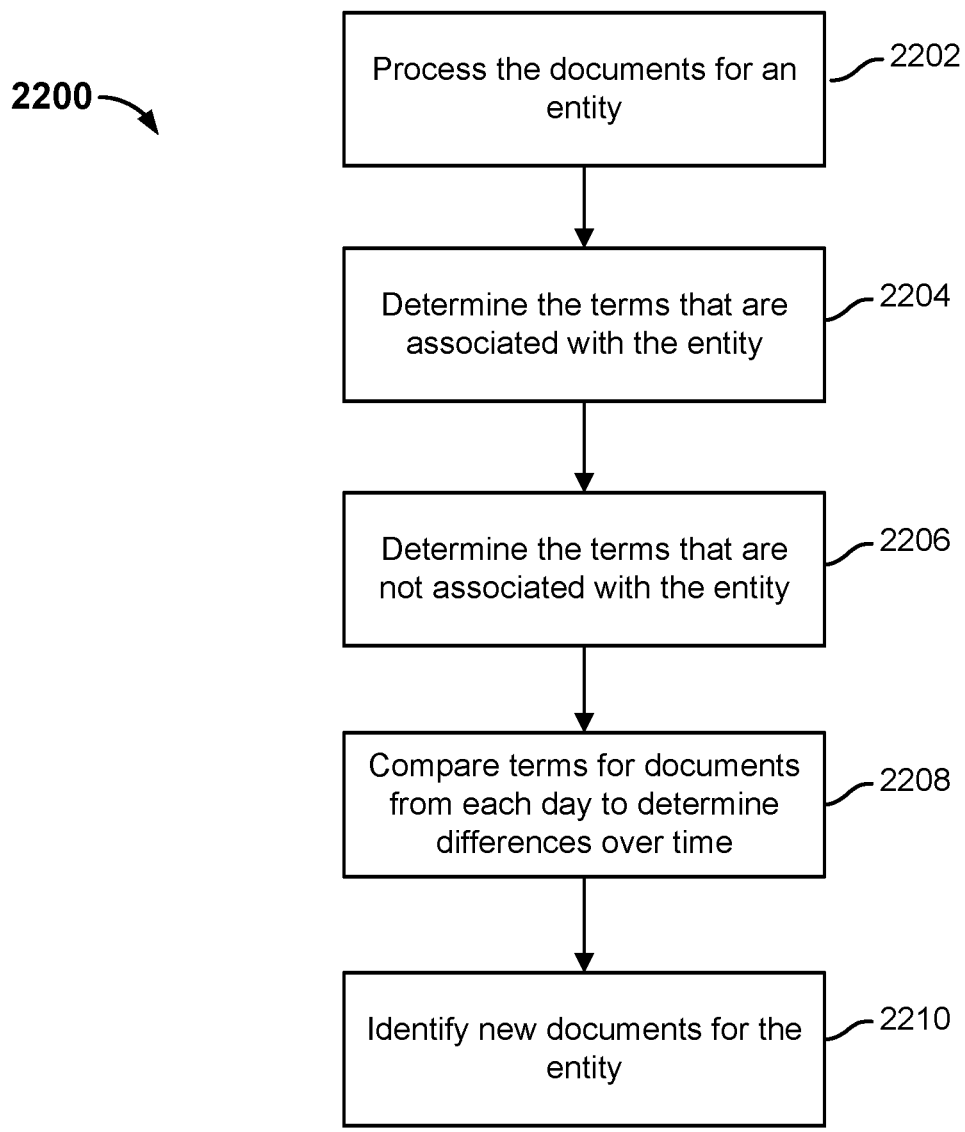
FIG. 22 is a flow diagram illustrating a process for identifying new content aggregated from online sources in accordance with some embodiments.

FIG. 22 is a flow diagram illustrating a process for identifying new content aggregated from online sources in accordance with some embodiments. In some embodiments, the process 2200 for identifying new content aggregated from online sources to facilitate the long term leaf techniques described herein is performed using the disclosed system/service (e.g., including indexer 1732 of search and feed system 1700 of FIG. 17), such as described above.

Referring to FIG. 22, at 2202, the documents for an entity (e.g., an interest can be based on one or more entities, such as the "Hubble space telescope" entity) are processed. For example, the documents collected that are associated with an entity can be processed per day or some other period of time. At 2204, the terms that are associated with the entity are determined (e.g., planets and stars are associated with the Hubble space telescope entity). At 2206, the terms that are not associated with the entity are determined (e.g., celebrity is not associated with the Hubble space telescope entity).

At 2208, terms for documents from each day (e.g., or some other processing period) are compared to determine differences in terms of documents over time (e.g., if two documents for the entity from two different days have different terms then they can be determined to be distinct or different enough to boost a score, such as a long term leaf score/signal that is part of the document dimensions, such as a newly discovered planet with a new name is discovered using the Hubble telescope, then on the day of that announced new planet, such a document for that announcement would get a boosted score). As such, the disclosed techniques can be applied to indicate what is new today that is related to the entity (e.g., applies to query/interest for the disclosed not now search techniques provided by the search and feed system).

At 2210, new documents for the entity are identified. For example, a new document for the entity can be determined based on determining that the new document includes a threshold number of distinct terms as compared to documents for the entity from different days or other periods of time.

As an example, the disclosed techniques can be applied to show unique documents per day from a user's last visit/use of the app (e.g., to catch up on relevant content for the entity after the work week, vacation, or some other period of time) and can provide at least one document that is representative of the change/new relevant content per day without being repetitive of what content was previously provided to the users (e.g., unlike a typical online search engine, which will generally provide the same or at least partially repetitive search results to a user over time for a given query, such as "Hubble space telescope" including, for example, a Wikipedia entry and Nasa website entry for the "Hubble space telescope" entity).

As another example, the disclosed techniques can be applied to identify unique content over a longer period of time to identify an optimized set of documents to return for a query or interest. For instance, if a user first queries for "Hubble space telescope" or user first adds "Hubble space telescope" as an interest, then the search and feed system can initially return a set of content that includes the Wikipedia entry and Nasa website entry for the "Hubble space telescope" entity, but subsequently will return different/newer content for the "Hubble space telescope" entity for subsequent queries from that user for the "Hubble space telescope" entity or subsequent viewings of content for that the "Hubble space telescope" entity by that user while using the app.

Trending Server Generates a Trending Signal for Documents

In one embodiment, the trending server (e.g., trend models, which can be implemented using trending server 1730 of FIG. 17) provides a trending signal to boost scores associated with documents based on the trending signal. For example, the trending signal can be used to boost a score of a document, which can then be provided as an input to the indexer (e.g., as shown at 1712 of FIG. 17 to determine whether to reevaluate/reindex the document as similarly described herein). As another example, the trending signal can also be provided as an input to the orchestrator or other components of the search and feed system as further described herein (e.g., as an input that can be used by the orchestrator to select relevant and trending documents to include in a feed and/or return to a query for a user).

In an example implementation, the trending and/or other signals coming in can be measured on a per token basis (e.g., based on entities or terms). In this example, the trending server is a parallel service that provides a boost of a trending score that can be used as a boost for the document score and also can be used as a signal for whether to reindex the document. Each document is tokenized into a set of terms (e.g., entities, terms, etc.) and maintains an exponential moving average per token, which can then be used as a boost of a score for a document and also used for a signal to determine whether to re-index based on the re-index logic (e.g., relative to baseline for that topic). The trending server can maintain the exponential moving average for one or more time scales (e.g., documents are tokenized and then all tokens pushed through the pipe/trending server, which maintains moving counts/averages per token, such as on a per second, minute, hour, day, week, month, year, and/or other time scale). As such, the trending signal can indicate a rate of information about a certain topic (e.g., during a day of the Summer Olympics, then a 1000 tweets/second may be an observed tweet rate for that entity).

For example, the trending signal can then indicate how many documents relevant to a given topic were processed by the indexer during the last hour and last week, which can also indicate whether the velocity of that topic is trending up or trending down and whether that document is relevant to a user's interest/query. In some cases, the disclosed trending signal techniques can also be used to facilitate determining a document's relevancy to the user's interest/query based on identifying the topics associated with the document and the popularity of those topics. For instance, if the user follows Apple Inc. (Apple) as an interest, and a new iPhone was released in the past few days, then iPhone is likely a more popular topic this week than last week. In this example, if there are two new documents available that are both related to Apple but only a first document of the two new documents is also related to iPhone and iPhone is a trending topic, then the trending server can boost the trending signal for the first document, which can be processed by the orchestrator to select the first document to include in the user's content feed or in response to the user's query over the second document.

As another example, assume that the Go programming language is an interest of a user. Given that the search and feed system may add and process new documents related to the Go programming language at a generally lower rate than for documents related to other topics such as for Apple (e.g., articles related to the Go programming language or are relatively infrequent as compared with articles related to the Apple Company), one new document can be relatively significant and the delta can be large for that topic. In such cases, the trending server can boost the score of the document for such lower activity topics based on the relative delta as compared with the moving average or baseline for documents observed/processed over time by the search and feed system as described above (e.g., to boost in ranking documents related to such topics that may have a baseline of 10 or some other relatively low number of articles per week and about 10 tweets per article, such that a new article related to that topic that is associated with 100 tweets can be boosted using the trending signal generated by the trending server based on such relatively low volume over a longer time period).

Indexer and Serving Stack for Generating a Real-Time Document Index (RDI) for the Search and Feed System In one embodiment, indexer 1732 and inverted index serving stack 1734 generate a Real-Time Document Index (RDI) for providing documents relevant to queries/interests of users for the search and feed system. The disclosed graph, such as shown in FIG. 18, facilitates an efficient processing of newly added documents by the indexer to efficiently and rapidly update the inverted index serving by the inverted index service stack (e.g., also referred to herein as the Real-Time Document Index (RDI)), because the indexer does not have to scan all the documents and generate each of their inter-relationships as such is captured by the graph overlay structure of the table as similarly described above. In an example implementation, the disclosed indexer and inverted index serving stack can support, for example, 100,000 changes per second to the index. Thus, unlike an index for a traditional online search engine, the disclosed RDI is dynamically and rapidly updated and changing to support (near) real-time content changes in the online world (e.g., newly posted documents, social network feed data, and/or other online content/data).

In one embodiment, the index is inverted and output to the serving structure as shown at 1714 of FIG. 17. In an example implementation, a cloud service can be utilized to provide the serving stack for the search and feed service or an internal data center with a serving stack can be utilized by the search and feed service. The serving stack can be configured to be responsive to user queries/requests (e.g., generally should be responsive with less than a 300 millisecond (ms) delay).

Figure 23:
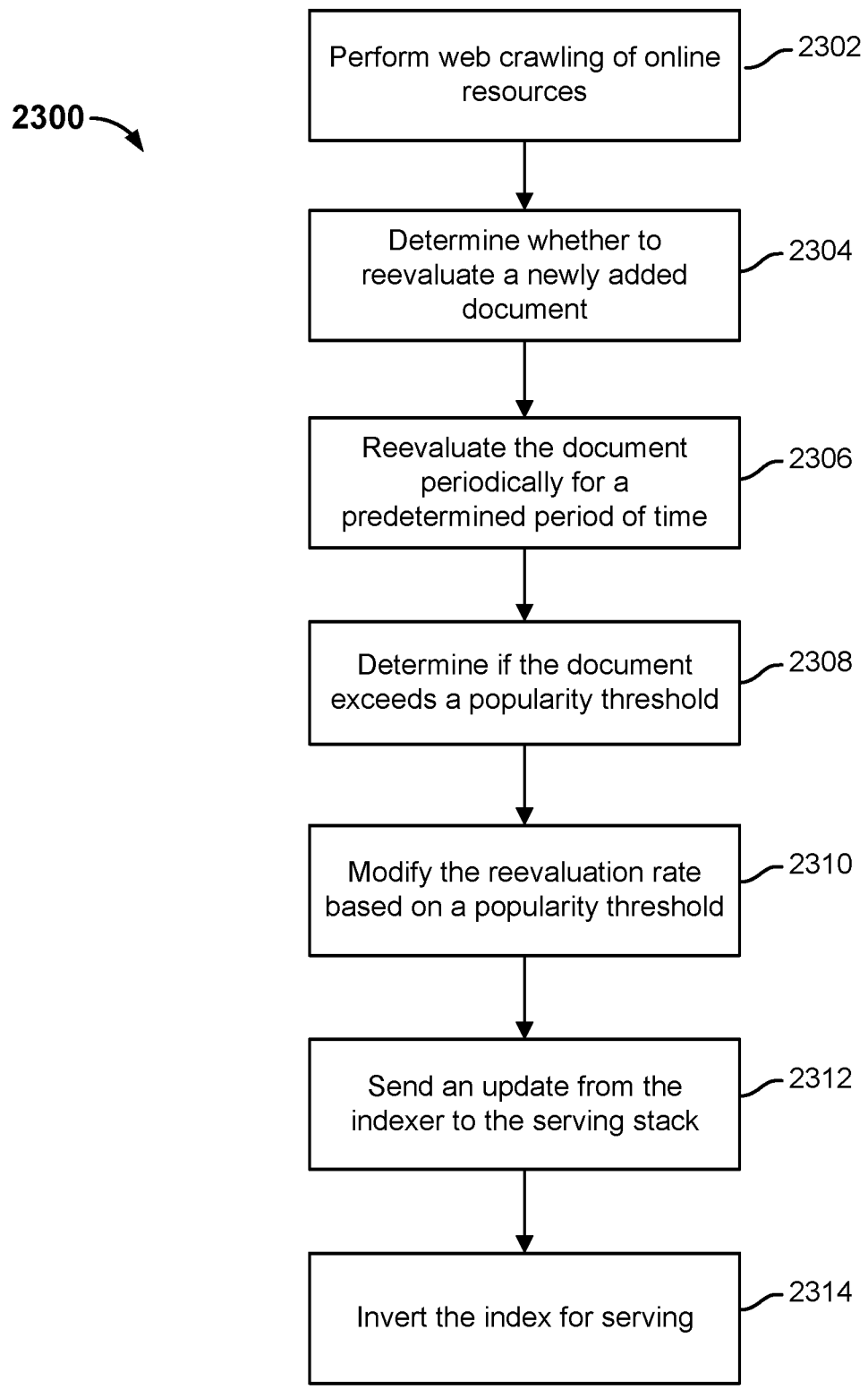
FIG. 23 is a flow diagram illustrating a process for determining whether to reevaluate newly added documents in accordance with some embodiments.

FIG. 23 is a flow diagram illustrating a process for determining whether to reevaluate newly added documents in accordance with some embodiments. In some embodiments, the process 2300 for determining whether to reevaluate newly added documents to facilitate rapid updates to the RDI described herein is performed using the disclosed system/service (e.g., including indexer 1732, scheduler 1728, and inverted index serving stack (RDI) 1734 of search and feed system 1700 of FIG. 17), such as described above.

In one embodiment, the RDI is rapidly refreshed and updated based on online content changes in the online world to facilitate identifying new content to provide to users using the search and feed system. For example, website content changes (e.g., new web pages or other content changes), social network feed changes (e.g., new posts), and/or other online world changes that are relevant to any of the documents in the RDI can be monitored and the RDI can then be updated as further described below.

Referring to FIG. 23, at 2302, web crawling of online resources is performed. In this example, the search and feed system utilizes work queues referred to as a time series for web crawler tasks to be performed, including websites/pages to be crawled or recrawled (e.g., a social network feed that includes a user's post that links to a site/page not already in the crawled list/table can be added to the time series for the web crawler to crawl that site/page to collect the linked document in that post). For example, the web crawler (e.g., web crawler 1722 of FIG. 17) can be configured to crawl different websites/pages based on the time series of links (e.g., URLs added in a time series sequence for crawling using scheduler 1728 of FIG. 17). In this example, the indexer receives a time series of new documents added to the crawl table and for it to perform indexing tasks on each of such new documents added to the graph data store to read the data and process to identify interesting attributes/content associated with the data of each new document to effectively understand the document/that row of data in the table of the graph data store including content (e.g., body, title, tweets are saying/entropy signals, anchors, Reddit posts, etc.) and document related metrics (e.g., popularity of document, relevance of document: "MacBook": score; "Apple": score, etc.) as similarly described herein.

For instance, if a user tweets about a new posted article (e.g., web page on a website, as publishers generally post a tweet or other online announcement that indicates that a new article is being released or posted on their site at about the same time as it is being released/posted on their site, so such can provide a timely notification to add to the time series/crawl list for crawling and indexing to timely update the RDI as similarly described herein), then the delay to the serving stack can be as little as one minute or less during which the new web page is crawled, indexed, and available as a newly added document in the RDI provided by the serving stack (e.g., the serving structure as shown at 1734 of FIG. 17).

At 2304, whether to reevaluate a newly added document (e.g., a URL associated with a document) at a future time is determined by the scheduler (e.g., scheduler 1728 of FIG. 17). At 2306, the document can be reevaluated periodically for a predetermined period of time to determine whether the document is increasing in popularity. For example, the document can be revisited every minute or some other time interval (e.g., every one minute for five minutes or some other predetermined period of time and determine whether a popularity threshold is determined).

At 2308, determining if the document exceeds a popularity threshold is performed (e.g., or some other threshold or combination of thresholds based on usefulness factors/signals as described herein or other metrics associated with the document and online activity/sources). At 2310, modifying the reevaluation rate based on a threshold change in the document's popularity is performed. For example, if the document exceeds a popularity threshold, then the document can be reevaluated every two minutes or some other period of time for a predetermined period of time. However, if the document's popularity is slowing down (e.g., decreasing levels of associated commentary or other indicia of popularity, such as likes, retweets, etc.), then the reevaluation frequency can be increased to a greater period of time (e.g., five minutes or a greater period of time).

As another example, the reevaluation determination can be dynamic in nature based on indicia/metrics of popularity (e.g., or another usefulness signal(s) as described herein), such as a number of links (e.g., delta of links since last (re)evaluation), a commentary volume (e.g., when expected to increase its commentary volume dialogue text, such as if 100 tweets/minute have linked to the article, then reevaluate again after a total of 110-120 tweets/minute or some other threshold difference in commentary dialogue is observed online), or some other threshold change of activity associated with the document is observed online (e.g., 10-25% change or some other threshold rate of change of some online measure/metric). For example, the reevaluation metric can be based on the number of links to the document. For instance, if the number of document links is close to 0 at time (t) equals zero, then reevaluate periodically at a relatively short interval such as one minute intervals for a predetermined period of time to determine whether the number of document links has increased and at what rate of change (e.g., is the calculated derivative above a threshold value or not, such as 10-25% rate of change or some other threshold change of the number of links). In this example, if the number of document links is greater than a maximum update, then do not reevaluate again. If the number of document links is less than a maximum update, then reevaluate again. In one embodiment, the calculated derivative can also be provided as an insights generation signal as an indication of the rate of change for online activity associated with the document.

At 2312, the indexer sends an update of newly added documents and/or reevaluated documents to the serving stack. For example, using the disclosed techniques, the indexer can send frequent updates to the serving stack to provide an updated and near real-time snapshot of the state of such documents and associated information (e.g., popularity, relationships to other entities/documents, etc.) about past/previously processed and indexed documents and newly processed and indexed documents.

At 2314, the serving stack receives the update to the index and inverts the index for serving using the search and feed system. In one embodiment, the serving stack provides a serving stack that can respond to user queries and also provide content feeds to users based on the users' respective interests as similarly described above. As also described above, the serving stack stores the RDI, which is configured to support an efficient implementation for a rapidly changing index (e.g., rapidly updating the real-time document index (RDI), that is, supports new additions/changes to the index in near real-time and still supports very fast search and retrieval that is just as responsive as a traditional search engine index that is generally not a rapidly changing search index). In an example implementation, the serving stack is implemented to minimize two delays: (1) a delay/time from when content and other meta/signal data associated with changes in the online world are captured (e.g., collected, processed, and stored) in the RDI; and (2) a delay/time from when a user queries or requests a refresh of their interests and returning of responsive documents from the inverted index/RDI to the user (e.g., as similarly described above, the serving stack can be configured to be responsive with less than a 300 millisecond (ms) delay).

In an example implementation, the serving structure receives index updates from the indexer (e.g., as shown at 1714 for communications between indexer 1732 and serving stack 1734 of FIG. 17) via protocol buffers for encoding data structures that are compact for data transmission over a network (e.g., the Internet). For example, the protocol buffers can be implemented using Google open source protocol buffers (e.g., Google's language-neutral, platform-neutral, extensible mechanism for serializing structured data that is publicly available open source from Google, or other encoding techniques can be implemented, such as JSON encodings or other encodings). In this example implementation, the protocol buffers are optimized for sending encoded data structures to the serving stack such that the serving stack can then efficiently invert that index related data to update the inverted index.

As further described below, the serving stack executes the orchestrator components to respond to queries and generate content feed updates for users of the search and feed system. In this example implementation, the serving stack stores the RDI, which is an inverted index that inverts the collected and indexed documents to a topic space, which maintains a mapping of the topics associated with one or more of the documents (e.g., which is not pre-sorted in this example implementation, but the topics and documents are associated with each other in the reverse index data structure as described above). The orchestrator components can utilize the inverted index to select relevant documents (e.g., based on user context and document signals to select (a prioritized/highest scoring subset) relevant and fresh/timely documents, including example document signals for freshness/long term leaf, popularity, relevance, authority by site, and/or other usefulness signals, such as described herein) to respond to a user's query and/or update the user's content feed as further described below. As noted above, in this example, the documents are not pre-sorted based on scores in the inverted index, rather such are just ordered based on freshness of when the document was collected and added into the graph data store for processing/indexing and provided to the serving stack as an update to the index that is inverted to generate the RDI.

In one embodiment, the orchestrator components execute the disclosed embedding-based retrieval techniques (e.g., and/or other collaborative filtering techniques) to retrieve relevant documents from the RDI to respond to user queries and/or update user content feeds. The orchestrator components and embedding-based retrieval techniques are further described herein.

In one embodiment, documents relevant to topics for less popular/common interests (e.g., long tail interests) are also collected, processed, and updated in the serving stack's reverse index (e.g., RDI). In some cases, crowd sourcing or other algorithmic collection mechanisms can be performed to identify online sources for such less popular/common interests and to collect documents from such online sources.

Various additional processes can be performed using the above-described system/service to implement the various techniques for generating an index for enhanced search based on a user's interests as will now be described below.

Figure 24:
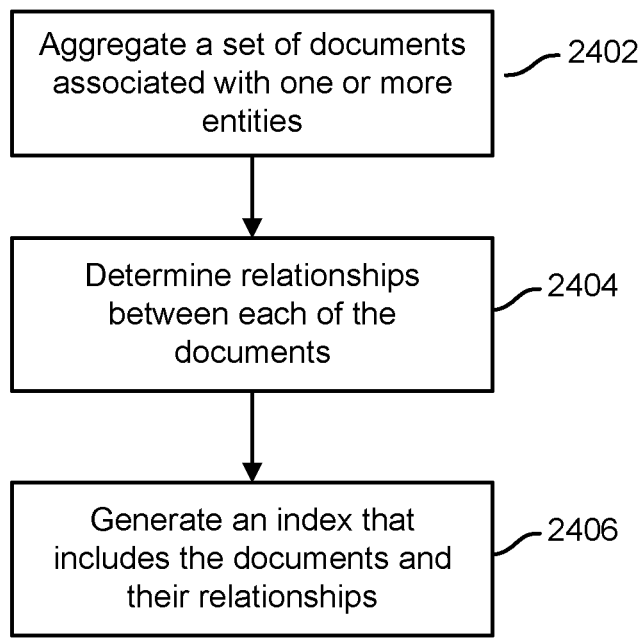
FIG. 24 is a flow diagram illustrating a process for generating an index for enhanced search based on user interests in accordance with some embodiments.

Additional Example Processes for Generating an Index for Enhanced Search Based on User Interests FIG. 24 is a flow diagram illustrating a process for generating an index for enhanced search based on user interests in accordance with some embodiments. In some embodiments, the process 2400 for generating an index for enhanced search based on user interests is performed using the disclosed system/service, such as described above.

Referring to FIG. 24, at 2402, aggregating a set of documents (e.g., web documents and/or other online content) associated with one or more entities is performed, in which the documents are retrieved from a plurality of online content sources. For example, the documents can be collected as similarly described above.

At 2404, relationships between each of the documents are determined, in which the relationships include online relationships. For example, the documents can be processed and indexed as similarly described above.

At 2406, an index that includes the set of documents and the relationships between each of the set of documents is generated. For example, the index can be used to facilitate search based on user interests as described herein.

Figure 25:
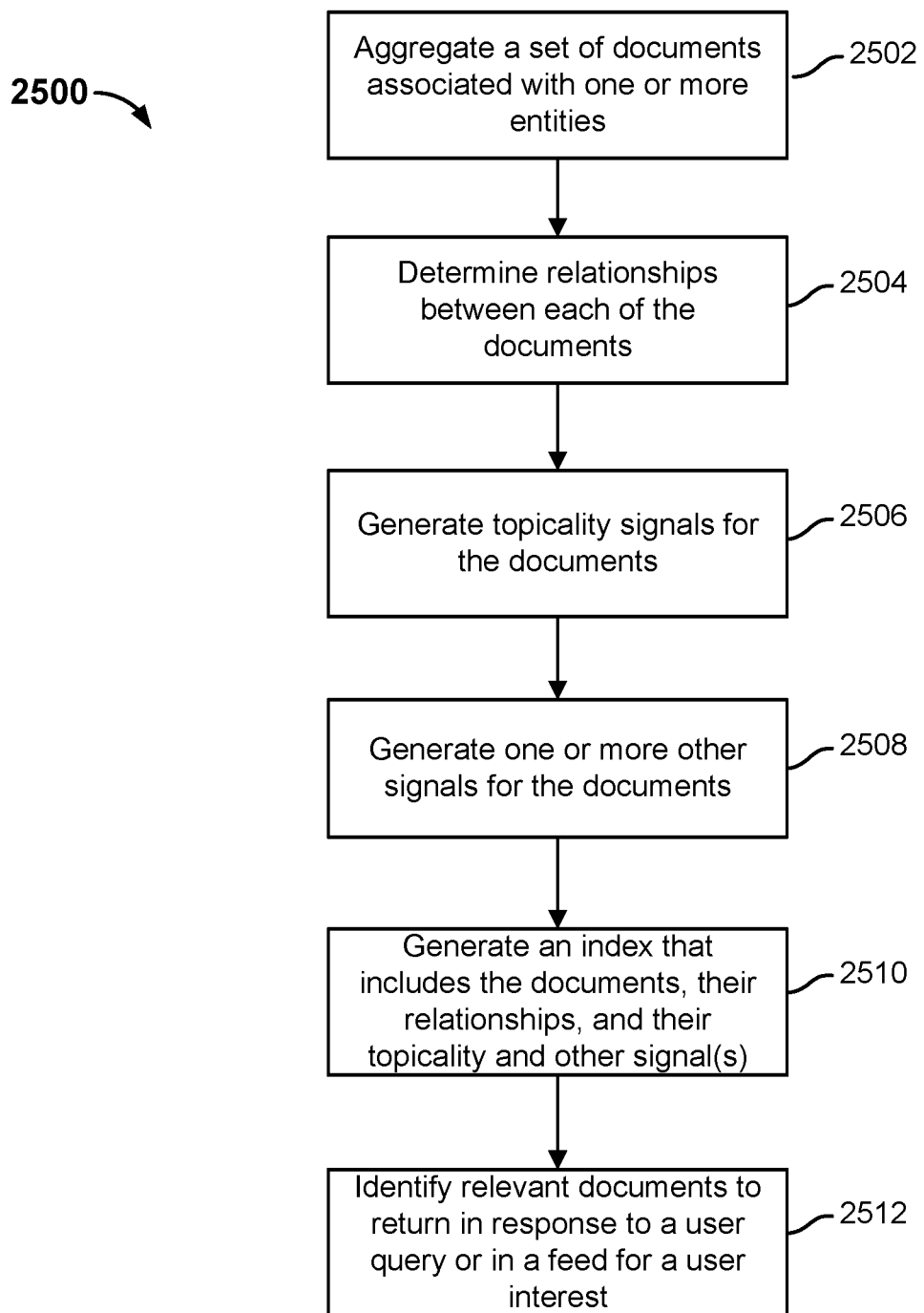
FIG. 25 is another flow diagram illustrating a process for generating an index for enhanced search based on user interests in accordance with some embodiments.

FIG. 25 is another flow diagram illustrating a process for generating an index for enhanced search based on user interests in accordance with some embodiments. In some embodiments, the process 2500 for generating an index for enhanced search based on user interests is performed using the disclosed system/service, such as described above.

Referring to FIG. 25, at 2502, aggregating a set of documents (e.g., web documents and/or other online content) associated with one or more entities is performed, in which the documents are retrieved from a plurality of online content sources. For example, the documents can be collected as similarly described above.

At 2504, relationships between each of the documents are determined, in which the relationships include online relationships. For example, the documents can be processed and indexed as similarly described above.

At 2506, topicality signals for the documents are generated. For example, the topicality signal can provide a measure of how relevant the document is to a given topic (e.g., entity or term(s)).

At 2508, one or more other signals for the documents are generated. For example, various other usefulness signals (e.g., entropy-based popularity signals, trending signals (such as based on a moving average), freshness signals, and/or other signals) can be generated as described herein.

At 2510, an index that includes the set of documents, the relationships between each of the set of documents, and topicality and other signal(s) for the documents is generated. For example, the index can be used to facilitate a search based on user interests as described herein.

At 2512, identifying relevant documents to return in response to a user query or in a feed for a user interest is performed. For example, the disclosed orchestrator related components and processes can be performed to identify relevant documents to return in response to a user query or in a feed for a user interest.

Figure 26:
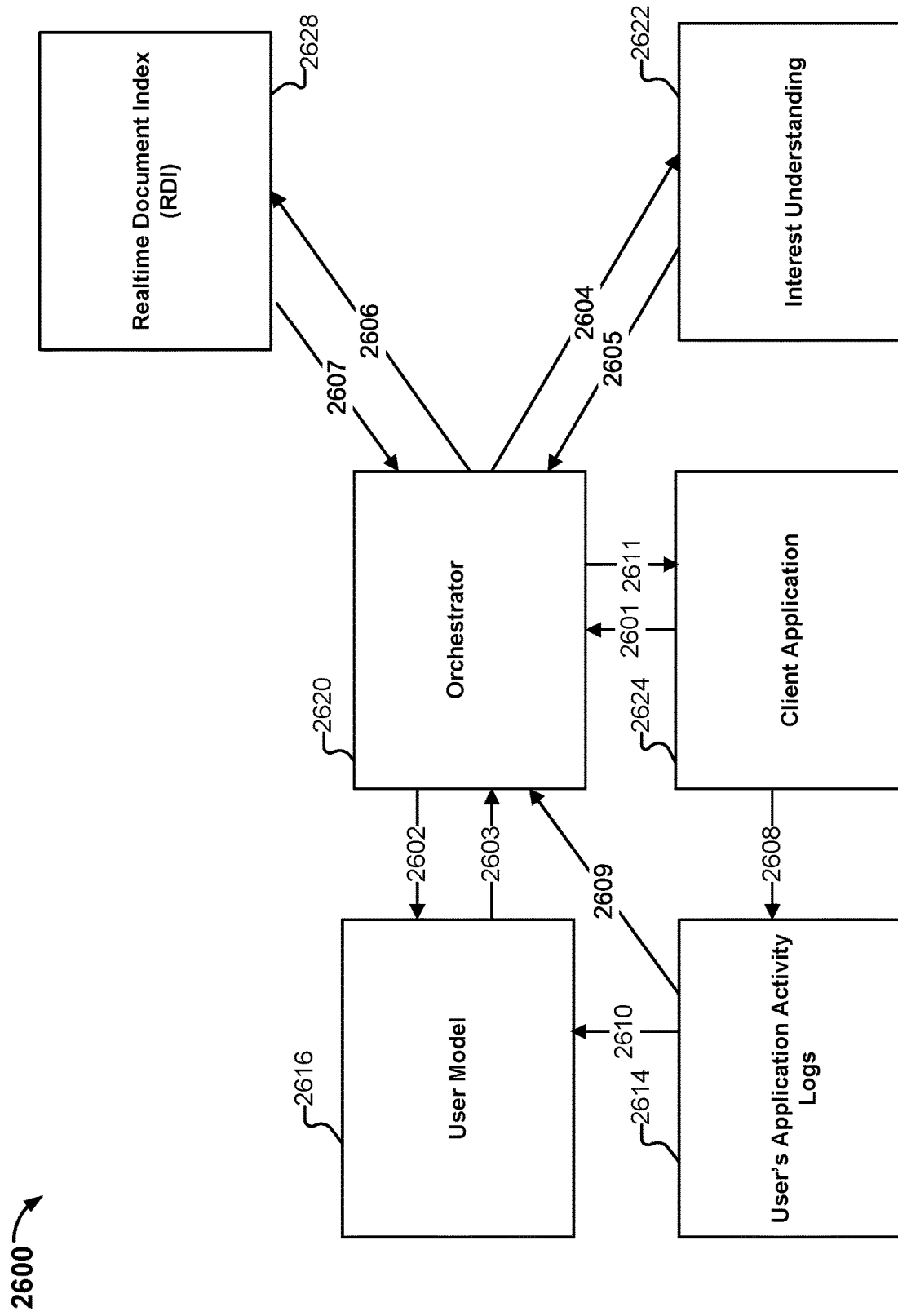
FIG. 26 is another view of a block diagram of a search and feed system illustrating orchestrator components and interactions with other components of the search and feed system in accordance with some embodiments.

Embodiments of the Orchestrator Components and Interactions with Other Components FIG. 26 is another view of a block diagram of a search and feed system illustrating orchestrator components and interactions with other components of the search and feed system in accordance with some embodiments. In one embodiment, FIG. 26 illustrates embodiments of the orchestrator components and interactions with other components of search and feed system 2600 for performing the disclosed techniques implementing the search and feed system as further described herein. For example, the orchestrator components and interactions as shown in system 2600 can be implemented using search and feed service 102 described above with respect to FIG. 1, search and feed system 200 described above with respect to FIG. 2, and/or search and feed system 300 described above with respect to FIG. 3 (e.g., user's application activity logs 2614 can be implemented by user's application activity logs 314, user model 2616 can be implemented by user model 316, orchestrator 2620 can be implemented by orchestrator 320, interest understanding 2622 can be implemented by interest understanding 322, client application 2624 can be implemented by client application 324, and realtime document index (RDI) 2628 can be implemented by realtime index 308).

Referring to FIG. 26, at 2601, orchestrator 2620 (e.g., an orchestrator server that executes the orchestrator component and subcomponents as described herein) receives a user request from a client application 2624 (e.g., via the Internet). For example, the user request can be triggered when the user logs in and/or requests new/updated content in client app 2624 (e.g., the app executed on the user's client device as described herein, in which the request can include, for example, a swipe down in the content feed user interface (UI) of the app, when the user enters a query (e.g., a new query that is processed as a new interest as described above), or another UI interaction to indicate a user request.

At 2602, orchestrator 2620 performs a lookup in a user model 2616 (e.g., the user model server that executes the user model component and subcomponents as described herein). For example, the orchestrator receives the user request, and the orchestrator then performs a lookup in the user model based on a user ID associated with the user request. In an example implementation, the user ID can be an internal user ID that is uniquely mapped to external account information associated with the user (e.g., an external email account or social networking account, such as a Facebook, LinkedIn, or Twitter account) that is mapped to an internal ID.

At 2603, user model 2616 responds to the lookup and sends the user's set of interests to orchestrator 2620. For example, the user model can store a set of interests associated with the user ID. As similarly described above with respect to FIG. 3 and various other embodiments, the user model component learns a user's interests based on, for example, demographic information, psychographic information, personal tastes (e.g., user preferences), an interest graph, and a user graph. In an example implementation, the user model server can return interests and associated context information (e.g., constraints/parameters, such as further described herein) from the user model associated with the user ID.

In one embodiment, an interest includes a query (e.g., a query string) and a context (e.g., a geolocation constraints/parameters, time constraints/parameters, and/or other constraints/parameters, which can be input by the user for a given interest/query and/or can be automatically learned by the system based on monitored user activity and/or user feedback as described herein). For example, the interests representation can be implemented as a string, such as "baseball games bay area" and can also have associated per user constraints/parameters, such as certain time window(s) or at certain location(s) (e.g., weekend and geolocation ranges: San Francisco Bay Area).

At 2604, orchestrator 2620 performs a lookup of the user's interests in an interest understanding server 2622 (e.g., the interest understanding server executes the interest understanding component and subcomponents as described herein including the above-described LaserGraph/entity graph that shows relationships between various entities as described herein). For example, the set of interests received from the user model can be queried in the interest understanding server to better understand each of the interests based on information stored in the interest understanding server including, for example, entity relationships based on the entity graph, query segmentation, disambiguation/intent/facet, search assist, and and/or synonym tables as similarly described above (e.g., each of these (sub)components can be loaded in memory of a server to facilitate efficient processing and response times to such lookups of users' interests). In an example implementation, the interest understanding server annotates one or more of the interests of the set of interests (e.g., the set of interests that were received by the orchestrator server from the user model server), and returns the annotated set of interests to the orchestrator server.

At 2605, orchestrator 2620 receives the annotated set of interests for the user from interest understanding 2622. As an example, if an interest for a given user ID is hot Indian food, then the interest can be annotated with hot or spicy Indian food. As another example, interests can be translated to mean different things based on a context, such as a time and/or a location (e.g., Bay Area can have a different annotated meaning for a user that is located in the San Francisco Bay area of California as opposed to another user that is located in the Tampa Bay area of Florida).

In another example implementation, the user model server can periodically consult the interest understanding server to update the users interests with the annotated interests and store such in the user model (e.g., this would reduce the orchestrator's above-described lookup operations to just performing a lookup based on the user ID in the user model as described above with respect to 2602 and 2603, and the orchestrator would not separately perform a lookup in the interest understanding server as described above with respect to 2604 and 2605 as such processing would be performed automatically (periodically and/or on demand) and be communicated between the user model server and interest understanding server to consolidate such information in the user model server's data stored for the interests associated with each user ID).

At 2606, orchestrator 2620 performs a search of the user's interests in realtime document index (RDI) 2628. In one embodiment, the orchestrator server performs a search of the RDI (e.g., implemented as a realtime graph in a Bigtable as described herein) using the Laser Root (e.g., a server that collects information from a number of indexes and data sources, to store in a central repository and facilitate generation of a content feed for users), which is connected to leaves of the realtime graph of the RDI server with a list of annotated interests to obtain online content (e.g., documents) based on the set of annotated interests. In an example implementation, the request with the set of annotated interests is sent to the Laser Root of the realtime graph, and in response, the Laser Root matches interests to documents in a search operation performed on the realtime graph. In this example, the Laser Root returns a predetermined number of documents for each (annotated) interest (e.g., assuming that 10 results are configured to be returned per interest, then for an example of 100 interests for a given user, the Laser Root can return 1000 documents in this example, and/or less in some cases if there were not 10 results for one or more of the interests based on threshold scoring/matching as described herein).

In one embodiment, the request with the set of annotated interests is sent to the Laser Root of the realtime graph, and in response, the Laser Root performs a search of the tree from the realtime graph to match interests to documents in a search operation performed on the realtime graph. For example, for an interest that can be represented as (A or B or C) AND (E or F or G) where A, B, C are synonyms of each other and E, F, and G are synonyms of each other, then the search of the tree can be implemented using the disclosed soft-OR and soft-AND techniques. In an example implementation, soft-OR and soft-AND are implemented using power-mean techniques. A power-mean of n over numbers, for example, x and y is described as: power-mean(x, y, n)=(x^n+y^n)^1/n (each raised to the power n, added together, then calculate 1/nth root). This technique can be used to compute both OR and AND, which is described above as soft-OR and soft-AND (i.e., it is not the same as a classic OR and a classic AND). In this example implementation, in order to compute soft-OR, n is set to 10, for soft-AND, n is set to −2. The effect of this technique is that power-mean is low for soft-AND if any of the values are low (e.g., similar to an AND query), and soft-OR is high if any of the x or y is high (e.g., similar to a classic OR).

In one embodiment, the disclosed embedding-based retrieval technique is another technique used to retrieve documents for each annotated interest as similarly described above. For example, using the above-described embedding techniques, an interest and a set of documents can be mapped into the same n-dimensional space. As used herein, an entity is a component of an interest, and an interest is composed of one or more entities and the interest can also include one or more keywords. For example, [machine learning in enterprises] could be an interest, which is composed of two entities, which include "machine learning" and "enterprise." Similarly, [home depot discounts] could be an interest with just one entity, that is, "home depot," in which "discounts" is not an entity, and rather it is just a keyword. As such, embedding-based retrieval can be used to identify a set of documents that are nearby a given interest, based on the n-dimensional value for each of the documents and for the given interest that determines their location within the n-dimensional space (e.g., if a given user has an interest in an entity such as US Patent Law or President of the United States, or a set of terms that specify that interest/query, then this technique can be applied to identify documents near that entity or the set of terms that specify that interest/query in the n-dimensional space). As such, embedding-based retrieval can accurately and efficiently facilitate identification of documents that are relevant to a given interest as any terms of that interest can similarly be mapped into the same n-dimensional space using the disclosed techniques for collaborative filtering.

At 2607, orchestrator 2620 receives a set of documents from RDI 2628. In one embodiment, each of the documents has an associated score (e.g., a document score). For example, the document score can be generated using the document scoring techniques further described below.

In one embodiment, orchestrator 2620 processes the set of documents based on the document score associated with the document and user dependent inputs (e.g., such as based on which interests, documents, and/or other content the user has seen in the past and the user's past actions, user preferences for content, and frequency of certain interests, etc.). An example implementation of document scoring for generating the feed performed by the orchestrator is further described below.

As shown at 2608, client application 2624 stores/logs monitored user activity to a user's application activity logs 2614. As similarly described above with respect to FIG. 3 and various other embodiments, the user's application activity logs component monitors the user's in-app behavior (e.g., monitors the user's activity within/while using the app, such as client application 2624) including, for example, searches, followed interests, likes and dislikes, seen and read, and/or friends and followers. The user's application activity logs (e.g., initially captured and locally stored by the client application executed on the user's device) can be periodically provided to the orchestrator as shown at 2609 (e.g., via a push and/or pull operation) as well as to the user model server as shown at 2610 (e.g., via a push and/or pull operation). As a result, the orchestrator server can process the user's application activity logs (e.g., app feedback, user actions, previously viewed documents, etc.) to utilize as input (e.g., user dependent inputs as similarly described above) for potential interests and/or documents to provide to the user in response to the user request received at 2601.

In one embodiment, the app monitors user feedback and sends user feedback signals to the orchestrator. For example, user signals (e.g., including monitored user activity and user feedback) can be provided as a signal/input to a machine learning model using machine learning techniques (e.g., collaborative filtering, matrix factorization, logistic regression, neural networks (deep learning), word and sentence embedding (using deep learning), and/or other machine learning techniques can be applied) to improve/optimize user engagement with the app (e.g., how much time the user is spending on the app) or to improve/optimize another metric (e.g., how frequently does the user select a card for viewing in more detail and/or comment or share content via email, social networking, or other mechanisms for commenting/sharing content with other users/persons). In an example implementation, per user metrics are monitored and stored for each user's interactions with the app (e.g., user engagement with the app, such as user engagement with the content feed of the app), such as stored in one or more tables including what is sent to the user's feed, user's queries/interests input, how much time the user is spending on the app, how frequently is the user engaging with the app, how often is the user clicking, sharing, and feedback from the user, and/or other user related activities associated with the app/service. In this example, machine learning techniques can then be applied to maximize a metric/measure, such as to attempt to have a user engage with the app for a threshold period of time before exiting the app and/or how often the user reengages with using the app per day, week, month, or another time period.

In one embodiment, the search ranking component of orchestrator 2620 performs the disclosed processing of the set of documents received from RDI 2628 (e.g., the search/feed ranking component is shown as search ranking in Orchestrator 320 as shown in FIG. 3). In an example implementation, the orchestrator's feed ranking has information on which documents the user has already received in the user's feed, seen, read, clicked on, shared, and/or other activities such that the orchestrator can use that user activity related information as input as to which documents to select to show the user in addition to selecting the documents based on the document score relative to a given interest. For example, if a user has already seen a threshold number of articles related to the interest of NFL Playoffs in the last one hour but has not seen any articles related to another interest of Elon Musk Tesla in the past week, then the orchestrator can select articles related to this other interest of Elon Musk Tesla. As another example, the orchestrator can be configured to interleave interests, such that documents related to a first example interest of particle physics can be interleaved with other example interests such as Elon Musk Tesla and US Patent Law. As yet another example, if a user's past feedback/activities indicate that the user is only interested in one or two articles on Elon Musk Tesla per week, then the orchestrator can select only one or two articles for this interest per week for including in the user's feed.

In one embodiment, the search ranking component of orchestrator 2620 is configured to boost or demote interests by boosting or demoting a document score for a document(s) associated with the interest(s) to be boosted or demoted based on a user signal (e.g., monitored user activities and feedback) and to maximize user engagement with the app (or another metric). For example, if a user is engaging in a certain topic (e.g., reading several different articles related to a given interest X in the past period of time, such as the past 10 minutes or one hour), then the interest can be boosted to provide the user with more documents responsive to that topic. In comparison, if the user is not engaging in a certain topic (e.g., scrolled past several cards (without clicking/viewing the articles) for different articles related to a given interest Y in the past period of time, such as the past 10 minutes or one hour, or the user provides explicit feedback to indicate that the user prefers to see less content related to a given interest), then the interest can be demoted to provide the user with fewer or no documents responsive to that topic. In this example, the document score can be used as an ordering and selection of documents to generate in a content feed for the user. The selected and ranked set of documents can then be generated and communicated to the client application as further described below (e.g., the ranking facilitates a selection, such as if 1000 documents are retrieved, the ranking can identify the top 10 or some other number of documents to select to include in the user's feed).

In one embodiment, query demotion can be implemented by the orchestrator to facilitate interleaving of content for interests for the user's generated content feed (e.g., cards for different interests can be interleaved in the generated content feed for the user) to maximize user engagement, and based on user feedback/monitoring of user engagement. For example, documents related to the same interest returned from the RDI can be demoted so that the user's content feed is not dominated by too many cards from the same interest. In an example implementation, the orchestrator can be configured to demote each successive document for the same interest by multiplying its document score by a demotion factor (e.g., 0.9 or some other demotion factor value or function, such as demoting a second document for the same interest by a factor of 0.9, a third document for the same interest by a factor of 0.8, a fourth document for the same interest by a factor of 0.7, etc., can be implemented to degrade successive document scores to lower their respective ranking in order to increase the likelihood of content feed results that include a diversity of interests that can be interleaved in the user's new/updated/refreshed content feed). As will now be apparent, query promotion can be implemented as similarly described above with respect to the query demotion. Also, the disclosed query demotion/promotion techniques can be tuned (e.g., in real-time) based on monitored user activity and feedback. For example, if the user is binging on content associated with a certain interest (e.g., the user is clicking on a threshold number of solar eclipse related articles, such as clicking on 80% or more of the articles related to that topic, within a threshold period of time, such as the last 10 minutes, one hour, one day, one week, or some other period of time), then the orchestrator can utilize the monitored user activity to automatically promote articles related to that topic.

In this example implementation, the orchestrator in coordination with the disclosed system described above maintains state information for a user including which documents (e.g., cards can include excerpts of documents including web documents (which can include (e.g., articles, sponsored content, advertisements, social media posts, online video content, online audio content, etc.), advertisements, and/or synthesized content as well as links to sources of such content or other content, in which any such content can include text, images, videos, and/or other types of content) of what has been sent to the user (e.g., including the user's interactions with such cards including such interactions provided via the user's application activity logs, such as viewing, clicking, sharing, commenting, or other feedback, such as to snooze or other feedback (like or dislike) based on the source, author, topic, interest, etc.). This is in contrast to a typical search engine (e.g., Bing, Google, or Yahoo), which generates search results for user queries that do not account for a user's state relevant to that query (e.g., if a user performs a search query for a string X today, and then repeats the same search query for a string X tomorrow using the same search engine, the user will generally receive back the same or significantly overlapping search results as the search engine is not maintaining state information as to what search results were previously provided to the user for that given query and the user's interactions with previously provided search results).

At 2611, orchestrator 2620 sends the selected and ranked set of documents to client application 2624. For example, the selected and ranked set of documents can be processed and output as a feed (e.g., a content feed). In an example implementation, the content feed includes a set of cards that can be viewed and clicked on using the app to view a copy of the linked document without leaving the app (e.g., without launching a web browser to navigate to the linked document provided by another web service on the World Wide Web) as similarly described above.

In some cases, if an interest is missing links to identify content for a given interest (e.g., a lack of online sources/content was available or collected by the search and feed system), then the search and feed system can generate curated content. As another example, crowd sourcing can be applied to allow users to provide feedback about interests, such as to suggest sources on the World Wide Web (e.g., URIs) for certain interests. External user feedback can also be applied to facilitate training the machines, such as similarly described above with respect to training the machines component 330 of FIG. 3.

In one embodiment, content that is generated in the content feed includes synthesized content that is automatically generated by the system (e.g., orchestrator 2620 or another component of the system can include a content synthesizer subcomponent for synthesizing content to include in feeds for users). For example, if a weather forecast for a user's location indicates that it will likely rain this weekend, then a card can be generated that includes synthesized content for the weekend weather forecast for the user's location area and a suggestion to grab a jacket this weekend due to the rain forecast.

In one embodiment, the orchestrator is configured to generate story groups in a content feed. For example, a user may indicate a preference for such story groupings rather than the above-described interleaving of cards in the user's content feed (e.g., such can be implemented as a configurable parameter or measured as a user feedback based on generated content feeds that use interleaving and other content feeds that use story group approaches). In such cases, rather than interleaving cards for different interests in the user's content feed, the orchestrator can automatically reshuffle the cards in the feed (e.g., irrespective of the relative document scores) so that cards related to the same interest are contiguous in the content feed. For example, if the content feed update includes three new cards related to the interest of computer security for mobile devices, then the orchestrator can group those three new cards together within the content feed.

In one embodiment, a card is dynamically swapped out of the user's content feed in the client application. For example, if a user indicates that the user is not interested in a certain card based on feedback for the card that is in the user's current content feed, such as based on the source, author, interest topic, or other criteria, then the orchestrator can be configured to automatically remove any other card(s) already in the user's content feed that match that user's negative feedback. For instance, if the user indicated that the user was no longer interested in the topic of solar eclipse, then the orchestrator can refresh the user's content feed to remove any cards related to that topic (e.g., cards in the content feed can indicate the justification for why such cards are in the user's content feed, such as by indicating the interest/query that triggered the result for including that card in the user's content feed). In another example implementation, that functionality can be similarly implemented in the client application. Also, the removal of one or more cards based on user feedback can automatically trigger a request from the client application to the orchestrator to update/refresh content for the user's content feed (e.g., to replace content in such removed cards).

In one embodiment, a card is provided as a sticky card in the user's content feed in the client application. For example, a weather forecast (e.g., for the user's current geolocation/area, which can be a weather source and/or a synthesized weather card as described herein) can be provided as a sticky card. As another example, a particular interest/query for the user can be provided as a sticky card (e.g., based on user input/settings and/or feedback), such as if the user prefers a sticky card for US patent law and/or other interests/queries. In an example implementation, a sticky card can be configured as a card that stays at the top of the users' content feed. The content of the card can be populated with content for a given document based on the above-described document retrieval and ranking techniques and is not replaced with content for a different document until a better new document is available for that sticky card (e.g., or the card can be replaced if the user clicks on the card and has already viewed that given document, or based on a threshold time-out to refresh content in that sticky card, such as if the user has accessed the client app and scrolled past the sticky card a threshold number of times, such as at least once, five times, or some other number or a time-based threshold).

In one embodiment, the orchestrator is configured to cluster stories. For example, if there are multiple stories related to the user's interest in particle physics and one is from the source of a local newspaper and the other is from Physics Today, then the orchestrator can select the Physics Today document for the card for this new story related to the user's interest in particle physics and (optionally) provide an additional link to the local newspaper's article for the same story. As another example, this selection can be based on monitored user activity for such preferences and/or user feedback (e.g., such can also be based on author, language, source, freshness/time since publication, and/or other criteria/parameters that can be configured/input by the user and/or learned by the system based on user activities and/or user feedback).

In one embodiment, the orchestrator is configured to generate exploratory cards and include such in a user's content feed as an attempt to surface new interest that the user may want to follow (e.g., and to attempt to enhance user engagement with the app/service). For example, an exploratory card can be generated that is for another interest that the orchestrator determines may be a new interest that the user may want to follow (e.g., the exploratory card can identify the card as a new interest and give the user an option indicator to follow that new interest, and the card can similarly be for a document that is retrieved as being relevant to that new interest). The exploratory cards can be included in a user's content feed based on the identification of potential new interests, as further described below, as well as based on certain criteria/parameters related to how frequently to include such exploratory cards in a user's content feed as an attempt to surface new interests that the user may want to follow (e.g., and to attempt to enhance user engagement with the app/service). In some cases, a frequency for showing exploratory cards can vary based on user activity and/or feedback (e.g., a default threshold ratio can be, for example, one exploratory card per every 10 cards related to a user's existing interests, and if the user selects to follow a new interest, then the orchestrator may increase suggested new interests for a threshold period of time and/or a threshold number of additional exploratory cards and/or based on threshold calculated distances of new interests to suggest as further described below). In some embodiments, the exploratory cards may be based on a determined similarity between entities corresponding to interests.

In an example implementation, the above-described embedding techniques for collaborative filtering can also be applied to identify new interests for a user based on existing interests for the user. For example, the orchestrator can query the realtime index (e.g., insights generation of realtime index 308 as shown in FIG. 3) to retrieve an interest(s) that is near one or more of the user's existing interests in an n-dimensional space in which similar interests will generally be near each other in the n-dimensional space (e.g., for a user's given interest, the closest interest(s) based on a distance (e.g., a threshold maximum distance) from that given interest in the n-dimensional space can be returned by the insights generation for the interest(s) that can be applied for new exploratory cards).

In one embodiment, the orchestrator can suggest new interests for a user based on user queries. The query may include an entity. The orchestrator can suggest new interests that are similar to the entity include in the query. The entity included in the query has a corresponding feature vector. One or more entities that are similar to the corresponding feature vector may be determined based on sim hashes associated with the entity included in the query and the one or more entities. In some embodiments, an entity with the same sim hash as an entity included in a query search is determined to be similar and is suggested as a new interest. The one or more entities with the same sim hash as the entity included in the query search may be identified by searching the data structure that maintain a relationship between an entity, its corresponding feature vector, and its corresponding sim hash. In other embodiments, an entity that has the same sim hash as an entity included in a query search and has a similarity score greater than a similarity threshold is determined to be similar and is suggested as a new interest. The one or more entities with the same sim hash as the entity included in the query search may be identified by searching the data structure that maintain a relationship between an entity, its corresponding feature vector, and its corresponding sim hash. For those entities, a similarity threshold may be determined by computing a cosine similarity between the two feature vectors. In some embodiments, a plurality of entities may have a corresponding sim hash that is one or more bits different than the sim hash (e.g., fewer than a threshold number of bits, such as two) corresponding to the entity included in a query search. A multi probe search may be performed to find one or more entities that are similar to the entity included in the query search. The multi probe search may be performed by modifying one or more bits of the sim hash corresponding to the entity included in the query search and identifying one or more entities that have the modified sim hash. For the one or more entities with the modified sim hash, a cosine similarity score may be computed between the feature vectors associated with the one or more entities with the modified sim hash and the feature vector associated with the entity included in the query. The one or more entities with a similarity score that is greater than or equal to a cosine similarity threshold may be determined to be similar and are suggested as a new interest.

In one embodiment, the orchestrator can automatically suggest to the user to unfollow an interest. For example, if an event is past and fewer users are following a given event (e.g., based on a given interest being followed by other users of the app/service, twitter activity related to that event/interest, etc.), then the orchestrator can suggest to a user who has an interest related to that event that they may want to unfollow that interest. For instance, if the user was following Summer 2016 Olympics Games, then by the Fall of 2016 after the Summer 2016 Olympics Games are over, the orchestrator can suggest that the user may want to unfollow that particular interest.

In one embodiment, the orchestrator determines whether one or more of the plurality of documents is different, newer, or related to (e.g., a follow-on story related to) another document that was previously provided to the user in their content feed. For example, the document can be determined to be a newer or updated story related to an article previously provided to the user in the content feed (e.g., in their content feed yesterday, last week, or last month).

In one embodiment, the orchestrator reduces marginal utility of the content provided to the user in their feed. For example, the content feed can be arranged to attempt to maximize the amount of new information provided to the user compared to what has been previously provided to the user via their content feed.

In one embodiment, the orchestrator measures the entropy of the content provided to the user in their feed. For example, whether the content is providing new information can be determined by comparing it with all information that existed in the search and feed system's data store (e.g., which can reflect a large subset of Internet/online content).

In one embodiment, the orchestrator generates the feed to satisfy a diversity of measures. For example, the content feed can be generated to include a balanced selection of a user's set of interests (e.g., a balanced overview across many interests for the user) and/or balanced to include trending content along with less popular content.

Feed Scoring

In one embodiment, the feed scoring performed by the orchestrator (e.g., orchestrator 2620 as shown in FIG. 26) is implemented to diversify results across all of a user's set of interests. For example, this can be implemented by balancing the parameters associated with the feed scoring as further described below (e.g., to not show too many results related to a particular interest, or from the same web services/sites, etc.).

In an example implementation, the parameters that are balanced include the following parameters: interest, related interest, site/domain, same cluster, and history of a user. Example implementations for each of the parameters will be further described below. As will be apparent, fewer, additional, and/or different parameters can similarly be applied for feed scoring.

With respect to the related interest parameter, if a user's interest was Elon Musk, and the orchestrator included a Tesla article in the user's content feed, then the orchestrator can deem the Tesla article as having covered (at least in part) the user's interest in Elon Musk, because the two interests are related, in which interests can be determined to be related based on their distance in the n-dimensional space using the embedding techniques for collaborative filtering as similarly described above.

With respect to the site/domain parameter, the orchestrator can be configured to limit too many results from the same site/domain (e.g., based on a threshold value, which can be tuned based on user activity and/or feedback).

With respect to the same cluster parameter, the disclosed system can be configured to cluster document results based on how similar they are to each other (e.g., based on their distance in the n-dimensional space using the embedding techniques for collaborative filtering as similarly described above), and then to limit results in a user's content feed based on whether a similar result was already shown earlier in the feed (e.g., based on a threshold similarity, which can be tuned based on user activity and/or feedback).

With respect to the history of a user parameter, the monitored user's activities (e.g., the articles, the clusters related to those articles, the interests, sites, clicks, shares, and other user activities and/or feedback) are used as a user signal to avoid showing content that is similar to what the user has previously seen in their content feed (e.g., to remove content that is exactly the same as what was previously provided in the user's content feed, and in some cases, also removing content that is too similar to what was previously provided in the user's content feed, such as based on a threshold similarity, which can be tuned based on user activity and/or feedback).

In this example implementation, for balancing the interest parameter, the orchestrator can be configured to add up how much of this interest was covered in the last several results (e.g., in the user's current feed, and also what the user may have seen earlier in time when the user last opened the client app and viewed their content feed). This adding up operation is referred to herein as the amount-interest-seen parameter. If that interest does not appear in the user's content feed for a predetermined period of time (e.g., based on a threshold parameter, which can be configured or tuned based on the user activity and/or feedback), then the amount-interest-seen starts parameter value decreases (e.g., using a decay function or some other decrease function, which can use exponential smoothing). If that particular interest is provided again in the user's content feed, then the amount-interest-seen parameter value increases (e.g., using a grow function or some other increase function). In this example, if a document for a particular interest that is to be included in the feed has an associated amount-interest-seen parameter value that is large (e.g., exceeds a threshold value or is relatively higher than amount-interest-seen parameter values for other interests to be covered in the feed), then the card for that document can be pushed down lower in the feed. As such, using this approach can effectively enable the orchestrator to show a greater variety of different interests in the feed, and also facilitates the including of content on the same interest(s) when there is not anything retrieved that is determined to be more interesting to show from other interests for the user.

Dimensions for a Document for Feed Scoring

In one embodiment, a document is scored on multiple dimensions. In an example implementation, the dimensions for a document for feed scoring include the following dimensions: popularity, site quality, topic-based site quality, topic-based freshness, trendiness of words in the document, topic match of the document to the user interest, commercial, language of the document, and location entities in the document. Example implementations for each of the dimensions will be further described below. As will be apparent, fewer, additional, and/or different dimensions can similarly be applied for a document for feed scoring.

With respect to the popularity dimension, the popularity value can be calculated by counting all the anchors (e.g., links from other pages within the site and outside the site), page views, tweets, comments in forums, and/or other meta data associated with the document. For example, the counting can discriminate, such as to consider how important a tweet or anchor is as a criteria for counting (e.g., users on social media and web sites can be evaluated and given an authority/power ranking, which may vary based on an interest/topic, as similarly described herein). As another example, the counting can also discriminate on how different a comment or link is compared to all others (e.g., all similar ones can be discounted in counting). This counting provides an overall dimension of popularity for a document.

With respect to the site quality dimension, the site quality value can be based on a number of page views of a site (e.g., a number of page views and other web analytics data can be used that is commercially or publicly available, such as from Alexa Internet Inc., available at http://www.alexa.com/). For example, the rank in Alexa, page views in various locales, and the global page views for a site can be used to assign a site quality score.

With respect to the topic-based site quality dimension, this generally scores how pages in a site are described by others. For example, this can be based on what words Twitter users use when they mention a page in a site or the anchors text that is used to link to pages in a site. In an example implementation, machine learning techniques can be used to determine if certain words more discriminately describe a site (e.g., the word "startups" is often used to describe pages on www.techcrunch.com as compared to most other terms and is used far more often to link to TechCrunch than other sites in general). The amount of discriminative text/topics linking to a site, and the rank of the site for that text, can be used to determine a topic-based site quality score.

Example machine learning techniques that can be applied include the following: (1) embedding entities using matrix factorization or using deep learning to learn similarities between entities, then determining the main entities on the page by clustering the entities on the page; (2) building document models by using the entity and word embeddings in the document; and/or (3) looking at a distribution of terms on the page, and comparing that to a distribution of words across all pages (e.g., using term frequency-inverse document frequency (tf-idf) techniques).

With respect to the freshness dimension, the freshness value can be used to quantify how fresh the document is. For example, a score can be based on an age of the document (e.g., the time since the document was first posted on the site).

With respect to the topic-based freshness dimension, the topic-based freshness value can be used to quantify how much content the system observes for the topic over time. For example, for fast moving topics, such as stock market data, a significant amount of content is generally seen in relatively short spans of time, which can be used as a signal for such a topic to prefer relatively fresher content.

With respect to the trendiness of words in the document dimension, the trendiness of words in the document value can be used as a trending measure for the document. For example, the system can identify the relatively important terms in the document (e.g., using tf-idf, entity annotations, and machine learning techniques, such as the example machine learning techniques described above). Then, the system determines if the identified important terms are trending (e.g., a term can be determined to be a trending term if the term started appearing rapidly in many more documents in a recent span of time as compared with similar spans of time earlier). As such, a trendiness score for a document can be derived by looking at the trendiness of a sum of the important terms in the document.

With respect to the topic match of the document to the user interest dimension, the topic match of the document to the user interest value can be used to measure how relevant the document is to a user's given interest. For example, this can be calculated by looking at the occurrence of terms that are in any of the following: the user's interest, related to the user's interest, and entities that are relevant to the user's interest. The terms/entities that occur in more prominent places on the document (e.g., in the title or header of the document) can be given more weight. Also, machine learning models can be applied to map the interest to an embedding in an n-dimensional space, map the document to embedding in a similar space, and compare the two n-dimensional vectors to determine their distance in that n-dimensional space (e.g., using the above-described embedding related collaborative filtering techniques). For instance, this approach allows the system to consider as highly topical a document that is about Mars or space to an interest about NASA, even when the document may or may not mention NASA in any of its text or meta data.

With respect to a porn dimension, the porn dimension can be used to indicate whether the document is porn. For example, a porn score can be calculated based on source, content (e.g., terms), and/or links as a risk score for porn. If the document exceeds a threshold risk score, then the document can be deemed to be porn.

With respect to the commercial dimension, the commercial content dimension can be used to indicate whether the document includes commercial content. For example, advertisements can be classified as commercial content. Other examples of commercial content can include web content/pages/sites that offer products/services for sale (e.g., Amazon, eBay, deals, and coupon sites, etc.), web content/pages/sites that include job listings, web content/pages/sites that include real estate listings, and/or various other commercial-related web content/pages/sites. In one embodiment, commercial content is classified by using a commercial classifier. For example, terms on each web page that signify commercial intent (e.g., shopping cart, discounts, real estate listings, job listings, etc.) can be determined. Both the main part of the page, as well as structure/layout of the page, can be examined to determine that a given page is a commercial page. A structure of the page can be computed by looking at multiple pages on the same site. The common parts of the pages on the site can then be used to understand a structure/layout of the site, which is also the structure for a page.

With respect to the language of the document dimension, the language of the document dimension can be used to indicate a language and/or locale of the document. For example, the document can be indicated as being written in Japanese and from Japan or in English and from the United States of America.

With respect to the location entities in the document dimension, the location entities in the document dimension can be used to identify the location entities. For example, if the document is the San Jose Mercury News and describes a local news story, then the location entities in the document can indicate that the document relates to the San Francisco Bay Area location entity (e.g., and such can be a signal of location relevance for a given interest).

As further described below, various processes can be performed using the above-described system/service to implement the various techniques for providing an enhanced search to generate a feed based on a user's interests as further described below.

Example Processes for Performing an Enhanced Search and Generating a Feed

Figure 27:
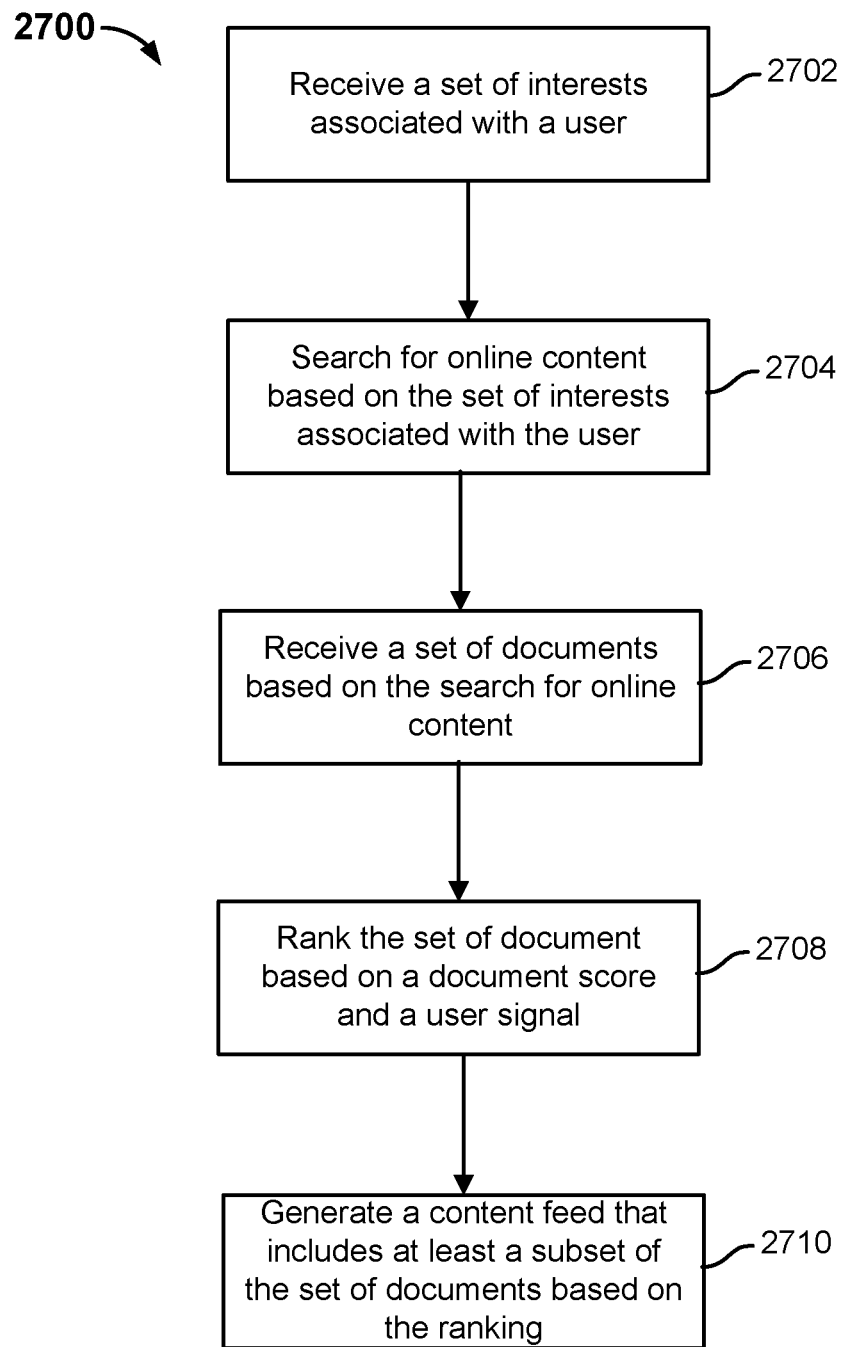
FIG. 27 is a flow diagram illustrating a process for performing an enhanced search and generating a feed in accordance with some embodiments.

FIG. 27 is a flow diagram illustrating a process for performing an enhanced search and generating a feed in accordance with some embodiments. In some embodiments, the process 2700 for performing an enhanced search and generating a feed is performed using the disclosed system/service, such as described above.

Referring to FIG. 27, at 2702, a set of interests associated with a user is received. In an example implementation, the orchestrator can receive a set of interests associated with the user from the user model, such as similarly described above (e.g., as similarly described above with respect to FIG. 26).

At 2704, searching for online content based on the set of interests associated with the user is performed. In an example implementation, searching for online content based on the set of interests associated with the user can be performed based on a search performed using the realtime document index (RDI), such as similarly described above (e.g., by applying search techniques to retrieve documents that match one or more of the interests in the set of interests using the RDI as similarly described above with respect to FIG. 26). For example, the online content can include text-based information, which can be analyzed to determine the document score associated with the interest using the above-described techniques.

At 2706, a set of documents based on the search for online content is received. In an example implementation, the orchestrator can receive set of documents based on the search for online content from the RDI, such as similarly described above (e.g., as similarly described above with respect to FIG. 26). In one embodiment, the search is performed using the above-described embedding-based retrieval techniques.

At 2708, ranking the set of documents based on a document score and a user signal is performed. In an example implementation, the orchestrator can rank the set of documents based on the document score and the user signal, such as similarly described above (e.g., as similarly described above with respect to FIG. 26).

At 2710, generating a content feed that includes at least a subset of the set of documents based on the ranking is performed. In an example implementation, the orchestrator can generate the content feed (e.g., for the app) that includes at least a subset of the set of documents based on the ranking, such as similarly described above (e.g., as similarly described above with respect to FIG. 26 and an example content feed is shown in FIGS. 8A-8B). For example, the content feed for the user can include content from one or more web documents related to one or more of the user's interests.

Figure 28:
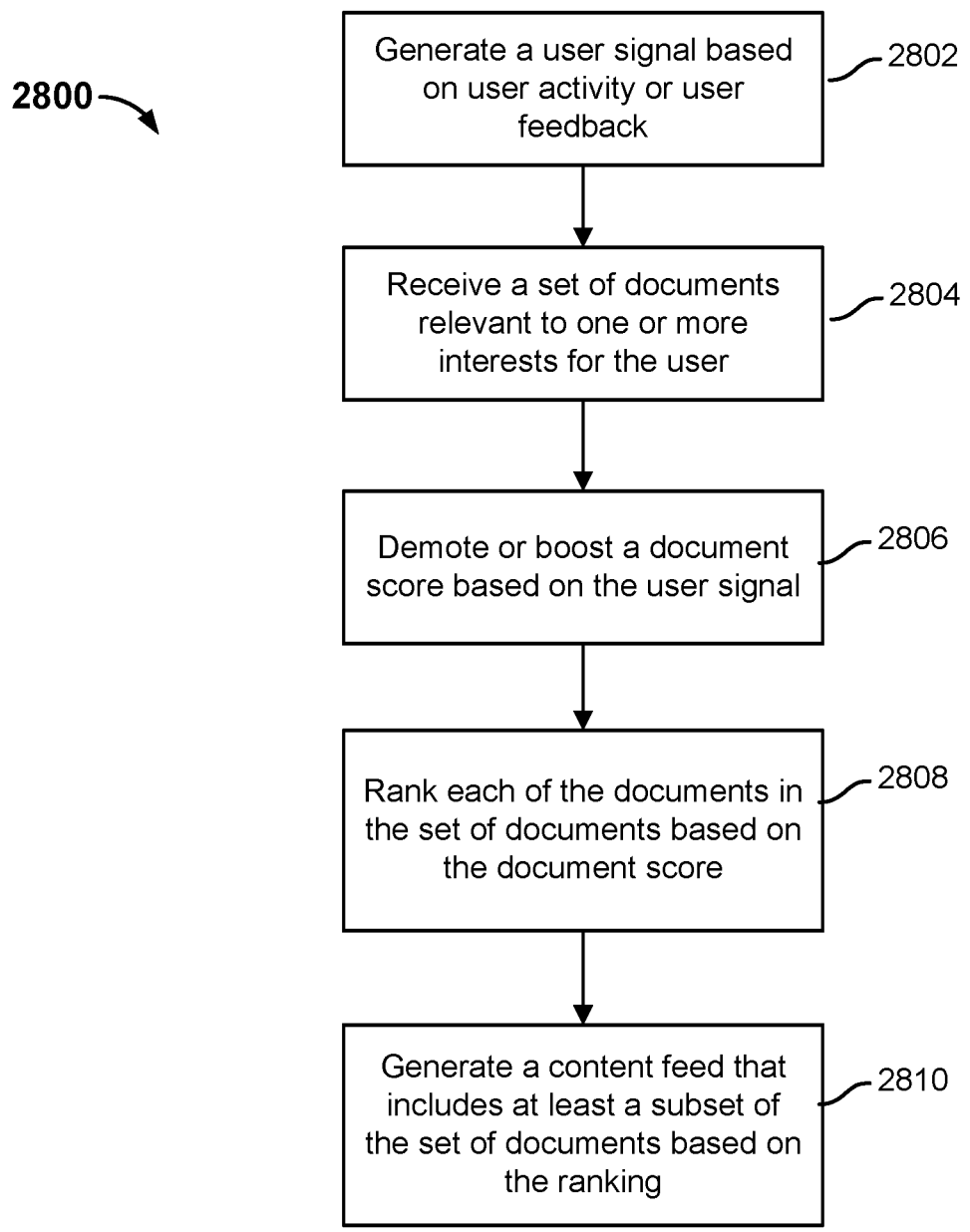
FIG. 28 is another flow diagram illustrating a process for performing an enhanced search and generating a feed in accordance with some embodiments.

FIG. 28 is another flow diagram illustrating a process for performing an enhanced search and generating a feed in accordance with some embodiments. In some embodiments, the process 2800 for performing an enhanced search and generating a feed is performed using the disclosed system/service, such as described above.

Referring to FIG. 28, at 2802, generating a user signal based on monitored user activity or user feedback is performed. In an example implementation, the client application can monitor user activity with the client application (e.g., app) and such logged user application activity can be stored in the user's application activity logs, which can be processed by the orchestrator along with any user feedback received at the orchestrator from the client application to generate the user signal, such as similarly described above (e.g., as similarly described above with respect to FIG. 26).

At 2804, a set of documents relevant to one or more interests for the user is received. In an example implementation, the orchestrator can receive set of documents based on the search for online content from the RDI, such as similarly described above (e.g., as similarly described above with respect to FIG. 26).

At 2806, demoting or boosting a document score based on the user signal is performed. In an example implementation, the orchestrator can demote or boost the document score for each of the documents in the received set of documents based on the user signal, such as similarly described above (e.g., as similarly described above with respect to FIG. 26). For example, as similarly described above, the user signal can be provided as an input into the ranking of the documents to facilitate personalizing the content feed for the user and to maximize user engagement as similarly described above.

At 2808, ranking each of the documents in the set of documents based on the document score is performed. In an example implementation, the orchestrator can rank the set of documents based on the document score, such as similarly described above (e.g., as similarly described above with respect to FIG. 26).

At 2810, generating a content feed that includes at least a subset of the set of documents based on the ranking is performed. In an example implementation, the orchestrator can generate the content feed that includes at least a subset of the set of documents based on the ranking, such as similarly described above (e.g., as similarly described above with respect to FIG. 26 and an example content feed is shown in FIGS. 8A-8B). For example, the orchestrator can interleave the subset of documents in the content feed based on the set of interests for the user. As another example, the orchestrator can group the subset of documents in the content feed based on the set of interests for the user, in which a first subset of the set of documents associated with a first interest are grouped together in the content feed and a second subset of the set of documents associated with a second interest are grouped together in the content feed.

Figure 29:
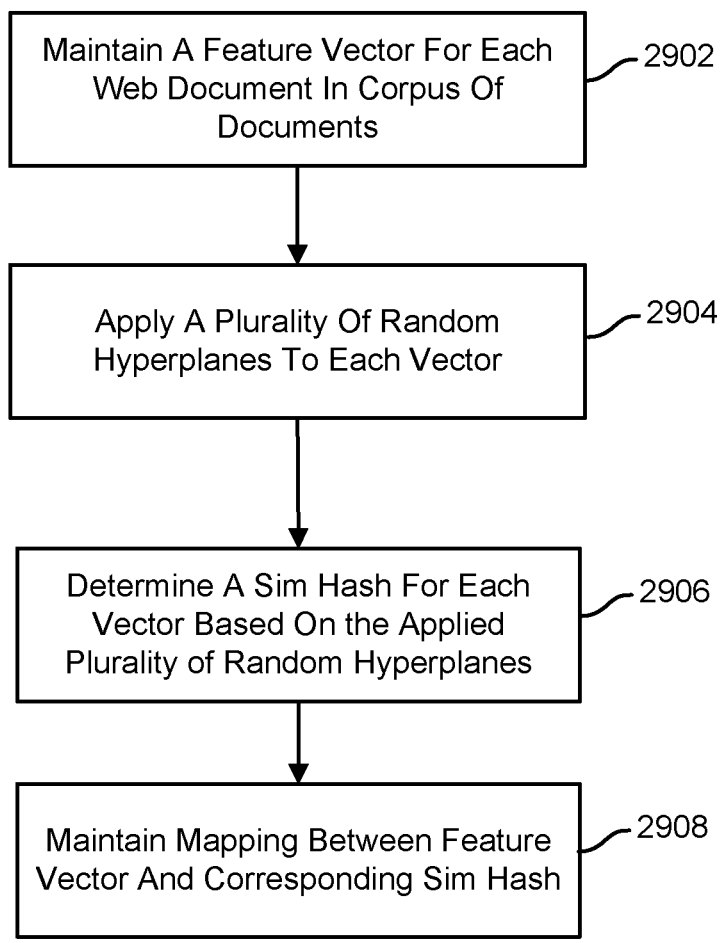
FIG. 29 is a flow diagram illustrating a process for creating a data structure that maps a feature vector associated with an entity and a corresponding sim hash in accordance with some embodiments.

FIG. 29 is a flow chart illustrating a process for creating a data structure that maps a feature vector associated with an entity and a corresponding sim hash in accordance with some embodiments. In the example shown, process 2900 may be implemented by an orchestrator, such as orchestrator 2620.

At 2902, a feature vector is maintained in a database for each entity in the corpus of web documents. As discussed above with respect to FIG. 13, a matrix $U_{m \times k}$ is determined. U is a matrix of m entities by k documents. Each row of the matrix $U_{m \times k}$ may be a k dimensional space representations of an entity. For example, $E_0$ can be represented as a 100 element vector with each element value corresponding to the value representative of an entity in a particular document.

At 2904, a plurality of random hyperplanes are applied to each feature vector in the database. A hyperplane divides the vector space such that endpoint of a feature vector is either above or below the hyperplane. The hyperplanes may be orthogonal to each other. A feature vector is assigned a bit value (e.g., "0" or "1") based on whether the feature vector is above or below the hyperplane.

At 2906, a sim hash is determined for each vector based on the plurality of random hyperplanes. The sim hash associated with a feature vector has a bit value for each random hyperplane.

For example, suppose a first feature vector is a three-dimensional vector (a, b, c) with elements (2, 4, −1). An initial hyperplane may be selected, such as a=0. A value may be assigned to the 3-dimensional vector based on whether the a-value of three dimensional vector is above or below the hyperplane. In this example, a=2 is above the hyperplane a=0 and is assigned a value of "1." A second hyperplane may be selected, but the second hyperplane is orthogonal to the initial hyperplane. For example, the second hyperplane may be b=5. In this example, b=4 is below the hyperplane b=5 and is assigned a value of "0." A third hyper plane may be selected, but the third hyperplane is orthogonal to the second hyperplane. For example, the third hyperplane may be c=2. In this example, c=−1 is below the hyperplane c=2 and is assigned a value of "0." For this set of hyperplanes, the first feature vector of (2, 4, −1) may be assigned a sim hash of "100."

At 2908, a data structure that maps a feature vector to its corresponding sim hash is maintained. For example, a 100 dimensional vector may be represented as a 20-bit sim hash. The data structure may map an entity, its corresponding vector included in the m×n matrix X as described above, and its corresponding sim hash.

Figure 30:
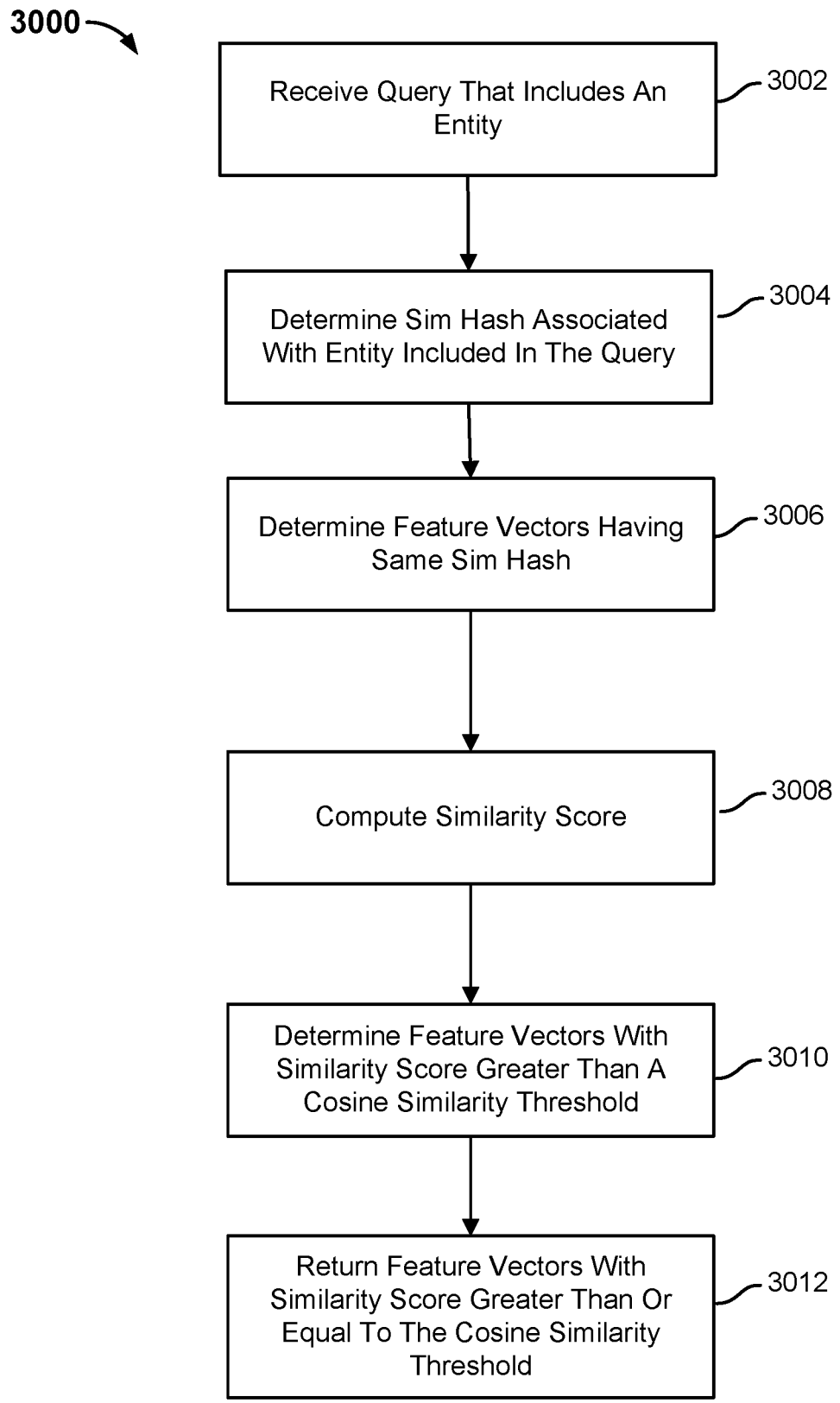
FIG. 30 is a flow diagram illustrating a process for determining entities that are similar to an entity included in a query search in accordance with some embodiments.

FIG. 30 is a flow diagram illustrating a process for determining entities that are similar to an entity included in a query search in accordance with some embodiments. In the example shown, process 3000 may be implemented by an orchestrator, such as orchestrator 2620.

At 3002, a query that includes an entity is received. The entity may correspond to a topic, an interest, or a web document. The query may be resolved to an n-gram.

At 3004, a sim hash corresponding to the entity included in the query is determined. A data structure may store a list of entities, their corresponding feature vectors, and their corresponding sim hashes. The sim hash corresponding to the entity included in the query may be identified by inspecting the data structure.

At 3006, one or more feature vectors having the same sim hash as the entity included in the query are determined. The one or more feature vectors may be determined by inspecting the data structure. For example, an entity included in a query may have a corresponding sim hash of "10110001010111010110" when a set of 20 random hyperplanes are applied to the feature vector. The one or more feature vectors with the same sim hash as the entity included in the query are determined. The 20 random hyperplanes may be orthogonal to each other.

At 3008, a corresponding similarity score is computed between the feature vector associated with the entity included in the query and each feature vector having the same sim hash as the entity included in the query. The similarity score may be computed by computing a cosine similarity between the feature vector associated with the entity included in the query and the determined feature vector. The cosine similarity may be computed as $$\cos\theta = \frac{\vec{d_t} \cdot \vec{q}}{|\vec{d_t}||\vec{q}|}$$

where $\vec{d_t}$ is the feature vector associated with the entity included in the query and $\vec{q}$ is the determined feature vector. The value of the cosine similarity is a value between −1 and 1.

At 3010, one or more feature vectors with a similarity score greater than or equal a cosine similarity threshold are determined. A cosine similarity threshold may correspond to the cosine value of an angle between the feature vector associated with the entity included in the query and the feature vector having the same sim hash as the entity included in the query. In some embodiments, the similarity score threshold is 0.5, which corresponds to the cosine value of 60°.

At 3012, one or more feature vectors with a similarity score greater than or equal to the cosine similarity threshold are returned.

Figure 31:
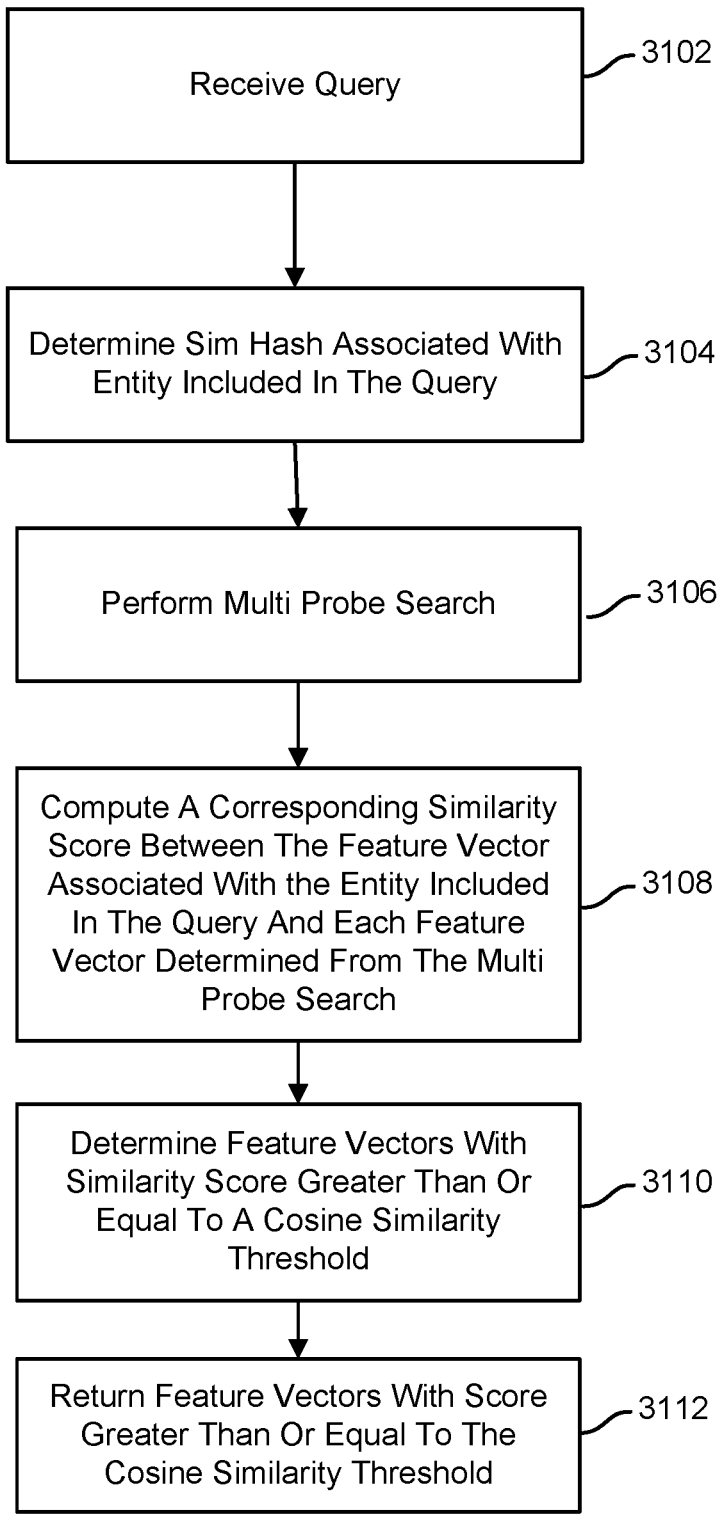
FIG. 31 is a flow diagram illustrating a process for determining entities that are similar to an entity included in a query search in accordance with some embodiments.

FIG. 31 is a flow diagram illustrating a process for determining entities that are similar to an entity included in a query search in accordance with some embodiments. In the example shown, process 3100 may be implemented by an orchestrator, such as orchestrator 2620.

At 3102, a query that includes an entity is received. The entity may correspond to a topic, an interest, or a web document. The query may be resolved to an n-gram.

At 3104, a sim hash corresponding to the entity included in the query is determined. A data structure may store a list of entities, their corresponding feature vectors, and their corresponding sim hashes. The sim hash corresponding to the entity included in the query may be identified by inspecting the data structure. For example, an entity included in a query may have a corresponding sim hash of "10110001010111010110" when a set of 20 random hyperplanes are applied to the feature vector.

At 3106, a multi probe search is performed. A multi probe search is performed by modifying one or more bits of a sim hash (e.g., fewer than a threshold number, such as two) and determining one or more feature vectors that have a sim hash corresponding to the modified sim hash. A sim hash may be modified by varying a bit of the sim hash. For example, an entity included in a query may have a corresponding sim hash of "10110001010111010110". The example sim hash has 20 bits. Each bit of the sim hash may be separately modified and the one or more feature vectors associated with each modified sim hash may be determined. For example, the sim hash of "10110001010111010110" may be separately modified to "00110001010111010110," "11110001010111010110," "10010001010111010110," . . . "10110001010111010111" and the one or more feature vectors associated with each modified sim hash may be determined.

In some embodiments, two or more bits may be jointly modified and the one or more feature vectors associated with each modified sim hash may be determined. For example, the sim hash of "10110001010111010110" may be separately modified to "01110001010111010110," "00010001010111010110," "00100001010111010110," . . . "00110001010111010111" and the one or more feature vectors associated with each modified sim hash may be determined.

At 3108, a corresponding similarity score is computed between the feature vector associated with the entity included in the query and each feature vector determined from the multi probe search. The similarity score may be computed by computing a cosine similarity between the feature vector associated with the entity included in the query and the determined feature vector. The cosine similarity may be computed as $$\cos\theta = \frac{\vec{d_t} \cdot \vec{q}}{|\vec{d_t}||\vec{q}|}$$

where $\vec{d_t}$ is the feature vector associated with the entity included in the query and $\vec{q}$ is the determined feature vector. The value of the cosine similarity is a value between −1 and 1.

At 3110, one or more feature vectors with a similarity score greater than a cosine similarity threshold are determined. A cosine similarity threshold may correspond to the cosine value of an angle between the feature vector associated with the entity included in the query and the feature vector having the same sim hash as the entity included in the query. In some embodiments, the similarity score threshold is 0.5, which corresponds to the cosine value of 60°.

At 3112, one or more feature vectors with a score greater than or equal to the cosine similarity threshold are returned.

Figure 32:
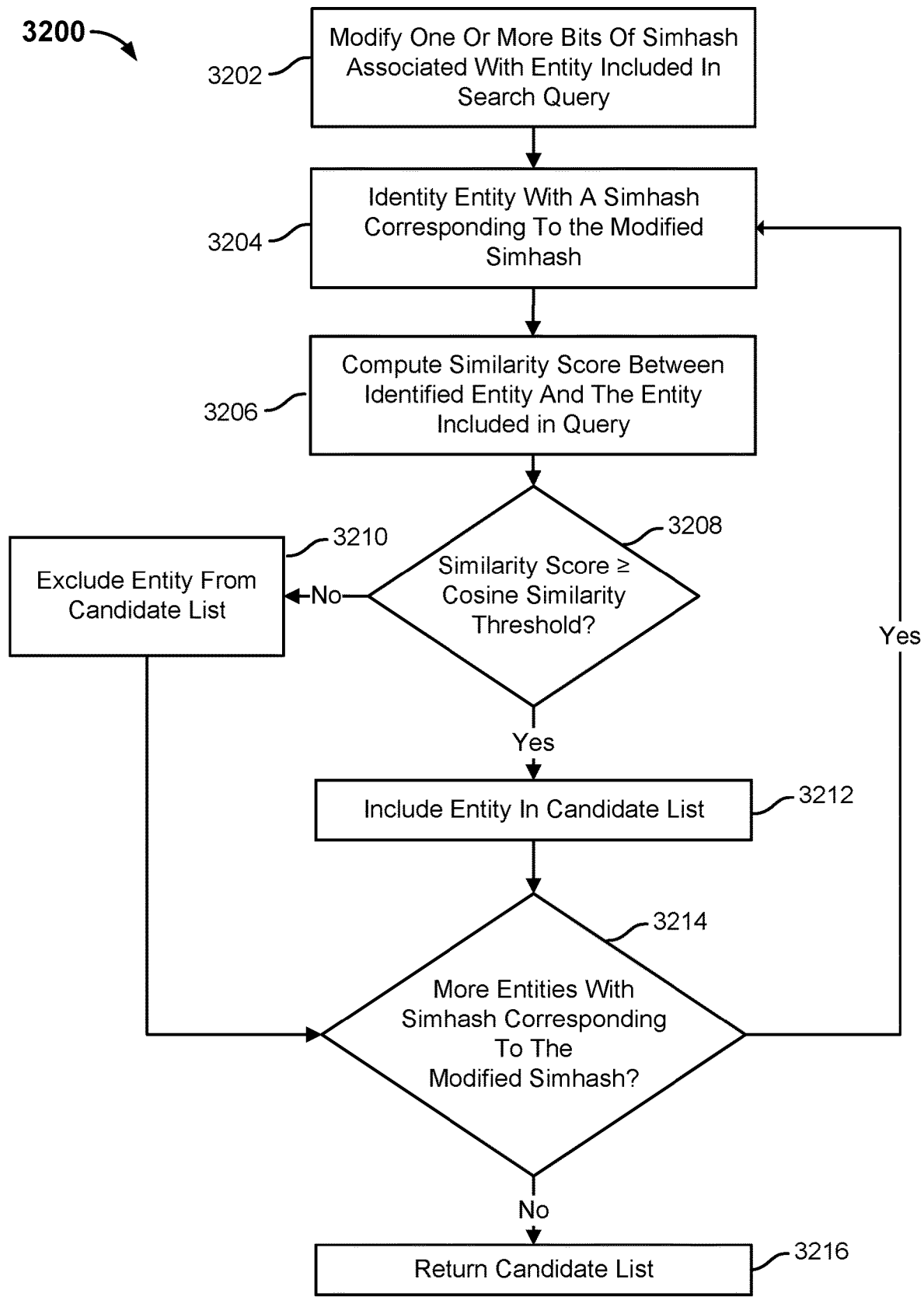
FIG. 32 is a flow diagram illustrating a process for determining entities that are similar to an entity included in a query search in accordance with some embodiments.

FIG. 32 is a flow diagram illustrating a process for determining entities that are similar to an entity included in a query search in accordance with some embodiments. In the example shown, process 3200 may be implemented by an orchestrator, such as orchestrator 2620. In some embodiments, process 3200 may be implemented to perform some or all of 3108.

A multi probe search is performed by modifying one or more bits of a sim hash (e.g., fewer than a threshold number, such as two) and determining one or more feature vectors that have a sim hash corresponding to the modified sim hash. A sim hash may be modified by varying a bit of the sim hash. For example, an entity included in a query may have a corresponding sim hash of "10110001010111010110". The example sim hash has 20 bits. Each bit of the sim hash may be separately modified and the one or more feature vectors associated with each modified sim hash may be determined. For example, the sim hash of "10110001010111010110" may be separately modified to "00110001010111010110," "11110001010111010110," "10010001010111010110," . . . "10110001010111010111" and the one or more feature vectors associated with each modified sim hash may be determined.

In some embodiments, two or more bits may be jointly modified and the one or more feature vectors associated with each modified sim hash may be determined. For example, the sim hash of "10110001010111010110" may be separately modified to "01110001010111010110," "00010001010111010110," "00100001010111010110," . . . "00110001010111010111" and the one or more feature vectors associated with each modified sim hash may be determined.

Process 3200 illustrates an example of determining one or more feature vectors associated with a single instance of a modified sim hash. Process 3200 may be repeated for other instances of modified sim hashes.

At 3202, one or more bits of the sim hash associated with the entity included in the query are modified. For example, the entity included in the query may have a corresponding sim hash of "10110001010111010110." The sim hash may be modified to be "00110001010111010110."

At 3204, an entity with a sim hash corresponding to the modified sim hash is identified. A data structure may store a list of entities, their corresponding feature vectors, and their corresponding sim hashes. An entity with a sim hash corresponding to the modified sim hash may be identified by inspecting the data structure.

At 3206, a similarity score between the identified entity and the entity included in the query is computed. The similarity score may be computed by computing a cosine similarity between the feature vector associated with the entity included in the query and the feature vector associated with the identified entity. The cosine similarity may be computed as $$\cos\theta = \frac{\vec{d_i} \cdot \vec{q}}{|\vec{d_i}||\vec{q}|}$$

where $\vec{d_i}$ is the feature vector associated with the entity included in the query and a is the feature vector associated with the identified entity. The value of the cosine similarity is a value between −1 and 1.

At 3208, it is determined whether the similarity score is greater than or equal to cosine similarity threshold. A cosine similarity threshold may correspond to the cosine value of an angle between the feature vector associated with the entity included in the query and the featured vector associated with the identified entity. In some embodiments, the similarity score threshold is 0.5, which corresponds to the cosine value of 60°.

In the event the similarity score is greater than or equal to the cosine similarity threshold, then process 3200 proceeds to 3212. For example, if the cosine similarity threshold is 0.5, a similarity score that is greater than 0.5 indicates that the angle between the feature vector associated with the entity included in the query and the feature vector associated with the identified entity is less than 60°.

In the event the similarity score is less than the cosine similarity threshold, then process 3200 proceeds to 3210. For example, if the cosine similarity threshold is 0.5, a similarity score that is greater than 0.5 indicates that the angle between the feature vector associated with the entity included in the query and the feature vector associated with the identified entity is greater than or equal to 600°.

At 3210, the identified entity is excluded from a candidate list. The candidate list may be a list that accumulates one or more entities that are similar to the entity included in the query. The one or more entities may be a web document related to the entity included in the query, a similar topic, and/or a web document associated with the similar topic. At 3212, the identified entity is included in a candidate list.

At 3214, it is determined whether there are more entities with a sim hash corresponding to the modified sim hash. For example, a plurality of entities may share the same sim hash. The data structure that stores a list of entities, their corresponding feature vectors, and their corresponding sim hashes may be inspected to determine whether there are more entities with the sim hash corresponding to the modified sim hash. In the event there are more entities, process 3200 returns to 3204. In the event there are no more entities, process 3200 proceeds to 3216.

At 3216, the candidate list is returned. The candidate list includes a list of entities that are similar to the entity included in the query. In some embodiments, one or more web documents corresponding to one or more entities included in the list may be provided in a content feed. In other embodiments, one or more topics corresponding to one or more entities included in the list may be recommended in a content feed. In other embodiments, one or more web documents associated with the one or more recommended topics corresponding to the one or more entities included in the list may be provided in a content feed. In other embodiments, an endorsement score associated with an entity included in the list may be increased.

Figure 33:
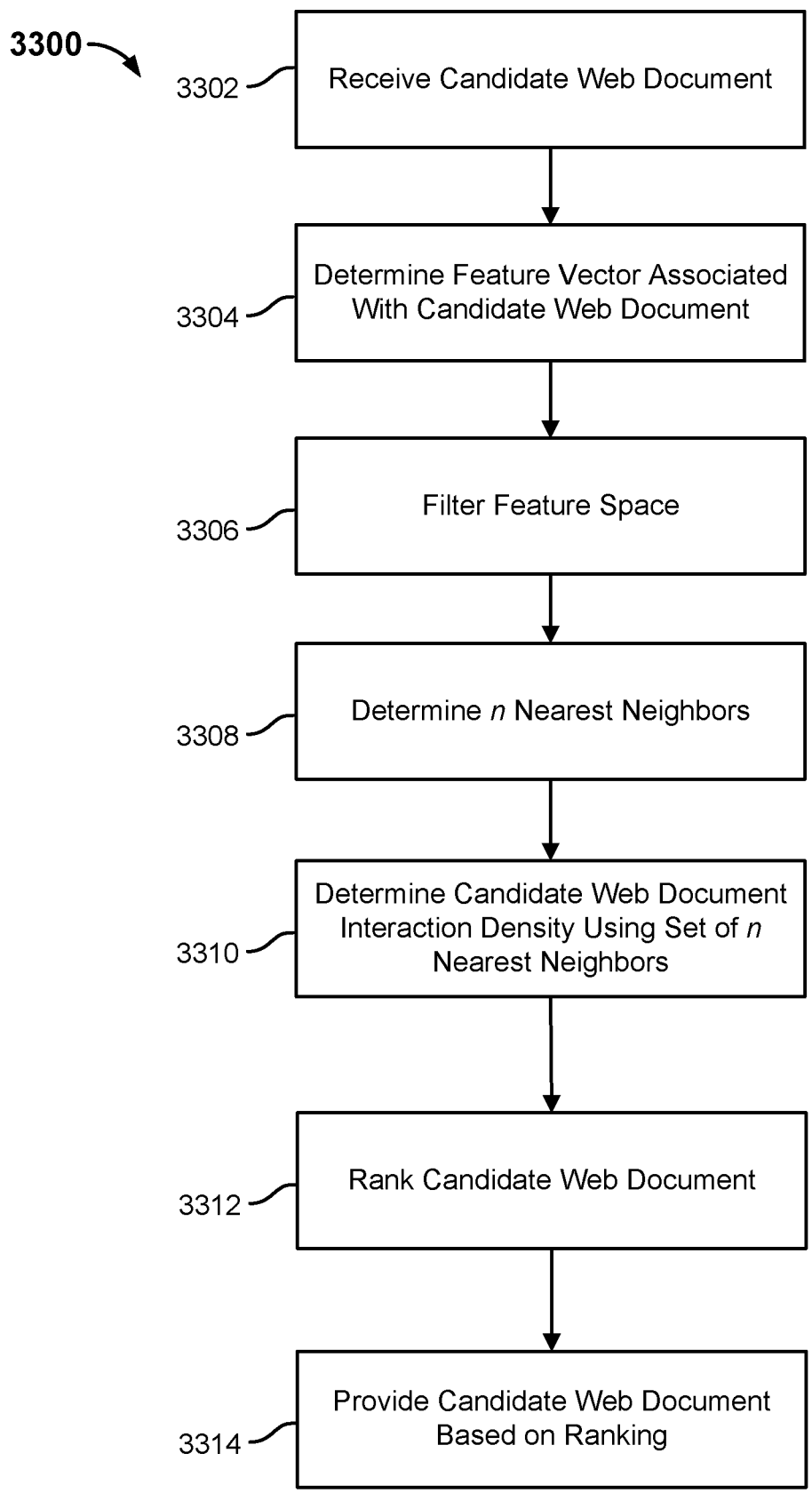
FIG. 33 is a flow diagram illustrating a process for providing web documents based on historical interactions in accordance with some embodiments.

FIG. 33 is a flow diagram illustrating a process for providing web documents based on historical interactions in accordance with some embodiments. In the example shown, process 3300 may be implemented by an orchestrator, such as orchestrator 2620.

At 3302, a candidate web document is received. A candidate web document may include articles, sponsored content, advertisements, social media posts, online video content, online audio content, etc. The text of the candidate web document may be analyzed to determine the importance of an entity with respect to the candidate web document. For example, each word/combination of words can be assigned a TF-IDF value. In some embodiments, the TF-IDF value is normalized to a value between 0 and 1. A search and feed service may maintain a matrix X for the corpus of web documents that represents an entity as plurality of web documents and a web document as a plurality of entities. The matrix X can be used to determine a list of entities associated with a particular web document. For example, a candidate web document may be represented as $D_n = \{A_{0n}, A_{1n}, A_{2n}, \ldots, A_{nn}\}$ where $A_{xy}$ represents the importance of a corresponding entity for a particular document.

At 3304, a feature vector associated with the candidate web document is determined. The candidate web document may be represented as $D_n$. The search and feed service may maintain matrix X for a large number of entities, for example, two million entities. Thus, $D_n$ may be a vector with two million entries. Determining the similarity between $D_n$ and any other web document using matrix X can be computationally intensive and time consuming. To reduce the amount of resources and time needed to determine the similarity between $D_n$ and one or more other web documents, a collaborative filtering technique may be implemented. Given X is a m×n matrix, X can be approximated as a matrix $U_{m \times k}$ multiplied by a matrix $W_{k \times n}$, such that X=UW. When X' is approximately equal to X and k is a relatively small integer (e.g., 100), the matrices U and W provide k-dimensional vectors for the rows and columns of X that can be used to calculate the similar between two web documents. A matrix $U_{m \times k}$ is determined. U is a matrix of m entities by k documents. A matrix $W_{k \times n}$ is determined. W is a matrix of k entities by n documents. The matrix X'=UW is computed. An entry of the matrix X' may correspond to a web document. The web document may be represented as a feature vector comprising k elements. The entries of matrix X' correspond to a feature space of available web documents.

At 3306, the feature space is filtered. The feature space may be filtered based on a cosine similarity between the feature vector associated with the candidate web document and a feature vector associated with any of the other entries (e.g., other web documents) included in matrix X'. The cosine similarity may be computed as $$\cos\theta = \frac{\vec{d_t} \cdot \vec{q}}{|\vec{d_t}||\vec{q}|}$$

where $\vec{d_t}$ is the feature vector associated with the candidate web document and $\vec{q}$ is the feature vector associated with another web document. The value of the cosine similarity is a value between −1 and 1. In the event the cosine similarity is greater than 0.75, the feature vector associated with the other web document $\vec{q}$ may be removed from a feature space that is used to calculate a candidate web document interaction density, that is, the entry corresponding to $\vec{q}$ may be removed from the matrix X'. This helps to provide web documents that may be of interest to the user because it removes from a candidate web document interaction density calculation entries of matrix X' that could bias the result of the calculation.

In some embodiments, a sim hash is used to reduce the number of entries for the cosine similarity determination. For example, a sim hash may be determined for the candidate web document and that sim hash may be used to perform steps 3006-3012 of process 3000. This reduces the number of computations performed by an orchestrator because instead of computing a cosine similarity between each entry of matrix X' and the candidate web document, the cosine similarity computation may be targeted to web documents with the same sim hash as the candidate web document. For example, there may be 2 million entries in matrix X', but only 3000 entries with the same sim hash as the candidate web document. Using a sim hash may reduce the number of cosine similarity computations from 2 million to 3000. When there are a plurality of candidate web documents to provide, the amount of computational savings is compounded. For example, suppose 10 candidate web documents may be provided to a user. Instead of doing 20 million cosine similarity computations, the orchestrator may perform 30000 cosine similarity computations.

At 3308, a set of n nearest neighbors to the candidate web document are determined. The set of n nearest neighbors does not include any feature vectors of web documents that were removed at 3306. In some embodiments, the n nearest neighbors are determined based on a cosine similarity. The cosine similarity may be computed as $$\cos\theta = \frac{\vec{d_t} \cdot \vec{q}}{|\vec{d_t}||\vec{q}|}$$

where $\vec{d_t}$ is the feature vector associated with the candidate web document and aj is the feature vector associated with another web document. The n nearest neighbors may be determined based on the n cosine similarity computations with the highest cosine similarity value. The n nearest neighbors may be determined from the n entries of matrix X' that highest cosine similarity value that were not filtered out at 3306. The cosine similarity determination may be limited to feature vectors with the same sim hash as the feature vector associated with the candidate web document. In other embodiments, feature vectors that differ from the sim hash of the feature vector associated with the candidate web document by a single digit may be included in the cosine similarity determination. In some embodiments, the n nearest neighbors are determined based on a Euclidean distance between the feature vector associated with the candidate web document and the feature vector associated with a web document. For example, the web documents with the smallest Euclidean distance with the candidate web document are included in the set of n nearest neighbors. In some documents, the n nearest neighbors are determined based on a dot product between the feature vector associated with the candidate web document and the feature vector associated with a web document. For example, the web documents with the highest dot product with the candidate web document are included in the set of n nearest neighbors.

At 3310, a candidate web document interaction density $\mathcal{D}$ is determined using the set of n nearest neighbors. The candidate web document interaction density $\mathcal{D}$ is comprised of a positive interaction density D(p') and a negative interaction density D(n). The set of n nearest neighbors may include one or more web documents with which the user had a positive interaction. The set of n nearest neighbors may include one or more web documents with which the user had a negative interaction.

The positive interaction density D(p') may be computed as:

$$D(p') = \frac{\left\{\sum_{i=1}^{n} f(cosSim(p', p_i))\right\} + \alpha}{\left\{\sum_{i=j}^{m} f(cosSim(p', s_j))\right\} + 50}, \text{ where}$$

$$f(x) = \begin{cases} \frac{1}{1+e^{-50*(x-0.675)}}, & x \geq 0.62 \\ 0, & \text{otherwise} \end{cases}$$

p' is the feature vector associated with the candidate web document, $p_i$ is the feature vector associated with a web document with which the user had a positive interaction (e.g, read, comment, share, emoji), $s_j$ is the feature vector associated with a web document that was seen by the user (e.g., a card associated with the web document was provided to the user in a content feed), n is the number of web documents in the set of n nearest neighbors with which the user had a positive interaction, m is the number of web documents in the set of n nearest neighbors with which the user has seen, and ∝/50 is the overall click through rate of the users (e.g., total number of articles read divided by the total number of articles seen).

A positive interaction with a web document may include a user clicking on the card associated with a web document to read the web document associated with the card. The user may be determined to have read at least a portion of the web document in the event the web document is displayed on the user device for at least a threshold duration (e.g., 10 seconds). A positive interaction with a web document may include a user interacting with the card associated with a web document and providing a comment about the web document. A positive interaction with a web document may include a user sharing with one or more contacts (e.g., email contacts, phone contacts, social media contacts, etc.) the card or the web document associated with the card. A positive interaction with a web document may include a user providing reaction feedback to the search and feed service about the provided card. For example, the user may provide an indication, such as reaction feedback 822, to indicate that the web document associated with the card is of interest to the user. Such feedback may be referred to as "positive feedback."

In the event there are one or more negative interactions in the set of n nearest neighbors, D(n) may be set to a predetermined value (e.g., D(n)=−5). A negative interaction with a web document may include reaction feedback, such as reaction feedback 824, 826, 828, 830 to indicate that the web document associated with the card is not of interest to the user. Such feedback may be referred to as "negative feedback." Reaction feedback 824 indicates that the user wants to see less web documents like that one that was presented in the content feed. Reaction feedback 826 indicates that the user is not interested in seeing web documents like the one that was presented in the content feed. Reaction feedback 828 indicates that the presented web document is off topic. Reaction feedback 830 indicates that the presented web document is flagged as bad content (e.g., porn, fake news).

The candidate web document interaction density $\mathcal{D}$={D(p')∪D(n)}, which represents the observed affinity to topics in the feature space for a given user.

In some embodiments, the candidate web document interaction density D is weighted based on the type of positive interactions included in the set of n nearest neighbors. Each interaction has an associated weight indicating the degree of positivity or negativity.

For example, the positive interaction density D(p') may be computed as:

$$D(p') = \frac{\left\{\sum_{i=1}^{n} W_i f(cosSim(p', p_i))\right\} + \alpha}{\left\{\sum_{i=j}^{m} f(cosSim(p', s_j))\right\} + 50}, \text{ where}$$

$$f(x) = \begin{cases} \frac{1}{1+e^{-50*(x-0.675)}}, & x \geq 0.62 \\ 0, & \text{otherwise} \end{cases}$$

p' is the feature vector associated with the candidate web document, $p_i$ is the feature vector associated with a web document with which the user had a positive interaction (e.g, read, comment, share, emoji), $s_j$ is the feature vector associated with a web document that was seen by the user (e.g., a card associated with the web document was provided to the user in a content feed), n is the number of web documents in the set of n nearest neighbors with which the user had a positive interaction, m is the number of web documents in the set of n nearest neighbors with which the user has seen, and ∝/50 is the overall click through rate of the users (e.g., total number of articles read divided by the total number of articles seen), and $w_i$ is the weight associated with a positive interaction.

At 3312, the candidate web document is ranked with respect to one or more other candidate web documents. Between sessions, a plurality of web documents may have been published. A search and feed service may crawl the internet to discover the plurality of web documents. Some of the web documents may be candidates to provide to the user in the next session. Each candidate web document may undergo steps 3302-3312 to determine a ranking of the candidate web document. In some embodiments, the candidate web documents are ranked based on their associated candidate web document interaction density values. In other embodiments, the candidate web documents are ranked based on an associated probability. The probability indicates a likelihood that a user will have a positive interaction with the candidate document. For example, a linear regression model based on historical clicks of other users may be used to determine the probability that the user will be interested in the candidate document. In some embodiments, an approximate probability is determined by multiplying the candidate web document interaction density by an offset value (e.g., 0.4) that is based on the linear regression model.

In some embodiments, the candidate web document interaction density value is one of a plurality of signals (e.g., an entropy signal, a trending signal, a freshness signal, a popularity signal, a topicality/relevance signal, and/or additional document signals) that may be used to rank a candidate web document. The candidate web document may be ranked based on a combination of the signals.

At 3314, the candidate web document is provided in a content feed based on the ranking. The content feed may provide a card associated with the candidate web document. A user may interact with the card. For example, a user may provide a comment about the web document. A user may share with one or more contacts (e.g., email contacts, phone contacts, social media contacts, etc.) the card or the web document associated with the card. A user may provide a user input to the graphical user interface and associate an emoji (e.g., "thumbs up," "heart," "smiley face", etc.) with the card associated with the web document. The user may indicate that the user wants to see less web documents like that the candidate web document. The user may indicate that the user is not interested in seeing web documents like the candidate web document. The user may indicate that the candidate web document is off topic. The user may indicate that the candidate web document is bad content (e.g., porn, fake news).

Figure 34:
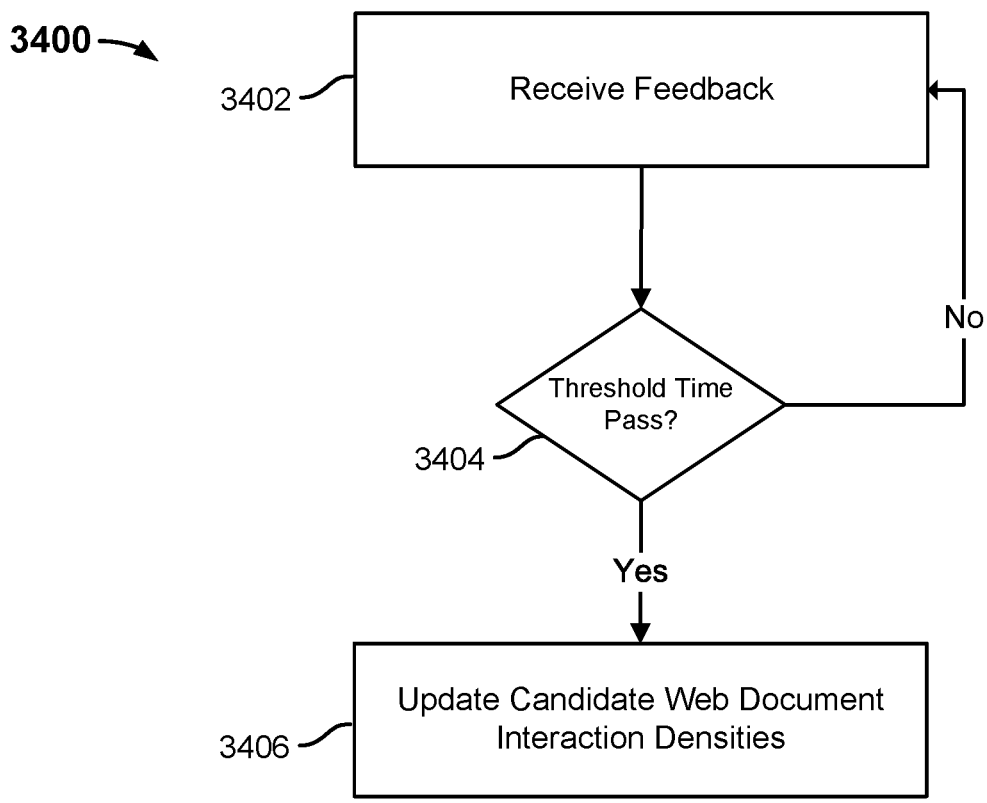
FIG. 34 is a flow diagram illustrating a process for updating interaction values associated with a user in accordance with some embodiments.

FIG. 34 is a flow diagram illustrating a process for updating interaction values associated with a user in accordance with some embodiments. In the example shown, process 3400 may be implemented by an orchestrator, such as orchestrator 2620.

At 3402, feedback for one or more cards associated with one or more web document is received from a user. A card associated with a web document is provided in a content feed. A user may interact with the card. For example, a user may provide a comment about the web document. A user may share with one or more contacts (e.g., email contacts, phone contacts, social media contacts, etc.) the card or the web document associated with the card. A user may provide a user input to the graphical user interface and associate an emoji (e.g., "thumbs up," "heart," "smiley face", etc.) with the card associated with the web document. A user may provide via a graphical user interface of the user's device to the search and feed service feedback indicating the web document associated with the card is not of interest to the user. A user may provide via a graphical user interface of the user's device to the search and feed service feedback indicating the web document associated with the card is off topic. For example, a user may be interested in the topic "hiking," i.e., walking outside on a trail, and the search and feed service provides a card associated a web document about the Federal Reserve hiking interest rates. The user may indicate that the user wants to see less web documents like that the web document. The user may indicate that the web document is bad content (e.g., porn, fake news).

At 3404, it is determined whether a threshold time period has passed. While the user is using the search and feed service, the user may provide feedback (e.g., positive interactions, negative interactions) to the search and feed service. The candidate web document interaction density associated with a candidate web document is based on the user feedback. A threshold time period is established (e.g., two minutes) to maintain up-to-date density values associated with candidate documents. In the event the threshold time has passed, process 3400 may proceed to 3406. In the event the threshold time has not passed, process 3400 may return to 3402.

At 3406, the candidate web document interaction densities associated with one or more candidate documents are updated. The candidate web document interaction density is based on a positive interaction density and a negative interaction density. In some embodiments, a user may have a positive interaction with a candidate web document. In response to the positive interaction, another candidate web document similar to the provided web document may be provided. In some embodiments, a user may have a negative interaction with a candidate web document. In response to the negative interaction, a candidate web document that is similar to the previously provided web document may be removed as a candidate web document based on the negative interaction (e.g., $D(n)$ is set to a value that prevents the candidate web document from being provided in a content feed). In other embodiments, the candidate web document interaction density values are updated after any positive or negative interaction without waiting for a threshold time to have passed (i.e., step 3404 is optional). For example, a corresponding candidate web document interaction density value of a candidate web document is updated after a user clicks on a card associated with a web document.

Figure 35:
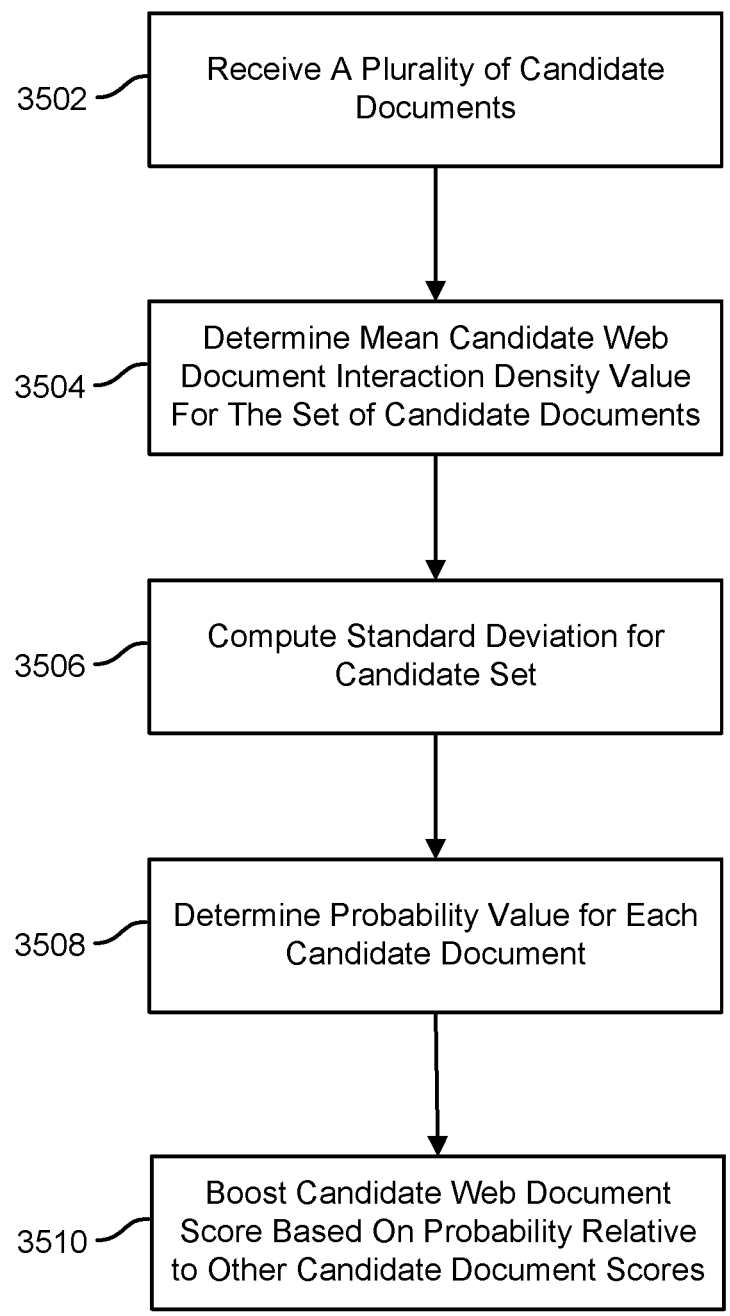
FIG. 35 is a flow diagram illustrating a process for boosting a candidate web document in accordance with some embodiments.

FIG. 35 is a flow diagram illustrating a process for boosting a candidate web document in accordance with some embodiments. In the example shown, process 3500 may be implemented by an orchestrator, such as orchestrator 2620.

At 3502, a plurality of candidate web documents are received. The corpus of web documents available to the search and feed service continues to expand every second, minute, and hour of each day. The Internet is crawled for the plurality of web documents. The Internet may crawled on a periodic basis (e.g. every minute, every 10 minutes, every hour, every six hours, every twelve hours, daily, etc.) to discover and retrieve the plurality of candidate web documents.

At 3504, a mean candidate web document interaction density value for the set of candidate documents is determined. Each candidate web document has an associated candidate web document interaction density $\mathcal{D}$. The mean candidate web document interaction density value for the set of candidate documents may be determined based on the associated values.

At 3506, a standard deviation is computed for the set of candidate web documents. The standard deviation is computed based on the mean candidate web document interaction density value.

At 3508, a probability value is determined for each candidate web document included in the document set. The probability indicates a likelihood that a user will have a positive interaction with the candidate document. For example, a linear regression model based on historical clicks of other users may be used to determine the probability that the user will be interested in the candidate document. In some embodiments, an approximate probability is determined by multiplying the candidate web document interaction density by an offset value (e.g., 0.4) that is based on the linear regression model.

At 3510, a candidate web document score is boosted based on its associated probability relative to other candidate web documents in the set of candidate documents. The candidate web documents may be ranked with respect to each other based on a combination of the ranking signals (e.g., freshness, popularity, site quality, candidate web document interaction density values).

In some embodiments, candidate web documents with higher corresponding candidate web document interaction density value are given a higher boost (weight) than other candidate web documents with lower corresponding candidate web document interaction density values. For example, candidate web documents in the top 10% of the set of sorted web documents may be given a higher boost than candidate web documents in the lower 10% of the set of sorted web documents.

In some embodiments, a candidate web document is ranked lower than other candidate web documents, but has a higher probability value and/or candidate web document interaction density value than the other candidate web documents. For example, a candidate web document may have a very low ranking due to its freshness score (e.g., three months old), but the candidate web document may have a higher probability value and/or candidate web document interaction density value than other "fresher" candidate web documents (e.g., web documents published in the last day). The candidate web document score may boosted (e.g., 1-22.5) such that its ranking is higher than the other candidate web documents, even though the candidate web document is older than the other candidate web documents, because a user is more likely to interact with the candidate web document than the other candidate web documents.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   determine a feature vector associated with a candidate web document;
   filter a plurality of other feature vectors of a feature space associated with the feature vector, the plurality of other feature vectors corresponding to a plurality of other web documents;
   determine a density value associated with the candidate web document using a subset of the plurality of other feature vectors remaining in the filtered feature space, wherein the density value is based on one or more user interactions with respect to a subset of the plurality of other web documents corresponding to the subset of the plurality of other feature vectors;
   rank the candidate web document with respect to the plurality of other web documents based on the determined density value; and
   provide in a content feed the candidate web document based on the ranking; and
   a memory coupled with the processor, wherein the memory is configured to provide the processor with instructions.

2. The system of claim 1, wherein the processor is further configured to receive the candidate web document.

3. The system of claim 1, wherein the feature space is filtered based on a cosine similarity between the feature vector associated with the candidate web document and the plurality of other feature vectors associated with the plurality of other web documents.

4. The system of claim 3, wherein at least one of the plurality of other web documents is filtered from the feature space in an event that the cosine similarity between the feature vector associated with the candidate web document and a corresponding one of the plurality of feature vectors associated with the at least one of the plurality of other web documents is greater than a cosine similarity threshold.

5. The system of claim 1, wherein the processor is further configured to determine a set of nearest neighbors comprising at least one of the subset of the plurality of other web documents based on the filtered feature space.

6. The system of claim 5, wherein the density value associated with the candidate web document is based on one or more interactions with respect to the set of nearest neighbors.

7. The system of claim 6, wherein the one or more interactions include one or more positive interactions.

8. The system of claim 7, wherein the one or more positive interactions include at least one of reading the at least one of the subset of the plurality of other web documents comprising the set of nearest neighbors, commenting on the at least one of the subset of the plurality of other web documents comprising the set of nearest neighbors, sharing the at least one of the subset of the plurality of other web documents comprising the set of nearest neighbors, or providing reaction feedback with at least one of the subset of the plurality of other web documents comprising the set of nearest neighbors.

9. The system of claim 6, wherein the one or more interactions include one or more negative interactions.

10. The system of claim 9, wherein the one or more negative interactions include at least one of providing an indication of not being interested in the at least one of the plurality of other web documents comprising the set of nearest neighbors or providing an indication that the at least one of the plurality of other web documents comprising the set of nearest neighbors is off topic.

11. The system of claim 1, wherein a rank of the candidate web document is boosted based on a probability associated with the candidate web document, wherein the probability indicates a likelihood that the candidate web document will be of interest to a particular user.

12. The system of claim 1, wherein the density value is one of one or more signals used to determine whether to provide the candidate web document in the content feed.

13. The system of claim 12, wherein the one or more signals include at least one of a trending signal, a freshness signal, and a relevance signal.

14. The system of claim 12, wherein the processor is further configured to:
   receive feedback associated with content provided in the content feed; and
   update the determined density value associated with the candidate web document based on the received feedback.

15. The system of claim 14, wherein the determined density value associated with the candidate web document is updated in the event a threshold time has passed.

16. A method, comprising:
   determining a feature vector associated with a candidate web document;
   filtering a plurality of other feature vectors of a feature space associated with the feature vector, the plurality of other feature vectors corresponding to a plurality of other web documents;
   determining a density value associated with the candidate web document using a subset of the plurality of other feature vectors remaining in the filtered feature space, wherein the density value is based on one or more user interactions with respect to a subset of the plurality of other web documents corresponding to the subset of the plurality of other feature vectors;
   ranking the candidate web document with respect to the plurality of other web documents based on the determined density value; and
   providing in a content feed the candidate web document based on the ranking.

17. The method of claim 16, further comprising determining a set of nearest neighbors comprising a plurality of web documents based on the filtered feature space, wherein the density value associated with the candidate web document is based on one or more interactions with respect to the set of nearest neighbors.

18. The method of claim 17, wherein the one or more interactions include one or more positive interactions.

19. The method of claim 17, wherein the one or more interactions include one or more negative interactions.

20. A non-transitory computer readable storage medium storing instructions that, when executed by one or more processors, cause the one or more processors to perform operations comprising:
- determining a feature vector associated with a candidate web document;
- filtering a plurality of other feature vectors of a feature space associated with the feature vector, the plurality of other feature vectors corresponding to a plurality of other web documents;
- determining a density value associated with the candidate web document using a subset of the plurality of other feature vectors remaining in the filtered feature space, wherein the density value is based on one or more user interactions with respect to a subset of the plurality of other web documents corresponding to the subset of the plurality of other feature vectors;
- ranking the candidate web document with respect to the plurality of other web documents based on the determined density value; and
- providing in a content feed the candidate web document based on the ranking.

\* \* \* \* \*